US011526834B2

(12) United States Patent
Conlon

(10) Patent No.: US 11,526,834 B2
(45) Date of Patent: Dec. 13, 2022

(54) TRACKING SYSTEM AND METHOD FOR MONITORING AND ENSURING SECURITY OF SHIPMENTS

(71) Applicant: OVERHAUL GROUP, INC., West Lake Hills, TX (US)

(72) Inventor: Barry Conlon, Leander, TX (US)

(73) Assignee: Overhaul Group, Inc., Austin, TX (US)

( * ) Notice: Subject to any disclaimer, the term of this patent is extended or adjusted under 35 U.S.C. 154(b) by 119 days.

(21) Appl. No.: 16/863,953

(22) Filed: Apr. 30, 2020

(65) Prior Publication Data
US 2020/0334631 A1  Oct. 22, 2020

Related U.S. Application Data

(63) Continuation-in-part of application No. 16/054,996, filed on Aug. 3, 2018, now Pat. No. 10,832,204.
(Continued)

(51) Int. Cl.
*G06Q 10/08* (2012.01)
*G08B 7/06* (2006.01)
(Continued)

(52) U.S. Cl.
CPC .......... *G06Q 10/0833* (2013.01); *G08B 7/06* (2013.01); *H04W 4/029* (2018.02); *H04W 4/35* (2018.02)

(58) Field of Classification Search
CPC .... G06Q 10/0833; H04W 4/029; H04W 4/35; G08B 7/06
(Continued)

(56) References Cited

U.S. PATENT DOCUMENTS 7,356,481 B2 * 4/2008 Mitsuoka ............... G06Q 10/08
705/7.12
7,641,104 B1 * 1/2010 Leon .................... G06Q 10/087
235/375
(Continued)

FOREIGN PATENT DOCUMENTS

WO WO-2019098571 A1 * 5/2019 ........... G06Q 10/083

OTHER PUBLICATIONS

Van Riessen et al., "The Cargo Fare Class Mix problem for an intermodal corridor: revenue management in synchromodal container transportation", Flex Serv Manuf J 29: 634-658. (Year: 2017).*
(Continued)

*Primary Examiner* — Frantzy Poinvil
(74) *Attorney, Agent, or Firm* — Isidore PLLC

(57) ABSTRACT

A method, computer device, and security detail (SD) communication device enables real-time tracking and security of shipments. The method includes receiving a plurality of location signals indicating a location of multiple geographically co-located shipment-related entities that are being tracked as a shipment group. The shipment group includes an assigned security detail that has a corresponding location signal. The method includes presenting the shipment group as a plurality of co-located visual representations on a shipment tracking user interface (STUI) of the computing device, where each location signal is represented among the co-located visual representations. The method includes monitoring for any unscheduled deviations in at least one of an expected co-location and an expected geo-location of received updates to the location signals within the shipment group. The method further includes, in response to detecting an unscheduled deviation, triggering responsive actions,
(Continued)

including notifying SD personnel, based on the type of deviation.

30 Claims, 18 Drawing Sheets

Related U.S. Application Data

(60) Provisional application No. 62/540,659, filed on Aug. 3, 2017.

(51) Int. Cl.
*H04W 4/35* (2018.01)
*H04W 4/029* (2018.01)

(58) Field of Classification Search
USPC .................................................. 705/3–44
See application file for complete search history.

(56) References Cited

U.S. PATENT DOCUMENTS

| | | | | |
|---|---|---|---|---|
| 7,739,202 | B2* | 6/2010 | Kadaba | G06Q 30/04 705/338 |
| 7,937,244 | B2 | 5/2011 | Kadaba | |
| 8,046,262 | B1 | 10/2011 | Antony et al. | |
| 8,145,577 | B2 | 3/2012 | Kodger, Jr. | |
| 8,620,821 | B1* | 12/2013 | Goldberg | B07C 3/006 705/64 |
| 8,712,923 | B2 | 4/2014 | Kadaba | |
| 8,924,312 | B2 | 12/2014 | Kadaba | |
| 9,230,230 | B2 | 1/2016 | Gupta et al. | |
| 9,600,797 | B2* | 3/2017 | Moir | G06Q 10/0833 |
| 9,710,740 | B2 | 7/2017 | Morimoto | |
| 9,760,854 | B1* | 9/2017 | Chowdhary | G06Q 10/0837 |
| 9,779,380 | B2* | 10/2017 | Kadaba | G06Q 10/0833 |
| 9,798,998 | B2 | 10/2017 | Kadaba | |
| 10,181,110 | B1* | 1/2019 | Atkinson | G06F 40/174 |
| 11,017,347 | B1* | 5/2021 | Choudhury | G06Q 10/08355 |
| 2002/0198774 | A1 | 12/2002 | Weirich | |
| 2008/0294491 | A1 | 11/2008 | Hersh et al. | |
| 2012/0089530 | A1* | 4/2012 | Klingenberg | G06Q 10/08 705/330 |
| 2013/0262336 | A1 | 10/2013 | Wan et al. | |
| 2014/0236856 | A1 | 8/2014 | Baykhurzuov | |
| 2015/0161697 | A1 | 6/2015 | Jones et al. | |
| 2015/0339902 | A1 | 11/2015 | Latorre | |
| 2015/0371185 | A1 | 12/2015 | Telang et al. | |
| 2016/0114976 | A1 | 4/2016 | Gupta et al. | |
| 2016/0217399 | A1* | 7/2016 | Roelofs | G06Q 10/063116 |
| 2016/0335593 | A1* | 11/2016 | Clarke | G06Q 10/0833 |
| 2017/0053234 | A1 | 2/2017 | Lozito et al. | |
| 2017/0154302 | A1 | 6/2017 | Streebin et al. | |
| 2018/0314999 | A1* | 11/2018 | Nemati | G06Q 10/087 |
| 2019/0066042 | A1* | 2/2019 | Conlon | G06Q 10/0833 |
| 2019/0250653 | A1* | 8/2019 | Conlon | G06Q 10/0833 |
| 2019/0391634 | A1* | 12/2019 | Ayoub | G01S 19/14 |
| 2020/0334631 | A1* | 10/2020 | Conlon | G06Q 10/0833 |
| 2020/0380467 | A1* | 12/2020 | Chen | G01C 21/343 |

OTHER PUBLICATIONS

Patent Cooperation Treaty, International Application No. PCT/US2018/045288, International Search Report and Written Opinion, dated Nov. 26, 2018.

Smith, "Information management of automatic data capture: An overview of technical developments, Information Management & Computer Security"; 2002; 10, 2/3 Proquest p. 109 (Year:2002).

European Patent Office, Patent Application No. EP 18841939, Search Report, dated Sep. 8, 2021.

* cited by examiner

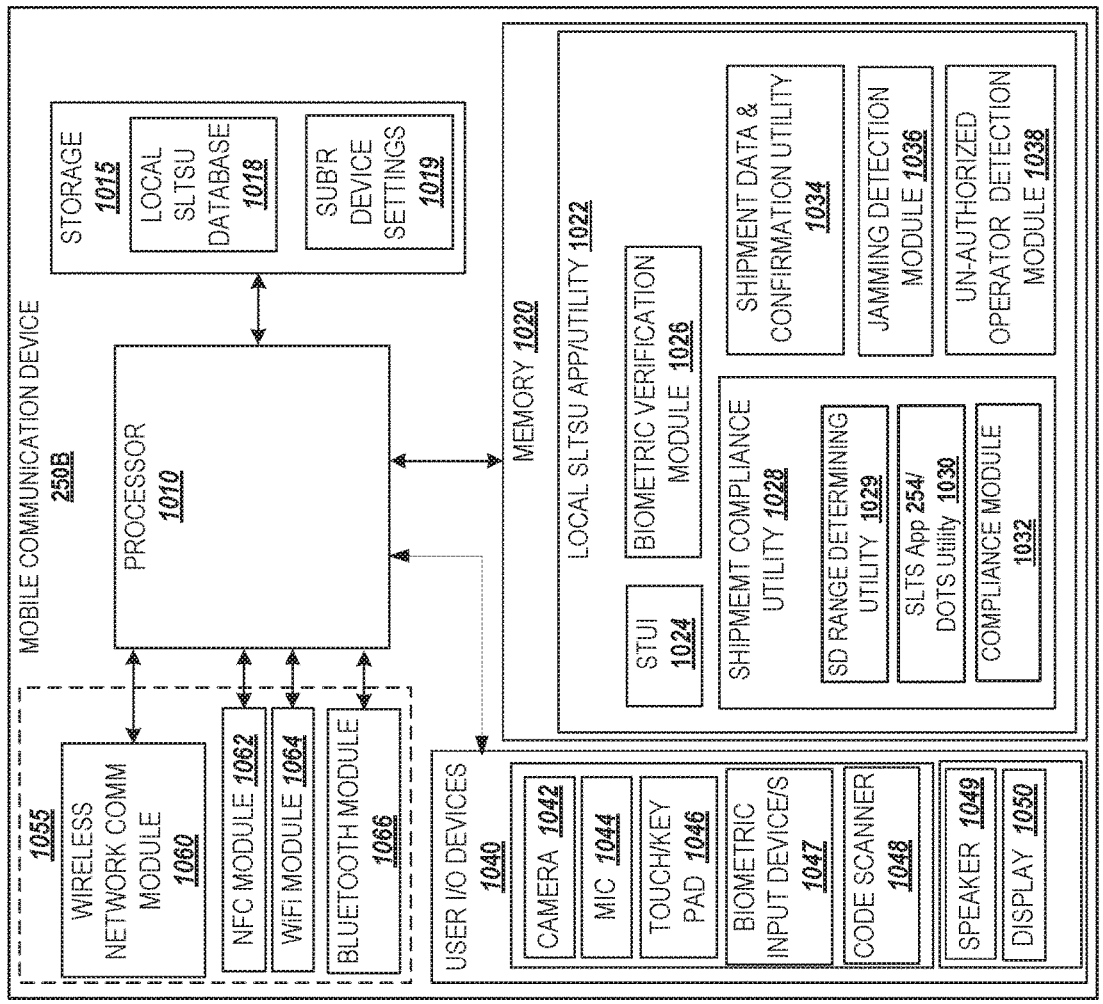
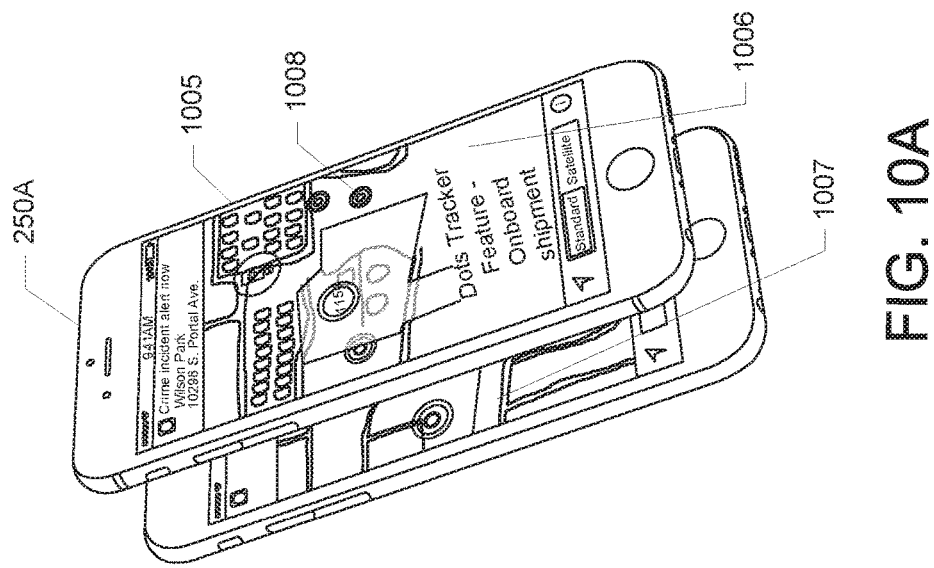
FIG. 10B
FIG. 10A

TRACKING SYSTEM AND METHOD FOR MONITORING AND ENSURING SECURITY OF SHIPMENTS

PRIORITY & RELATED APPLICATIONS

The present application is a continuation-in-part of and claims priority from U.S. Utility application Ser. No. 16/054,996, filed on Aug. 8, 2018, now, U.S. Pat. No. 10,832,204, which has priority date of Provisional Application No. 62/540,659, filed on Aug. 3, 2017. The entire content of each prior application is incorporated herein by reference, and priority is claimed for the corresponding sections of the present application.

BACKGROUND

1. Field of the Invention

The present disclosure is generally related to security systems and processes in the cargo transportation industry, and in particular to a method and system for monitoring the status and providing security of shipments via location-based tracking.

2. Description of the Related Art

Large quantities of cargo are transported daily across the continental US and in most other industrial countries, using transportation carriers. The use of tractor-trailers provided by the trucking industry accounts for a significant portion of the carriers utilized to transport these cargo, including those cargo that may eventually be transferred from the tractor-trailer and placed on an air transport or shipping vessel, or vice-versa. In the trucking industry, cargo are arranged to be transported from an origination point to a destination point via a particular tractor-trailer driven by an operator. The truckers (or truck drivers/operators) who provide the actual service of moving these cargo from origination point to destination point are often owner-operated truckers, whose sole purpose is to securely transmit the cargo from origination point to destination point and be paid for completion of that delivery.

Each shipped cargo is valuable to the parties involved in the shipment transaction, including the shipper, the brokerage service, the trucker (or truck driver/operator), and the recipient. Thus, the security of the cargo once the cargo leaves the origination/shipping point is of concern. With conventional trucking, the security aspects of the cargo have been primarily based on the operator being diligent in the field as the tractor-trailer is moved along a selected delivery route.

Unfortunately, the value of these cargo is often also of value to others, such as criminals, not involved in the shipment, and who may desire to steal the cargo and/or the truck for various reasons, including financial or otherwise. Even a diligent operator is not be able to detect when undesirable activities are occurring in or around the shipment (collectively the cargo, the tractor, trailer and/or truck). These undesirable activities can negatively affect the shipment and/or jeopardize or prevent the completion of the shipment delivery.

SUMMARY

The illustrative embodiments of the present disclosure provide a data processing system, a shipment security monitoring and tracking system, a method, and a MCD for electronically tracking a shipment to provide enhanced security and safety of the shipment and counter against theft and other illicit actions, including jamming attacks.

According to a first aspect, the method includes receiving, at a computing device, a plurality of location signals, each location signal indicating a location of one of multiple geographically-co-located shipment-related entities that are being tracked concurrently as a shipment group associated with a specific shipment. The location signals are received from at least one communication network communicatively coupled to a network interface of the computing device. The shipment group includes an assigned security detail having a corresponding location signal. The location signal is included in and tracked as a part of the shipment group. The method further includes presenting the shipment group as a plurality of co-located visual representations on a shipment tracking user interface (STUI) of the computing device. Each location signal is represented by one visual representation from among the plurality of co-located visual representations. The method includes monitoring for any unscheduled deviations in at least one of an expected co-location and an expected geo-location of received updates to the location signals within the shipment group. The method also includes in response to detecting an unscheduled deviation: identifying a specific type of the unscheduled deviation; and triggering responsive actions based on the specific type of the unscheduled deviation, the responsive actions comprising notifying personnel associated with the security detail.

According to one embodiment, the triggering of responsive actions includes at least one of presenting at least one visual indication within the STUI and outputting an auditory indication via an audio output device associated with the computing device. Each of the visual and auditory indication presents information that identifies that at least one anomaly has been detected in at least one of a location and a movement of at least one of the shipment-related entities and the security detail within the shipment group.

According to another embodiment, the computing device is a security detail (SD) communication device that is associated (i.e., co-located) with the security detail. With this embodiment, triggering responsive actions comprises one or more of: transmitting, via a communication network, a notification from the SD communication device to server of a shipment monitoring system that tracks the shipment group and notifies other relevant parties of detected anomalies; updating the STUI to present at least one visual notification of the detected anomaly on a display device; initiating a communication with an operator's mobile communication device (MCD) to enable communication of the detected anomaly to an operator of a vehicle transporting the shipment; and presenting a selectable option within the STUI to automatically connect to and communicate with one or more of a law enforcement dispatcher, a shipper, the operator, and a back-up security detail.

According to one aspect, the method further includes analyzing the anomaly to identify an SD-related anomaly from among a plurality of SD-related anomalies. The SD-related anomalies include: separation of the security detail from other shipment-related entities within the shipment group before delivery of the shipment; a distance between the security detail and the other shipment-related entities being greater than a threshold distance; detecting movement of the security detail with a different grouping of shipment-related entities than an assigned group; and detecting movement of the security detail in a different direction from the other shipment-related entities within the shipment group; and disappearance of the location signal for the security detail. The method further includes, in response to the anomaly being one of the plurality of SD-related anomalies: generating and forwarding an alert notification, via at least one communication network, to at least one other communication device associated with one or more interested parties from a group that includes a security detail dispatcher, a security detail personnel, a second security detail in the geographic vicinity, an operator and/or driver of the tractor-trailer, a shipper, and a shipment monitoring service personnel.

In one embodiment where the computing device is a shipment monitoring server, the triggering of the responsive actions includes: generating and forwarding the alert, via at least one communication network, to a SD communication device associated with the security detail; recording the SD-related anomaly to a shipment tracking database; determining and assigning a relative security rating to a security detail and a corresponding security detail company based on a history of SD-related anomalies associated with the corresponding security detail company; and selecting which among a plurality of security detail companies and a plurality of security details in a geographic location of a next shipment to assign to the next shipment, in part based on the assigned relative security rating.

Also, according to one embodiment, triggering the responsive actions includes: generating an anomaly response user interface (ARUI) displayed on the display device; presenting, on the ARUI, a plurality of selectable options for automatically notifying one or more of the shipment monitoring server, a shipper, the transport vehicle operator, a second security detail, and a law enforcement dispatcher. Accordingly, one or more parties having an interest in the shipment/shipment transaction are automatically notified for any detected anomaly. Also, when the computer device is a SD communication device (SDCD), confirmation of an anomaly involving one or more of the shipment-related entities occurs in real time, from the SDCD, as a trusted third party in vicinity of the shipment-related entities.

According to one aspect, a non-transitory computer readable storage medium is provided. The computer readable storage medium stores thereon program code that, when executed by a processor of a computer device, configures the computer device to perform the above presented method functions.

According to another aspect of the disclosure, an MCD includes: a display providing a user interface; a memory having stored thereon a security detail shipment tracking utility (SDSTU); a network interface enabling communication of information via one or more wireless networks; and a location sensor enabling real-time location determination of the MCD. The MCD further includes a processor communicatively connected to the display, the network interface, the location sensor, and the memory. The processor executes the SDSTU to enable the MCD to receive at least one location signal identifying a location and a status for at least one shipment-related entity from among a plurality of shipment-related entities associated with a shipment group assigned for tracking via the MDC. The plurality of shipment-related entities includes at least one of a cargo, a tractor-trailer or transport vehicle, and an operator of the transport vehicle. The MCD is also enabled to present, within the user interface, a visual representation of each location signal providing a relative co-location of each shipment-related entity and the MCD. The MCD is further enabled to: in response to receiving updated location signals of the at least one shipment-related entity, automatically updating a relative location of each corresponding visual representation on the user interface to correlate to a current real-time location. The MCD is further enabled to, in response to an anomaly occurring with respect to the relative location of at least one shipment-related entity and the MCD: change at least one characteristic of the user interface to indicate the occurrence of the anomaly; and automatically generate and issue a notification signal to alert at least one of the operator and a remote monitoring device that the anomaly has been detected with the movement of at least one of the shipment-related entities that can affect a security of the shipment.

According to one embodiment, to identify the occurrence of the anomaly, the processor: compares a separation distance between each of the received location signals and a location of the communication device to pre-set threshold maximum separation distances for each pairing of two location signals; and determines when a calculated separation distance of a shipment-related entity represented by one of the visual representations is greater than a respective pre-set threshold maximum separation distance. In response to the determined calculated real separation distance being greater than the respective pre-set threshold maximum separation distance, the processor identifies the anomaly.

According to one aspect, the MCD includes a wireless transceiver that supports wireless communication. The SDSTU configures the MCD to receive a shipment assignment providing information about a shipment that is to be picked up and transported by an authorized operator from a given shipment pick-up/origination point to a shipment delivery/destination point. The shipment assignment includes the unique location signals for the authorized operator and at least one other shipment-related entity from among the cargo and the transportation vehicle. The SDSTU further configures the MCD to provide unique tracking icons corresponding to the visual representation of the shipment-related entities on the shipment tracking user interface (STUI) and to map the unique tracking icons to a current location of the shipment-related entities on a co-location map presented on the STUI. The SDSTU further configures the MCD to receive movement data associated with at least one shipment-related entity and to update a mapped location of an associated unique tracking icon on a co-location map displayed on the STUI. Finally, the SDSTU further configures the MCD to monitor for anomalies in a current location of the other shipment-related entities prior to the authorized operator arriving at the origination point to receive the shipment. And, in response to detecting an anomaly in the current location of at least one of the other shipment-related entities, the MCD generates and issues a notification about the anomaly.

According to another aspect of the disclosure, a data processing system (DPS) is provided with a memory that stores a shipment location tracking and security utility (SLTSU). The DPS includes a display device that visually presents at least one graphical user interface (GUI) generated by the SLTSU and at least one network interface device (NID) that enables the data processing system to receive and transmit information via one or more communication networks. The DPS also includes at least one processor coupled to the memory, the display device, and the at least one NID. The at least one processor executes the SLTSU to configure the DPS to receive a plurality of location tracking signals indicating a location of multiple shipment-related entities that are being tracked concurrently as a shipment group. The plurality of location tracking signals are received via the at least one NID from one or more remote devices communicatively connected to the data processing system via a respective communication network. The processor executes the SLTSU to further configure the DPS to associate the location tracking signals as a shipment group and assign a unique shipment tracking identifier (STID) to the shipment group to track movement of the location tracking signals relative to each other. The SLTSU further configures the DPS to assign a security detail to the shipment group, the security detail physically tracking the shipment group in a vicinity of the shipment group. The security detail has at least one associated location sensor and an SD communication mechanism for transmitting a current location of the security detail (i.e., of the location sensor) to the data processing system over a respective communication network. The security detail has an assigned security detail identifier (SDID). The SLTSU further configures the DPS to link the SDID with the STID. The SLTSU further configures the DPS to receive, via the communication network, a security detail (SD) location signal identifying the current location of the location sensor associated with the assigned security detail. The DPS further presents the shipment group and the assigned security detail as a plurality of co-located visual representations on a first shipment tracking user interface (STUI). Within the STUI, each received location tracking signal and the SD location signal is represented by one visual representation from among the plurality of co-located visual representations. The SLTSU further configures the DPS to monitor for any unscheduled deviations in at least one of an expected co-location and an expected geo-location of received updates to the location tracking signals received from the entities within the shipment group and the SD location signal. The SLTSU further configures the DPS to, in response to detecting an unscheduled deviation: identify a specific type of the unscheduled deviation; and trigger responsive actions based on the specific type of the unscheduled deviation. The series of responsive actions include alerting the security detail of the detected unscheduled deviation, via transmission of a signal over at least one communication network.

According to one embodiment, the SLTSU further configures the DPS to perform various functions in response to detecting a separation of at least one of the shipment-related entities and the security detail from each other occurring at an unscheduled time prior to the shipment reaching a shipment delivery destination or at a security monitoring end time or security monitoring end location. Among the functions that DPS is configured to perform are: to evaluate, using historical data and geographical mapping data, a geographic location and time at which the separation occurs; to place the shipment in an enhanced watch/monitoring state; to trigger a performance of one or more security features that informs at a least one of the operator, the security detail, and the shipper of the separation; and to create and store a record of the separation event and responsive actions taken. The functions performed by DPS also include: in response to the separation occurring at the shipment delivery destination or at the security monitoring end time or location: to de-couple the location signals within the shipment group; to update a shipment tracking system to indicate that the shipment has been delivered; to update the shipment tracking UI to remove the plurality of co-located visual representations for tracking the shipment group; and to release the security detail from the assignment to the shipment.

According to one aspect, the SLTSU configures the DPS to: identify an intended operator and shipping vessel assigned to a future shipment awaiting pickup by the intended operator. The intended operator has an operator ID and a communication device that provides a unique device location signal that is associated with the operator ID. The shipment also has a unique shipment location signal. The SLTSU further configures the DPS to associate the operator ID to the future shipment and associate the security detail with the future shipment. The security detail has an associated security detail identifier (SDID) and SD location signal. The SLTSU further configures the DPS to transmit, to a SD communication device associated with the security detail, the unique signatures of the location signals associated with the shipment-related entities. The SD communication device is configured to track the location signals and identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal. The second operator device signal is not associated with the operator or a second operator that has been assigned to transport the shipment. The SLTSU further configures the DPS to monitor a geo-coordinate location of the future shipment prior to pick-up by the operator. The DPS, in response to identifying an anomaly in the co-location of or relative movement of the signals, triggers responsive actions, involving communicating with personnel associated with the security detail. The responsive actions are ones designed to prevent or stop an un-authorized operator from taking the shipment. The SLTSU further configures the DPS to, in response to receiving a signal indicating the operator has picked-up the shipment, link and co-locate the unique device location signal, unique shipment location signal, and the SD location signal to create and track a new shipment group.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 10A-10B respectively illustrate two three dimensional views and a block diagram representation of an example mobile communication device (MCD) utilized by an operator/driver and which is equipped with a shipment-entity tracking app to enable real-time tracking of the shipment group and receipt of notification of potential problems occurring with the shipment group, in accordance with one or more embodiments;

DETAILED DESCRIPTION OF ILLUSTRATIVE EMBODIMENTS

Figure 1A:
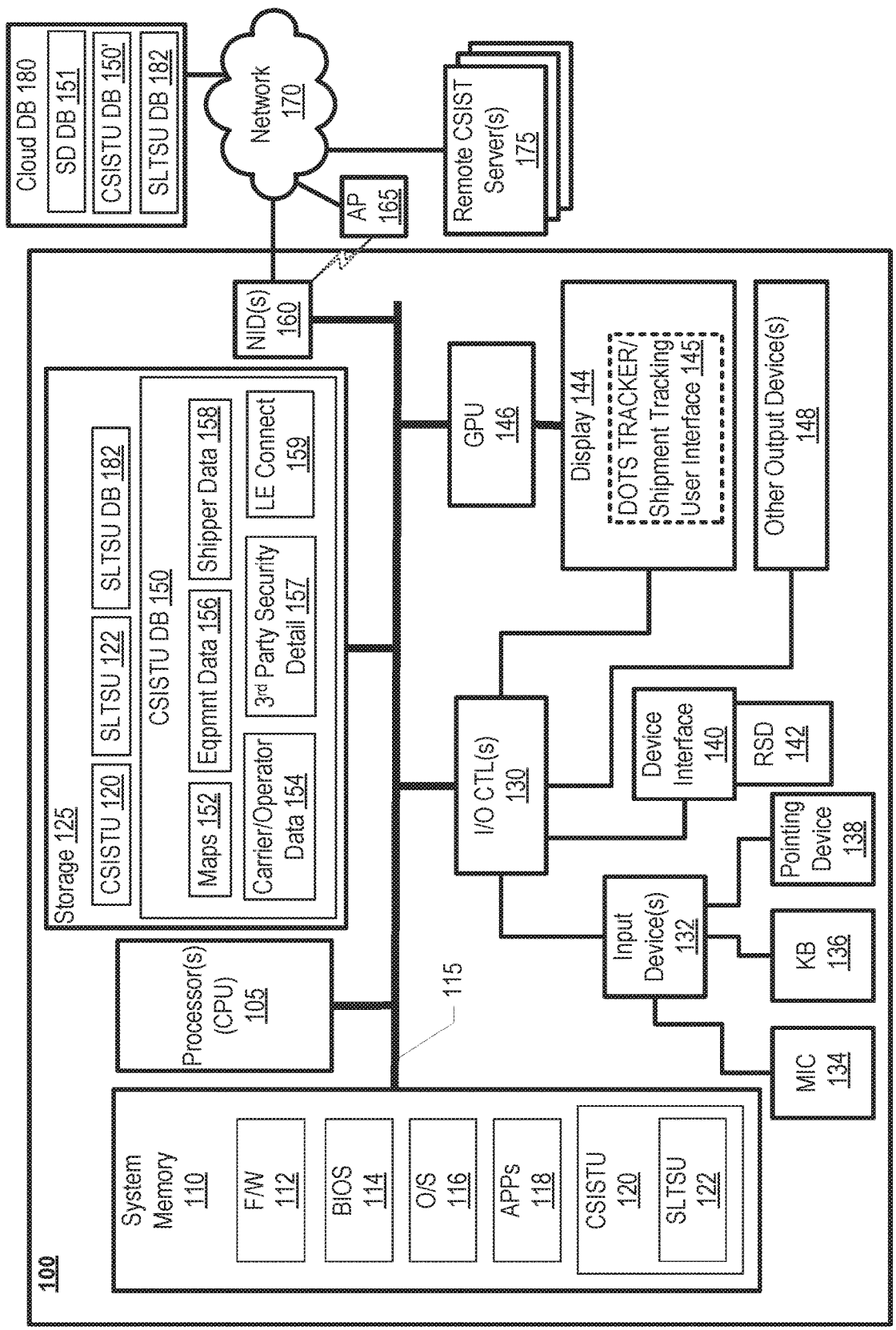
FIG. 1A illustrates an example data processing system (DPS) within which various aspects of a shipment location tracking and security system can be implemented, in accordance with one or more embodiments.

According to one or more aspects, the illustrative embodiments of the present disclosure provide a data processing system, a shipment security monitoring and tracking system, a method, and a mobile communication device (MCD) for electronically tracking a shipment to provide enhanced security and safety of the shipment and counter against theft and other illicit actions, including jamming attacks.

According to one aspect, the method includes receiving a plurality of location signals indicating a location of multiple geographically co-located shipment-related entities that are being tracked as a shipment group. The shipment group includes an assigned security detail having a corresponding location signal. The method includes presenting the shipment group as a plurality of co-located visual representations on a shipment tracking user interface (STUI) of the computing device, where each location signal is represented among the co-located visual representations. The method includes monitoring for any unscheduled deviations in at least one of an expected co-location and an expected geo-location of received updates to the location signals within the shipment group. The method further includes, in response to detecting an unscheduled deviation, triggering responsive actions, including notifying SD personnel, based on the type of deviation.

According to another aspect, a shipment monitoring system electronically tracks each of multiple shipment-related entities as a group of co-located representations that are monitored to provide enhanced security of the shipment from attacks or unauthorized or illicit actions that can compromise the safety of the shipment. A data processing system (DPS) receives a plurality of location tracking signals from location sensors of multiple shipment-related entities, associates the location tracking signals as a shipment group that is assigned a unique shipment tracking identifier (STID), and presents the shipment group as a plurality of co-located representations on a shipment tracking user interface (STUI). The DPS monitors for any unscheduled deviations in at least one of an expected co-location/geo-location of the location tracking signals, identifies specific types of unscheduled deviations, and triggers responsive actions to protect the shipment. The unscheduled deviations can include signal jamming attacks, incorrect pickup (or theft) of an operator-assigned shipment, and unexpected separation of the tracked entities.

Generally, the illustrative embodiments further provide for different forms and methods of representation-based, automated tracking of shipments, with computer-based detection of abnormalities in the movement of the co-located representations and subsequent response to the detected abnormalities by automatic computer-based generation of one or more notifications and/or triggering of responsive actions. As a first aspect, one implementation of the disclosure generally provides security tracking of a shipment by presenting and monitoring the movement of multiple co-located representations, with each representation representing one of multiple shipment-related entities. The movement of the co-located representations are then analyzed to enable detection of potential bad acts towards the shipping vehicle (or vessel) and/or the shipment or cargo, such as abandonment of a shipment by the operator/driver. Other applications of the disclosure provide embodiments for generation of real-time alerts and/or notification of potential theft of cargo and/or a transportation vehicle, such as a tractor-trailer, where the theft is being facilitated by signal jamming attacks or location sensor tampering.

The disclosure expands on the use of systems for tracking a location of one or more shipment-related entities involved in the shipment of a cargo. For example, to track the location of a cargo and/or a tractor-trailer, a location tracking device (such as a transponder) can be attached to the entity being tracked, in one embodiment. The location tracking device wirelessly communicates a location signal indicating a geographic location of the tracked entity. The location of a single entity associated with the shipment can then be tracked via a single representation on a tracking/monitoring computer that receives the geographic or other location signals from the location tracking device.

In conventional shipments that include a single transponder to track the location of a shipment and/or the tractor-trailer, thieves and others who intend to take or otherwise interfere with the cargo/shipment or the tractor-trailer have resorted to utilizing jamming techniques to block the outbound signals of the transponders. Once the signals are blocked, the thief can then proceed to remove the cargo from the tractor-trailer or steal one or both of the tractor and/or trailer with the cargo, knowing that the location of the shipment can no longer be traced. By using this jamming attack on the transponder signal, no wireless trace is transmitted for the monitoring computer to later detect the location of the stolen items, when the theft is later discovered. By the time the theft is discovered, the thief is likely long gone with the shipment. The present disclosure addresses this use of signal jamming by providing a monitoring system that quickly identifies when the signal jamming attack has been initiated and a responsive system to notify the relevant parties to respond to and prevent the theft of the cargo or container.

Additionally, a cargo or a trailer containing cargo is occasionally assigned by a shipper for pick up by a selected (or authorized) driver/operator from a pick-up point, such as a cargo on-loading dock. There are occasions when the cargo or trailer is deliberately or inadvertently hitched to the vehicle (e.g., a truck) of another operator and taken away from the pick-up point by the incorrect operator (e.g., an unauthorized operator). When the correct/authorized operator arrives, there is no cargo/trailer to pick up, and the unauthorized operator may be long gone with the shipment. The shipper and other associated/interested parties are forced to deal with a loss of the trailer and the shipment (and perhaps the tractor), with a resulting loss in time and/or financial loss, particularly if the cargo or trailer was deliberately taken by the unauthorized operator and is not recovered. Again, aspects of the disclosure address each of the above scenarios and provides a solution that enables early detection of these activities and triggered notifications and responses that mitigate the effects of the specific activity detected.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Within the description of the features of the disclosure and the accompanying drawings, the embodiments are presented from the perspective of a trucking based shipping model, where the term "carrier" is provided to refer to: (i) an owner-operator with a single equipment; (ii) an owner-operator or small business owner with several trucks, and who can employ multiple drivers; and (iii) a large commercial organization or company that includes a large number of trucks, e.g., hundreds of trucks and drivers. As provided herein, the term operator is generally utilized to refer to the driver of the equipment or truck, which is colloquially referred to as one of a truck-driver, truck-operator, or trucker. Each operator has a mobile communication device (MCD) that is referred to herein as an operator MCD.

Additionally, the term "equipment" generally refers to the combination of "tractor and trailer", and covers the various different types of equipment available, including, but not limited to, flatbeds, dry vans, refrigerated trucks, etc. According to one embodiment, the relevant details of the equipment that is tracked includes the type of equipment as well as the available capacity of the specific equipment to load additional cargo. It is appreciated that, while specific types of cargo hauling trucks fall within the term equipment, the term equipment can also apply to different types of trucks or motor vehicles, without limitation. Additionally, the underlying features of the disclosure are fully applicable to other transportation and/shipping vessels, such as water-based shipping (e.g., ocean cargo or river cargo). In overwater or water-based shipping, the carriers are the boat owners or cargo ship captains and the equipment includes the water vessels or amphibious vessels. Further, the shipper can be any registered person or business that has a cargo that can be transported over water from a cargo pick-up point to a delivery/destination point by a carrier. Air based transportation is also a supported industry that can include a framework designed for interfacing by air-based cargo shippers and pilots with planes, etc. The functionality of the presented framework/environment can be extended to a transportation space involving drone shipments, for example, where the drone operators (pilots) are not co-located with the drone equipment.

For simplicity, the disclosure is described from the perspective of a shipment that is being transported by a tractor-trailer combination as common in the trucking industry, where the carrier is a trucker and the equipment is a truck or tractor (on-land motor vehicles) to which a trailer or container is hitched. It is understood that the features and functionality described herein can also be applicable to different types of on-land motorized equipment, such as cars, RVs, busses, motorcycles, and the like, without limitation. Extension to bicycles and other non-motorized form of transportation can also be applicable. To capture the extension of the described features to other forms of transport, the various different equipment or vessels are generally referred to as a transportation vessel.

Certain coined terms are utilized herein in describing the features and functionality of the disclosure. For example, the term "shipment-related entity" is utilized to reference each of the following, without limitation: a cargo, a cargo container, a tractor (e.g., a motorized vehicle), a trailer or container, a tractor-trailer as a combined operator equipment, an operator, an operator mobile device. Each shipment-related entity has a separate location tracking mechanism that enables the geographic location of the entity to be determined. In one or more embodiments, the location tracking mechanism is a transponder. The location tracking mechanism transmits a unique location signal for the particular shipment-related entity. The term "shipment group" generally represents any two or more of the shipment-related entities that are assigned to a same shipment. Also, with certain shipments, the shipment group can also include an assigned security detail. In the described embodiments, the security detail includes a security detail vehicle and security detail personnel. A security detail (SD) communication device is co-located with the security detail, either within the vehicle (such as an in-dash computer) or associated with the SD personnel (such as a mobile smart phone or tablet). The security detail also includes a location tracking sensor and a communication mechanism for transmitting the current location of the security detail, e.g., to a shipment monitoring server or operator device. The members of a shipment group, including the security detail, are expected to be physically co-located while the shipment is being delivered. Certain limited exceptions or deviations to the co-location of one or more of the members is anticipated and accounted for by the algorithm provided herein. The grouping of members in the shipment group is expected to be within a specific range/radius of each other and to move in the same direction as each other, with some limited exceptions (e.g., when a truck driver/operator leaves the truck/tractor-trailer at a truck stop or at a shipment pickup or drop-off location).

Throughout the description, references made to the term "shipment" refers primarily to the cargo that is being carried from an origination point to a delivery destination. Other terms utilized throughout the disclosure are provided with functional descriptive names that represent the meanings and/or the context in which the terms are presented and/or utilized.

The attached figures present various aspects and/or features of the described embodiments; however, certain features may not be expressly presented within the figures and/or the description thereof. Within the descriptions of the different views of the figures, similar elements are provided similar names and reference numerals as those of the previous figure(s). The description of the illustrative embodiments are therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Those of ordinary skill in the art will appreciate that the hardware, firmware/software utility, and software components and basic configuration thereof depicted in the following figures may vary. For example, the illustrative components of data processing system (DPS) 100 (FIG. 1A) and MCD 250 (FIG. 10) are not intended to be exhaustive, but rather are representative to highlight some of the components that are utilized to implement certain of the described embodiments. For example, different configurations of either DPS 100 or MCD 250 may be provided, containing other devices/components, which may be used in addition to or in place of the hardware depicted and/or described, and may be differently configured. The depicted examples are therefore not meant to imply architectural or other limitations with respect to the presently described embodiments and/or the general innovation.

Referring now to the figures, and beginning with FIG. 1A, there is illustrated an example server data processing system (DPS) 100 within which can be implemented various aspects of the disclosure and in particular cargo/shipment tracking, with detection and notification of potential abnormalities that can be indicative of a bad or harmful act against one or more of the shipment related entities, in accordance with one or more embodiments. In one embodiment, DPS 100 can be one sever within a cluster of servers, where the servers can be co-located in a single location and/or geographically dispersed over a plurality of locations. In other embodiments, DPS 100 can be any electronic device such as, but not limited to, a desktop computer, notebook computer, or a single server. Additionally, in one embodiment, DPS 100 can be implemented as a virtual machine sharing hardware resources of a physical server. In one embodiment, DPS 100 operates as a networked computing device providing a cloud infrastructure that supports implementation of a carrier and shipper interfacing and shipment tracking (CSIST) framework. Generally, DPS 100 can operate as both a data aggregator and/or a monitoring center computer. As a data aggregator, DPS 100 receives additional amounts of information from shipment-related entities to enable other features and functionalities, included those described within the parent application. As a monitoring center computer, DPS 100 can be configured with additional methods and components for generating notifications and responding to detected conditions.

Example DPS 100 includes at least one processor, and potentially a plurality of processors, generally referenced hereinafter as central processing unit (CPU) 105. CPU 105 is coupled to system memory 110, non-volatile storage 125, and input/output (I/O) controllers 130 via system interconnect 115. System interconnect 115 can be interchangeably referred to as a system bus, in one or more embodiments. One or more software and/or firmware modules can be loaded into system memory 110 (from storage 125 or other source) during operation of DPS 100. Specifically, in the illustrative embodiment, system memory 110 is shown having therein a plurality of software/firmware modules, including firmware (F/W) 112, basic input/output system (BIOS) 114, operating system (OS) 116, and application(s) 118. Additionally, system memory 110 includes CSIST utility (CSISTU) 120, which includes shipment location tracking and security utility (SLTSU) 122. While shown as a separate module, CSISTU 120 can, in alternate embodiments, be provided as one of applications 118 and/or as an executable component within F/W 112 or OS 116. Additionally, while presented as a module within CSISTU 120, SLTSU 122 can be a separate, stand-alone module, in alternate embodiments and can be executed independent of (i.e., without requiring the concurrent execution of) CSISTU 120. The software and/or firmware modules within system memory 110 enable DPS 100 to provide varying features and functionality when their corresponding program code is executed by CPU 105 or by secondary processing devices (not specifically shown) within DPS 100.

I/O controllers 130 support connection by and processing of signals from one or more connected input device(s) 132. I/O devices 132 include microphone 134, keyboard 136, and pointing/touch device 138, each illustrated, by way of example, and not intended to be limiting on the disclosure. Pointing/touch device 138 can be a mouse or a touch pad, or stylus, for example. It is appreciated that input devices can also include, as a non-exclusive list, hardware button(s), touch screen, infrared (IR) sensor, a fingerprint scanner, and the like. I/O controllers 130 also support connection with and forwarding of output signals to one or more connected output devices, including display 144 and other output devices 148. Display 144 can include a touch screen (not shown) that serves as a tactile input device. In one embodiment, DPS 100 also includes a graphics processing unit (GPU) 146, which is communicatively (or physically) coupled to display 144 and to processor 105. GPU 146 controls the generation and presentation of certain user interfaces (UIs) that are created during execution of CSISTU 120 and/or SLTSU 122 by CPU 105. As a specific embodiment, and as described in greater detail below, SLTSU 122 generates shipment tracking user interface (STUI) 145, which is presented on display 144 and on which a grouping of co-located signal representations are presented and monitored for detection of security breaches with the associated shipment. In one or more embodiments, STUI 145 can also be interchangeably referred to herein as a location signal visual representation UI, which describes the base functions provided by STUI 145 of co-locating and tracking the location signal assigned to the shipment-related entities in a shipment group as visual representations (also interchangeably referred to as visual icons or dots).

Figure 1B:
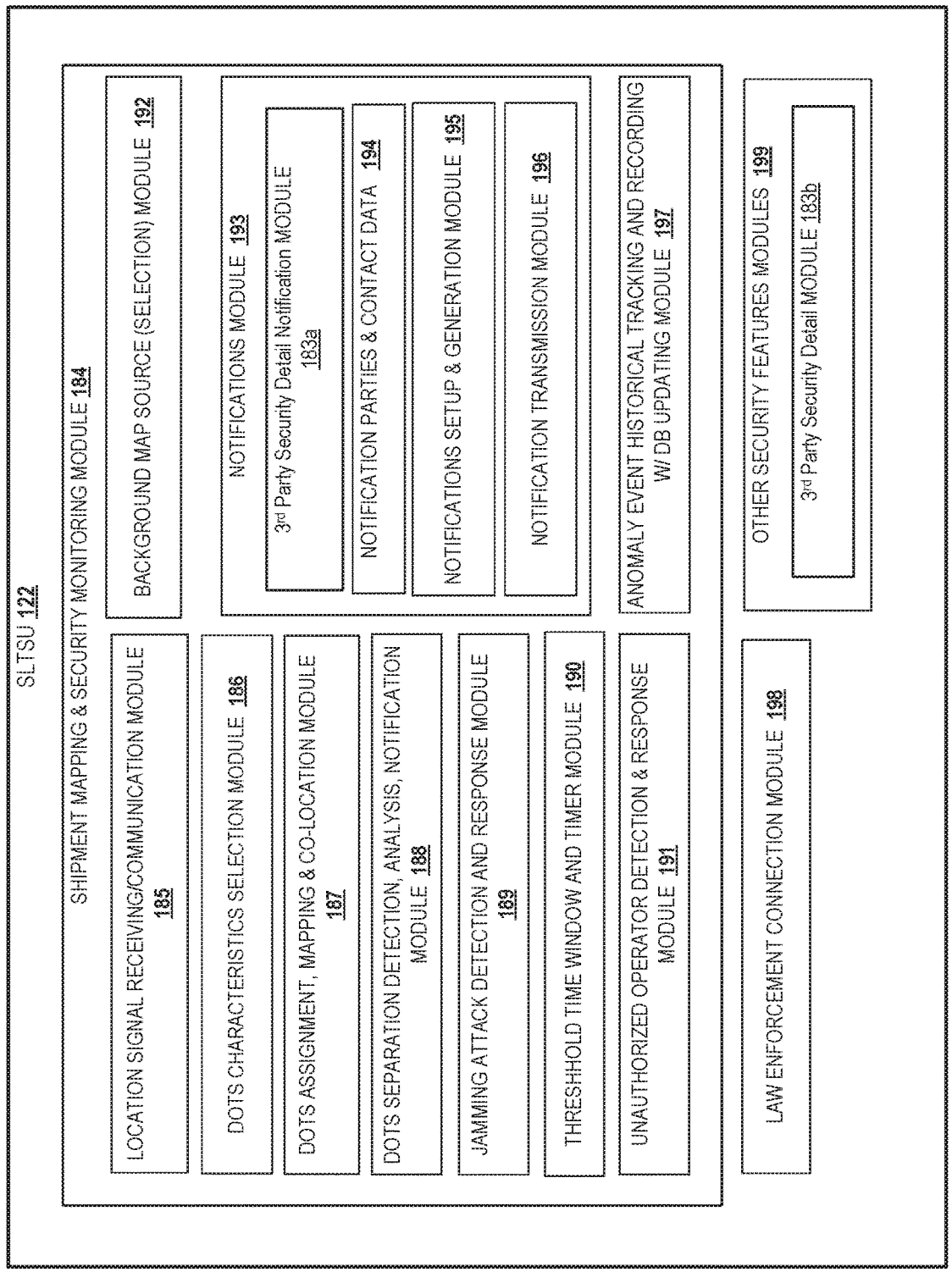
FIG. 1B provides a block diagram representation of example functional modules of a shipment location tracking and security utility (SLTSU) within the DPS of FIG. 1A, in accordance with one or more embodiments.

FIG. 1B provides a block diagram representation of some of the functional (software) modules that performs the various features and operations of SLTSU 122 when executed by processor 105. Included within SLTSU 122 is a shipment mapping and security monitoring module 184, which in turn includes, without limitation, locations signal receiving/communication module 185; visual representations' characteristics selection module 186; visual representations assignment, mapping and co-location module 187; visual representations separation detection, analysis, notification module 188; jamming attack detection and response module 189; threshold time window and timer module 190; unauthorized operator detection and response module 191; background map source (selection) module 192; notifications module 193; and anomaly event historical tracking and recording module 197; which provides database updating features. Within notifications module 193 are third party security detail notification module 183a, notification parties and contact data 194, notifications set up and generation module 195, and notification transmission module 196. It is appreciated that the functions performed by one or more of the module may overlap and that the presentation of specific modules with specific, functionally-descriptive names applied to the modules is not intended to in any way limit or define the actual makeup of SLTSU 122, in other embodiments. In addition to the modules within shipment mapping and security monitoring module 184, SLTSU 122 also includes law enforcement connection module 198 and other security features modules 199, which serves as a general catch-all for the other modules possible within STLSU 122. In the illustrated embodiment, other security features modules 199 includes third party security detail module 183b.

Referring again to FIG. 1A, in one or more embodiments, one or more device interfaces 140, such as an optical reader, a universal serial bus (USB), a card reader, Personal Computer Memory Card International Association (PCMIA) slot, and/or a high-definition multimedia interface (HDMI), can be associated with DPS 100. Device interface(s) 140 can be utilized to enable data to be read from or stored to corresponding removable storage device(s) (RSD) 142, such as a compact disk (CD), digital video disk (DVD), flash drive, or flash memory card. In one or more embodiments, device interfaces 140 can further include General Purpose I/O interfaces, such as Inter-Integrated Circuit (I$^2$C), System Management Bus (SMBus), and peripheral component interconnect (PCI) buses. In accordance with one embodiment, the functional modules (e.g., SLTSU 122) described herein and the various aspects of the disclosure can be provided as a computer program product. The computer program product includes removable storage device(s) 142 as a computer readable storage medium, on which is stored program code when executed by a processor causes the processor to implement the various functions described herein, including, but not limited to, the features presented in the flow charts of FIGS. 7, 8A, 8B, and 9.

DPS 100 further includes network interface device (NID) 160, which can include both wired and wireless networking devices (not specifically shown). NID 160 enables DPS 100 and/or components within DPS 100 to communicate and/or interface with other devices, services, and components that are located external to DPS 100. In one embodiment, DPS 100 may directly connect to one or more of these external devices, via NID 160, such as via a direct wire or wireless connection. In one or more embodiments, DPS 100 connects to specific external devices, services, and/or components, such as Remote CSIST server(s) 175 and cloud database (DB) 180, via external network 170, using one or more communication protocols. In the illustrative embodiment, cloud DB 180 includes respective data storage for CSISTU and SLTSU, namely remote CSISTU DB 150' and remote SLTSU DB 182'. Also, in embodiments with assigned security detail, cloud DB 180 also includes security detail DB (SD DB) 151. It is appreciated that while shown as separate databases, each DB can be a subset of a larger database. For example, SD DB 151 can be a subset of remote CSISTU DB 150' or remote SLTSU DB 182'.

Network 170 can be a local area network, wide area network, personal area network, and the like, and the connection to and/or between network 170 and DPS 100 can be wired or wireless (via access point 165) or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet. In one embodiment, CSISTU 120 provides an interactive framework that is accessible via the Internet (170) as a website having one or more domain names affiliated therewith.

As one aspect of the disclosure, CSISTU 120 and SLTSU 122 include a plurality of functional modules that execute on CPU 105 to perform specific functions, and these functional modules utilize and/or generate specific data, which data is stored as information and/or data within storage 125 and/or within cloud database 180. As an example, storage 125 is shown to include CSISTU 120 and CSISTU DB 150, which includes different blocks of data, including Maps 152, carrier and operator data 154, equipment data 156, third party security detail information 157, shipper data 158, and law enforcement (LE) connect data 159. Also, cloud database 180 is shown to include a copy of CSIST DB 150. Both locally-stored and remote CSISTU DBs 150, 150' store relevant data utilized by CSISTU 120 to perform the personalization of certain UIs and locating of tractor-trailers and/or shipments on a displayed map. Access to the CSIST DB 151 at remote, cloud DB 180 is provided via the connection through network 170.

Similarly, storage 125 also includes a copy of SLTSU 122 and remote SLTSU DB 182'. Also, both locally-stored and remote SLTSU DBs 182' store relevant data utilized by SLTSU 122 to perform the visual representations mapping and the monitoring for and identifying security breaches and other notification features described herein. In one or more embodiments, SLTSU DB 182 and remote SLTSU DB 182' contain historical data about previous shipments, including environmental and other events, such as detected anomalies/deviations in co-location and movement of the visual representations that correspond to certain types of security breaches. SLTSU DB 182 and remote SLTSU DB 182' also contains information about the notifications and other responsive actions that resulted in successful resolution of detected anomalies/deviations and/or confirmed security breaches.

Figure 2:
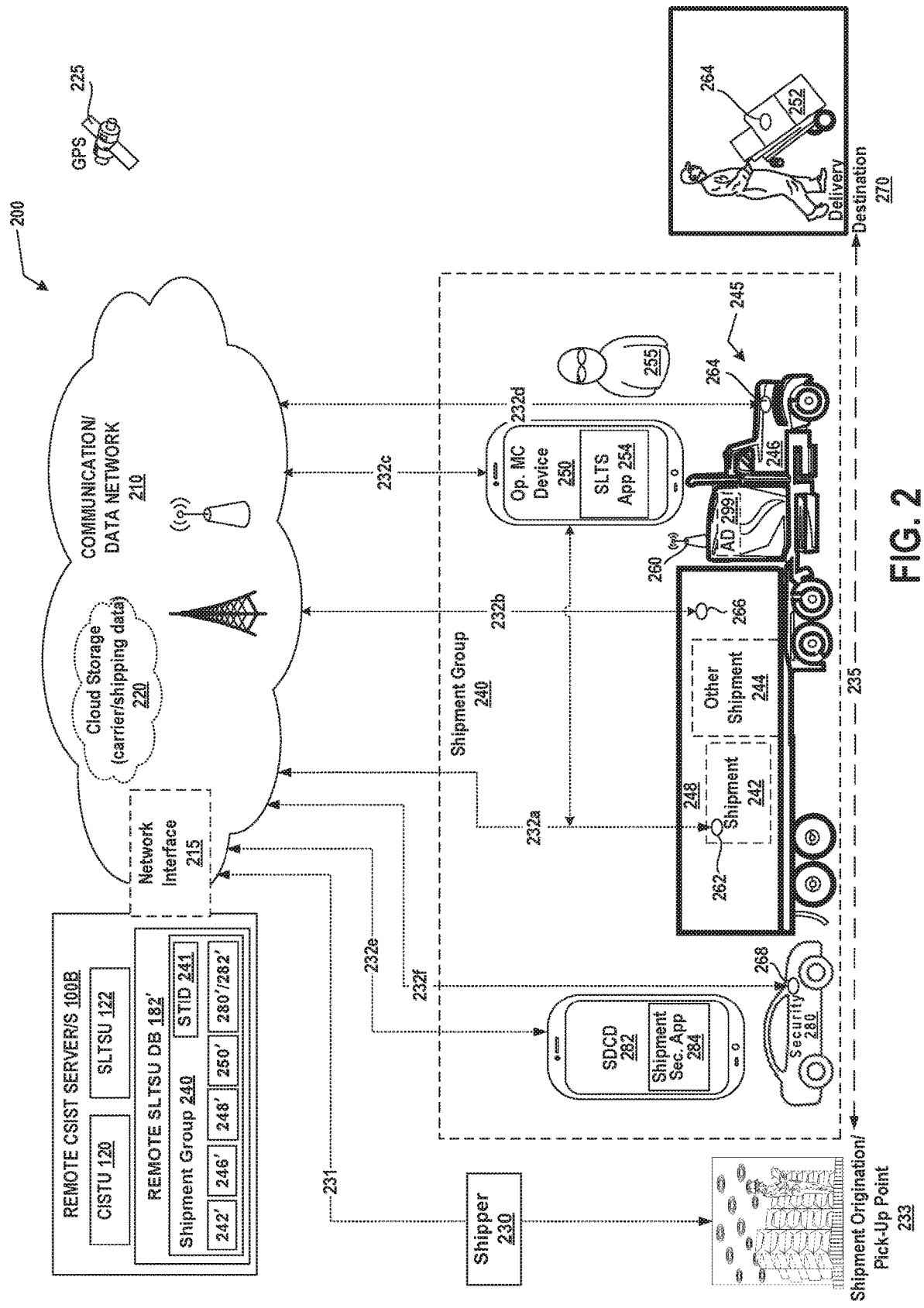
FIG. 2 illustrates an example shipment tracking communication environment that includes shipment-related entities configured with location tracking devices that communicate location signals to a monitoring computer via a communication network, according to one or more embodiments.

FIG. 2 illustrates an example communication infrastructure (or communication network environment) 200 that extends the functionality of a CSIST framework to enable the various features and functionality provided by the disclosure. These features and functionality include, but are not limited to, enabling GUI-based location tracking of shipment-related entities (via visually representing the location signals on a STUI), monitoring for anomalies indicative of a potential security breach, and identifying the types of anomalies based on changes in the location signals received via communication infrastructure 200 from the different shipment-related entities, according to one or more embodiments. Communication infrastructure 200 generally includes data processing system (illustrated as remote CSIST server(s)) 100B within which is provided CISTU 120, SLTSU 122 and an associated remote SLTSU DB 182'. Remote SLTSU DB 182' is shown to include an example shipment group 140. Shipment group 140 includes identifiers representative of four shipment-related entities 242', 246', 248', 250' and an assigned security detail 280' (or SD communication device 282'). Shipment group 140 has been assigned a unique shipment tracking identifier (STID) 241 by SLTSU 122.

Communication infrastructure 200 also includes communication/data network 210 (which can be synonymous with network 170). Communication/data network 210 includes a plurality of communication devices and subnetworks that enable voice, data, and other forms of communication. Communication/data network 210 supports transmission of wirelessly communicated signals via intermediary receiving devices, such as antennas and access points. Communication/data network 210 also includes cloud storage 220 for storing relevant carrier and shipping data and other historical data utilized by SLTSU 122. Network interface 215 enables communication of location signals and other data and/or information between data processing system 100 and communication/data network 210. Communication infrastructure 200 further includes global position satellite (GPS) 225 as an example of one technology for determining a current geographical location of a shipment-related entity, as described herein. Communication infrastructure 200 includes a communication link 231 with shipper 230, who manages pickup and transportation of shipment 242 from shipment origination point 233. The shipment 242 is transported as a part of a shipment group 240 to shipment delivery destination 270 via a shipping route 235.

Communication infrastructure 200 further includes a plurality of communication links 232a-23f, each providing location signals transmitted from (or for) a corresponding shipment-related entity and/or assigned security detail 280 within shipment group 240. As illustrated within communication infrastructure 200, shipment group 240 is generally comprised of shipment/cargo 242, combined tractor-trailer equipment 245, operator 255, operator MCD 250, security detail 280 and/or SD communication device (SDCD) 282, each having a location tracking mechanism for providing a unique location signal that is communicated to data processing system 100 via network 210. In one alternate embodiment, each of tractor (vehicle) 246 and trailer (container) 248 is equipped with a separate location tracking mechanism, such that each can be tracked separately.

As shown, location tracking mechanism 262 of shipment 242 transmits first location signal 232a (via the corresponding communication link) to communication/data (C/D) network 210, location tracking mechanism 266 of trailer/container 248 transmits second location signal 232b (via the corresponding communication link) to C/D network 210, location tracking mechanism (e.g., GPS) of operator MCD 250 transmits third location signal 232c (via the corresponding communication link) to C/D network 210, and location tracking mechanism 264 of tractor/truck 246 transmits fourth location signal 232d (via the corresponding communication link) to C/D network 210. Additionally, one or both location tracking mechanisms 268 (or GPS) of security detail 280 or SD communication device (SDCD) 282 transmits fifth/sixth location signal(s) 232e/232f (via the corresponding communication link(s)) to C/D network 210. In one embodiment, the location tracking mechanism that is placed on/in one or more of the shipment-related entities or security detail is a transponder that transmits a unique transponder signal. In other embodiments, the location tracking mechanism can be a more sophisticated device, as is generally known to those skilled in the art. For example, the operator's MCD 250 or the SDCD 282 can rely on cell tower triangulation for location detection or GPS-based location detection.

As illustrated, the operator's MCD 250 is configured with one or more applications, including shipment location tracking and security (SLTS) app 254, which enables the localized tracking of the shipment 242 and tractor-trailer 245 by operator, as described in greater detail within the description of FIG. 10. As also illustrated, SDCD 282 is also configured with one more applications, including, but not limited to shipment security app 284. Both apps 254 and 284 can be downloaded, via network 210, or otherwise loaded onto the respective communication devices, 250, 282 from a server associated with or supporting shipment monitoring system and affiliated CSIST servers.

According to one or more embodiments, location tracking mechanism 262 (e.g., transponder) of shipment 242 can be attached to either the exterior or interior of the case or packaging for that shipment 242. According to one or more embodiments, a local accumulation device (AD) 299 or one or both communication devices (250, 282) accumulates data received from a plurality of transponders, and the collected transponder signals/data are transmitted back to CSIST server 100B. In one embodiment, all of the transponder data is received by a single collection point within tractor-trailer 245, and the local accumulation device 299 compiles the received data utilizing a proprietary compilation method. The local accumulation device 299 then forwards the accumulated data (optionally via a proprietary transmission protocol) to CSIST server 100B for processing via CSIST utility 120 and/or SLTSU 122. In one embodiment, the transponder 262 is a part of a sensor system that captures different information about or associated with the shipment 242, including but not limited to: real time positioning; cargo environment, such as temperature and humidity; event occurrence; motion, intrusion, and other activities affecting cargo. In one embodiment, operator equipment (i.e., tractor-trailer 245) includes a mobile hotspot 260 that enables communication from operator equipment (245) back to CSIST server 100B via communication network 210.

Communication infrastructure 200 enables efficient communication with carriers or operators and supports the monitoring and tracking of the various shipment-related entities within shipment group 240. In one embodiment, communication infrastructure 200 is also configured to receive real-time or projected information about the environment, such as weather conditions, along the shipping route 235 that can affect the security of the equipment and/or the cargo, according to one embodiment.

As one aspect, the shipment tracking system of a CSIST framework also provides various types of information about the carriers, operators, available security detail, trailer-tractor equipment, and shipping routes to facilitate shipper selection of specific carriers for transporting specific shipments. According to one aspect, CSIST server 100B also implements a selection process for identifying and selecting a best operator and equipment for a particular shipment, based in part on the carrier profiles and other received external inputs. In one embodiment, one important data utilized in selecting the carrier/operator/equipment is inclusion of a location transponder on the tractor-trailer and location tracking capability for the operator MCD 250.

While not shown, it is contemplated that, in one embodiment, operator 255 can also be provided with a separate transponder to enable a location of operator to be ascertained relative to the shipment, for instances in which operator 255 may leave his MCD 250 inside the tractor or at another location, separate from operator's location. The level of security required for a particular shipment may necessitate the operator 255 agree to wear a tracking device while transporting the shipment.

In another embodiment, as a security measure, the operator MCD 250 is configured to require a biometric input and a login via the biometric input is required prior to accepting the shipment and at each point when the operator stops the equipment along the route. This prevents another person from being able to drive off with the shipment by stealing the operator's MCD 250. Additional security measures may be tied to the equipment, including being able to remotely shut off the engine of the tractor when a theft of equipment has been verified and/or the operator does not to provide the biometric confirmation within a provided time period.

Similar to the above described selection process for operators, a pre-acquired set of information can be utilized to determine when to assign a security detail and which specific security detail to assign to a shipment or shipment group. Factors such as geography, cost, rating assigned to a security detail or parent company, insurance, and the like, can be utilized in determining the selection of a specific security detail from among multiple available security details. It is appreciated that a vetting process is undertaken prior to including any security detail in the list of available security detail for selection and assignment to the shipments. Once assigned, the security detail is expected to remain within a certain pre-determined preferred distance of the shipment, while the shipment group is in route to the destination. The pre-determined preferred distance may take into consideration visibility of the transport vehicle by the security detail personnel, geographic and weather conditions, value of the cargo, among other factors. The pre-determined distance may also be dynamically variable depending on other factors such as road conditions, traffic on the route, geographic location (e.g., hot spots for cargo theft), etc.

Figure 3A:
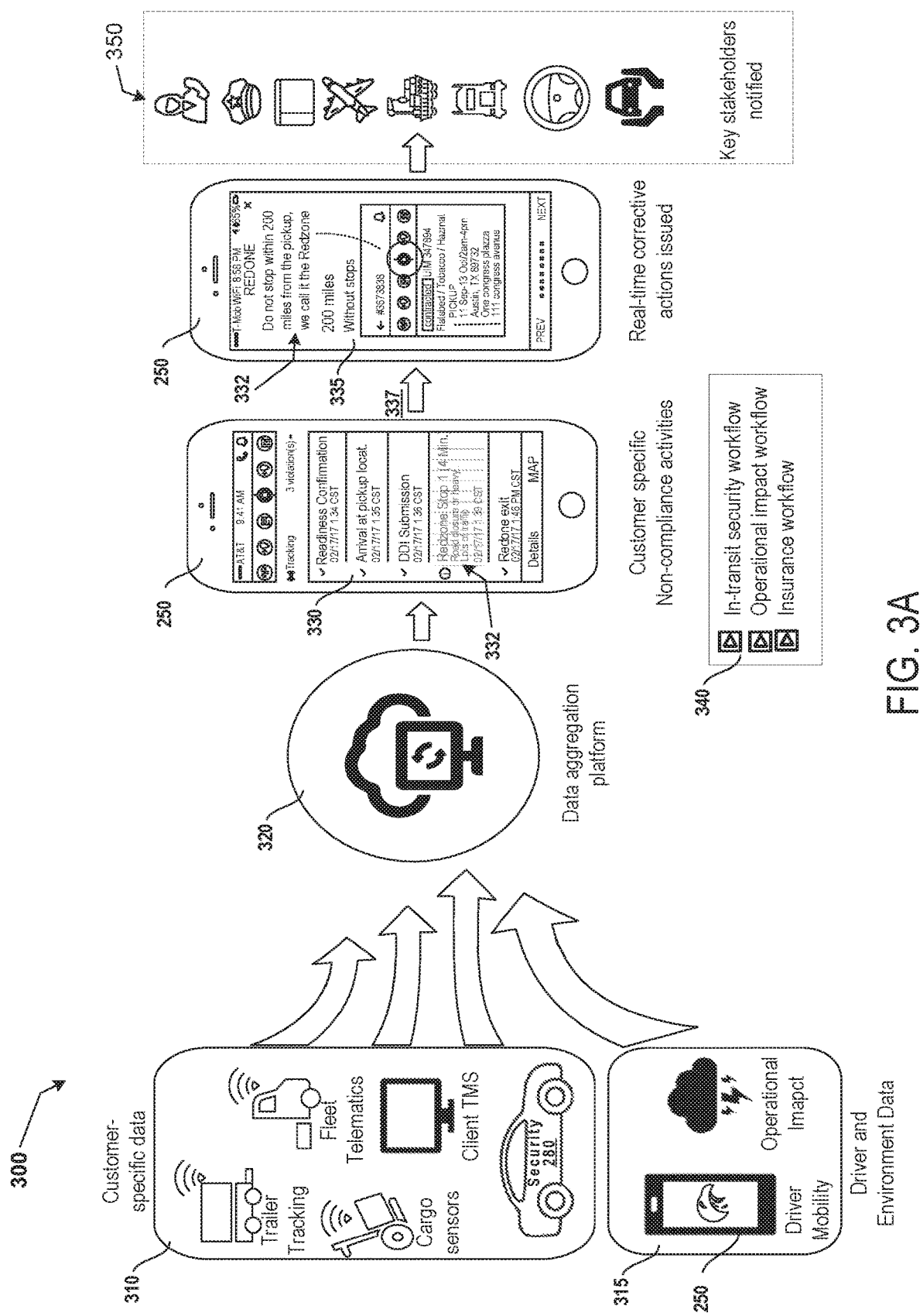
FIG. 3A illustrates an example communication environment with a flow of input data from a variety of different shipment-related entities and environmental sources, with the data being received, compiled and/or aggregated by DPS (FIG. 1) to present specific workflow instructions to a MCD of a driver/operator transporting the shipment, according to one or more embodiments.

Turning now to FIG. 3A, there is illustrated an example shipment information aggregation and communication environment (SIACE) 300 within which specific aspects of the disclosure are implemented. SIACE 300 includes data aggregation platform 320 that receives a plurality of different types of data, including customer-specific data 310 and driver/operator and environmental data 315. For purposes of illustration, security detail data is also included within the customer specific data 310, as the customer may request security detail to accompany the shipment. In one or more embodiments, data aggregation platform 320 is a data processing system or server, such as DPS 100 and/or CSIST server(s) 100B. Customer specific data 310 includes data received from one or more sensors attached to shipment-related entities that are being tracked and/or information received via a client terminal. Driver/Operator and environmental data 315 are data received about the carriers and operators (including the operator MCD) and weather conditions, traffic conditions, and other monitored conditions that are available for access and which can impact the shipments. Data aggregation platform 320 provides a set of shipping related information, including shipment data and operational instructions to an operator mobile device, illustrated as MCD 250 (FIG. 10). In one embodiment, the information is downloaded to operator MCD 250 and/or an SDCD 282 via an operator App (254) that is added to operator MCD 250 (see FIG. 2) or a security detail App (284) that is added to SDCD 282 (see FIG. 2), respectively. In one embodiment, the corresponding App (254 or 284) includes general setup and monitoring of each shipment assigned to the operator or security detail. Details related to the shipment are presented via a shipment user interface (UI) 330 that provides a plurality of different features and functions and information that are accessible to the operator or SD personnel via the respective App (254 or 284).

In at least one of the described and illustrative embodiments, a trucking communication interface system (TCIS) module executing on a computing device is modified to include a shipment tracking utility. The shipment tracking utility enables the computing device to provide the location signal tracking and notification features and functionality presented herein to the operator as a downloadable App (254/284).

In the illustrative embodiment, a set of shipping parameters or operational directives are presented to the operator's MCD 250 and a compliance check is made by the App (254) whether the operator has stayed within the recommended parameters and objectives. When non-compliance is detected, the specific non-compliant event is flagged and/or identified and corrective actions are provided on a second shipment UI 335. Included in the information presented by the first shipment UI 330 are customer specific non-compliance activities that are identified by data aggregation platform 320 or by local execution of the App (254). Included in the information presented by the second shipment UI 335 are real-time corrective actions that are issued to inform the operator to correct the non-compliance. Additionally, a set of user selected options 340 related to various workflow are available through the operator App (254) and displayed within first shipment UI 330 or another UI that is accessible from first shipment UI 330.

According to one embodiment, in response to detection of customer non-compliance with one of the established shipping parameters or operational directives, a notification is generated and transmitted to the key stakeholders (i.e., interested parties, such as the shipper, recipient, carrier, monitoring entity, etc.) associated with the shipment, generally represented as stakeholders 350. According to the presented embodiment, the operator has failed to comply with a redzone directive 332, which requires the operator to drive continuously for a minimum distance (e.g., 200 miles) or minimum amount of time (4 Hours) before stopping once the shipment has been picked up and confirmed by the operator/carrier. In response to the MCD 250 or the background monitoring system (CSIST server 100B) detecting that the shipment has stopped within the redzone distance, the redzone directive 332 is flagged and/or highlighted on first shipment UI 330 and a notification is generated by operator App (254) or CSIST server 100B and issued to operator MCD 250. Notification 337 is received at MCD 250 and is displayed via the second shipment UI 335 to inform the operator of the redzone directive for the shipment. Additional details about the specific shipment can also be accessed from the second shipment UI 335, and the operator is able to review those details by selection of associated icons or menu items. Additionally, where corrective actions are available to the monitoring system, the notification 337 can also include this corrective action. For example, an alternate route can be provided to the operator if the environmental data received by the data aggregation platform 320 indicates that the assigned shipment route is congested with a lot of traffic and that an alternate route exists that would allow the operator to comply with the redzone directives. The occurrence of a non-compliance is recorded to a tracking database for use in future carrier/operator shipment assignment and/or later evaluations of shipment routes, etc. Information about the redzone directive is also shared with the security detail 280 to promote operator compliance.

Figure 3B:
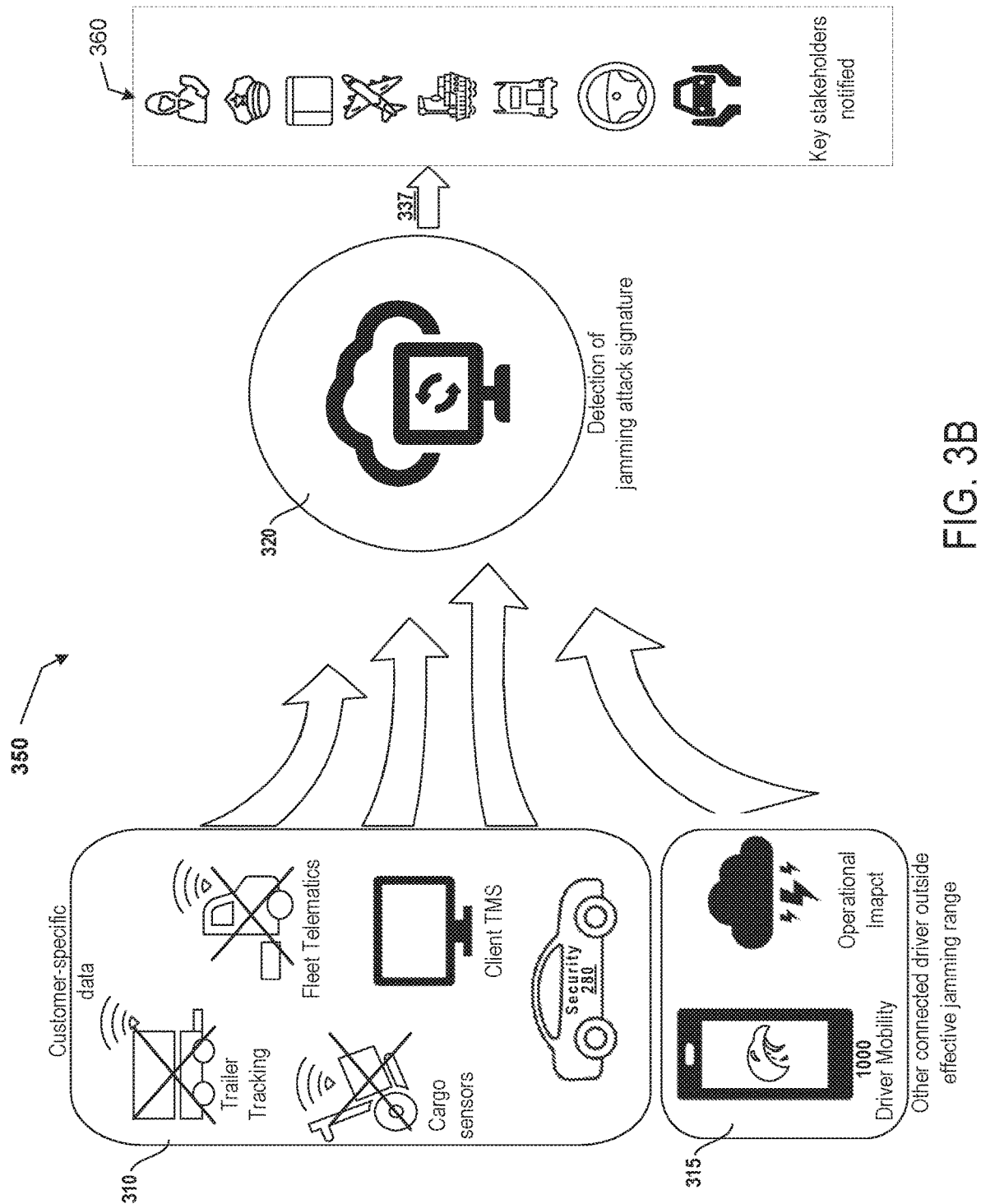
FIG. 3B illustrates an example signal jamming attack within the communication environment of FIG. 3A and the responsive identification of the attack and notification of relevant stakeholders triggered by execution of the SLTSU by aggregation server, in accordance with one embodiment.

FIG. 3B illustrates an example blocked/jammed signal transmission scenario 350 in which the communication infrastructure server or shipment monitoring computing device (i.e., DPS 100 or CSIST Servers 100B) losses reception of the geolocation signals associated with multiple shipment-related entities of a single shipment group. As introduced above, the geolocation signals are used to generate and map a corresponding visual representation, such as a representation that enables tracking and monitoring of the shipment 242 (FIG. 2). When a jamming attack occurs, all of the co-located location signals within a shipment are prevented from being transmitted to and received by the data aggregation platform 320. This scenario typically occurs or is most effective when the operator is not physically inside of the tractor/truck and/or is not close to the tractor-trailer. For example, such attacks frequently occur when the operator has left the tractor-trailer while at a truck-stop. With the current example, the jamming attack does not affect the operators MCD 250 or the tracking device (e.g., SDCD 282) of the security detail 280 (FIG. 2). In response to detecting this concurrent loss of multiple signals from the co-located shipment-related entities, data aggregation platform 320 generates an appropriate notification 337. The notification 337 is forwarded to a selected one or more of the key stakeholders 360. According to one aspect, the key stakeholders 360 include the security detail that is in closest proximity to the shipment and/or shipment-related entities. Notably, in the example shown in FIG. 3B, the customer specific location data 310 related to the trailer, tractor, and cargo are blocked and are therefore not received by the data aggregation platform 320. However, because the operator MCD 250—is not in the immediate location of the shipment/tractor-trailer and has not been blocked, data aggregation platform 320 transmits the generated notification 337 to the operator MCD 250 to alert the operator via operator MCD 250 of the jamming attack on the shipment. Similarly, because the security detail 280 is not in the immediate location of the shipment/tractor-trailer and has not been jammed, data aggregation platform 320 transmits the generated notification 337 to the security detail 280 to alert the SD personnel of the jamming attack on the shipment. Notably, the security detail 280 can receive this notification 337 even if the operator is also inside of the transport vehicle and the operator's MCD 250 is also being jammed. In one embodiment, given its proximity to the shipment-related entities, the SDCD 282 can be directly linked to the location sensors of the shipment-related entities via near field communication (NFC) or Bluetooth, and the security detail 280 is thus able to immediately detect and respond, in real-time, when a jamming attack is initiated in proximity to the shipment-related entities. The security detail 280 is also able to immediately notify the other relevant or interested parties, including the shipment tracking and monitoring system, and/or provide confirmation of what is occurring with the shipment. This notification can be manually triggered by the SD personnel or can alternatively be automated as one feature provided by the security detail App 284 (FIG. 2).

Figure 4A:
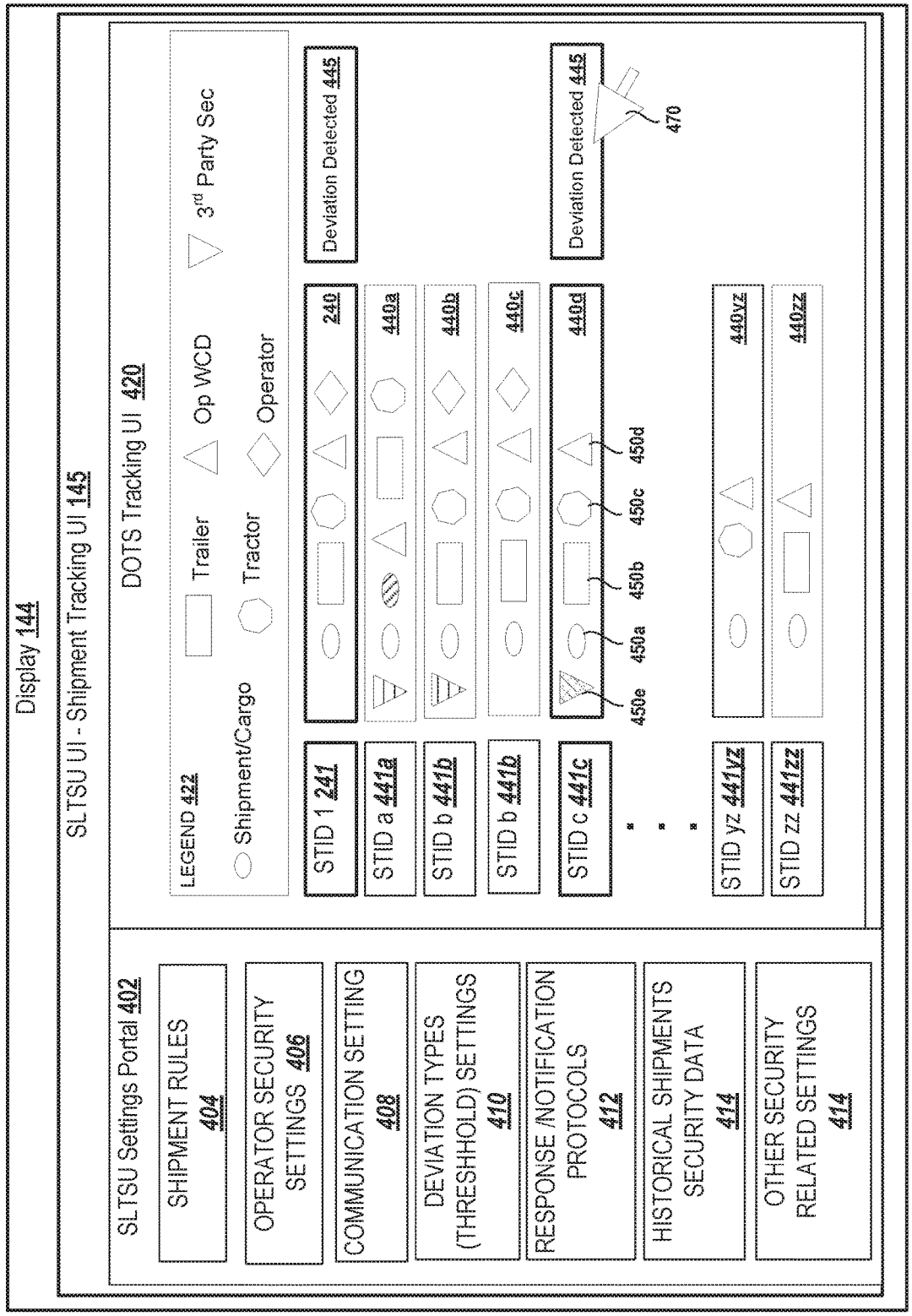
FIG. 4A is a block diagram representation of content presented within an example shipment tracking user interface (STUI) providing the tracking of shipment groups using co-located visual representations, according, according to a plurality of embodiments.

FIG. 4A illustrates components and features of STUI 145 presented in display 144 of DPS 100. As shown by FIG. 4, STUI 145 includes an SLTSU settings portal 402, in which a plurality of settings can be entered to manage the performance of SLTSU 122 and STUI 145. Included within SLTSU settings portal 402 are settings associated with shipment rules 404, operator security protocols 406, communication 408, deviation types and associated threshold values 410, security breach detection response/notification protocols 412, historical security events data storage 414, and other related security features 414.

STUI 145 also includes location signal tracking UI 420, which can be synonymous with and interchangeably presented and described as STUI 145, in some embodiments. Because the visual representations of the location signals are seen as dots on a larger screen, the location signal tracking UI 420 is also interchangeably referred to as Dots tracking UI 420. Dots tracking UI 420 includes a legend 422*a*, which identifies a type of visual representation (i.e., a visible marker or icon) from among a plurality of different types of visual representations, that is assigned to the location signal of each of the shipment-related entities in a shipment group. For simplicity, the visual representations are interchangeably referred to as "dots" and/or "icons" throughout the description. Six distinct visual representations are illustrated, respectively associated with shipment or cargo, trailer, tractor, operator MCD, operator, and third-party security detail. Each shipment group 240, 440*a*-440*zz* has an assigned unique STID 241, 441*a*-441*zz*. However, not all shipment groups include all six of the visual representations, and in particular, some of the shipment groups do not include an operator visual representation and others of the shipment groups do not include a visual representation of a security detail. Also, as presented by shipment group 440*a*, multiple different shipments (cargo) can be tracked within a same group 440*a*. Specifically, as shown, a second shipment (e.g., other shipment 244) being transported by the same tractor-trailer and having its own unique location signal can be simultaneously tracked via a visual representation 450*f* within the created shipment group 440*a*. Different distinguishing characteristics (e.g., a striped pattern representing a different color) can are assigned to the different visual representations within the shared shipment group 440*a*. In one embodiment, each piece of cargo can be visually presented with a different visual representation type (e.g., color or shape), which allows for selection and specific identification of the specific cargo relative to the other cargo being tracked by associated respective visual representations. In another embodiment, each operator is also uniquely identified relative to other operators (e.g., assigned a unique operator ID), and each truck or other shipping vehicle is provided a unique signature and is thus trackable via that unique signature. The unique signatures of the location signals are wirelessly transmitted to a monitoring station, such as CSIST server 100B, via a network entity, such as a base station or access point.

Additionally, as illustrated by the last two shipment groups 440*yz*, 440*zz*, the tractor-trailer can be represented by a single visual representation when only one transponder is associated with the combined tractor-trailer equipment. Thus, the SLTSU 122 configures the DPS 100 to visually present each shipment-related entity and the security detail within a shipment group as visually distinct representations on the shipment tracking UI 145, using one or more of (i) a different visual representation type and (ii) different characteristics applied to a same visual representation type. No security detail is assigned to and thus no visual representation of a security detail is provided with specific shipment groups 240, 440*c*, 440*yz*, 440*zz*

STUI 145 is also provided to illustrate the detection of a deviation in two of the presented shipment groups. In the illustrated embodiment, SLTSU 122 generates a deviation detected/notification icon/button 445 and highlights the group for which the deviation is detected. It is appreciated that in other embodiments, the presentation of the deviation detected/notification icon/button 445 can be optional, and SLTSU 122 can configure DPS 100 (FIG. 1) to simply highlight one or more of the STID 241, 441 or the shipment group 240, 440 for which the deviation is detected. In yet another embodiment, the deviation can be signaled by highlighting a specific one of visual representations (e.g., one of visual representation 450*a*/450*b*/450*c*/450*d*/450*e*) from among the plurality of co-located visual representations 450*a*, 450*b*, 450*c*, 4150*d*, 450*e* of shipment group 440*d* for which the deviation is detected. As thus presented by FIG. 4A, a deviation involving the security detail is detected and the corresponding visual representation 450*e* is highlighted. According to the described embodiments, when a user selects the "deviation detected" notification button 445, a second shipment user interface (e.g., 452, FIG. 4B) opens to provide specific details about the shipment and the detected deviation.

Thus, the SLTSU 122 further enables DPS 100 to generate and display, on the display device 144, the first shipment tracking user interface (UI) (e.g., 330, FIG. 3A) displaying each of a plurality of shipment groups being simultaneously tracked, and to indicate, within the first shipment tracking UI, when an anomaly has been detected in one of the plurality of shipment groups. In one embodiment, a listing of the shipment groups is presented. However, in alternate embodiments, shipment groups are presented according to their geographic locations on a map of a monitored area or areas. With the alternate embodiment, an option to toggle between a geographic map view and a list view is provided, and the list that populates the list view then corresponds to the shipment groups within a particular selected geographic location (e.g., Austin, Tex.). In one embodiment, SLTSU 122 can present, within STUI, selectable options for entry of a street address or other geographic coordinate to narrow the range of shipment groups presented on the STUI. Additionally, in one or more embodiment, different views can be pre-programmed for searching. For example, SLTSU 122 can be pre-programmed with options for searching by carrier, shipper, recipient, type of shipment, origination of shipment, destination of shipment, route being taken, or general text based (word or context matching) query. It is appreciated that the list is not exclusive and not intended to convey any limitations with respect to the options provided for generating specific lists of shipment groups being tracked/monitored via co-located visual representations.

As further illustrated by FIG. 4A, DPS 100 presents each location tracking signal within a shipment group as a separate visual representation co-located with other visual representations, each corresponding to the location tracking signal of a shipment entity within the shipment group. In one embodiment, DPS 100 also co-locates and presents the visual representations representing each of the received location signals with a spatial alignment showing a separation distance of the shipment-related entities. Based on the type of location signaling mechanism, DPS 100 periodically receives updated location signals from one or more of the shipment-related entities and updates the presentation of the plurality of co-located visual representations on the UI based on the updated location signals.

Additionally, in one embodiment, the SLTSU 122 further enables DPS 100 to provide a geographic mapping of the plurality of co-located visual representations on the UI (e.g., by superimposing the visual representations on a map of the specific area) and compare a present location of the co-located visual representations to at least one of an intended shipment delivery destination and a current expected location of the shipment. DPS 100 identifies, based on the present location, if there has been a route deviation by the operator and/or the security detail that is outside of an acceptable range of deviation from a pre-scheduled route, and DPS 100 generates and transmits at least one notification signal to inform one or more of the operator, the carrier, the shipper, the security detail or security detail company, or other interested party about the deviation and to correct the deviation.

Figure 4B:
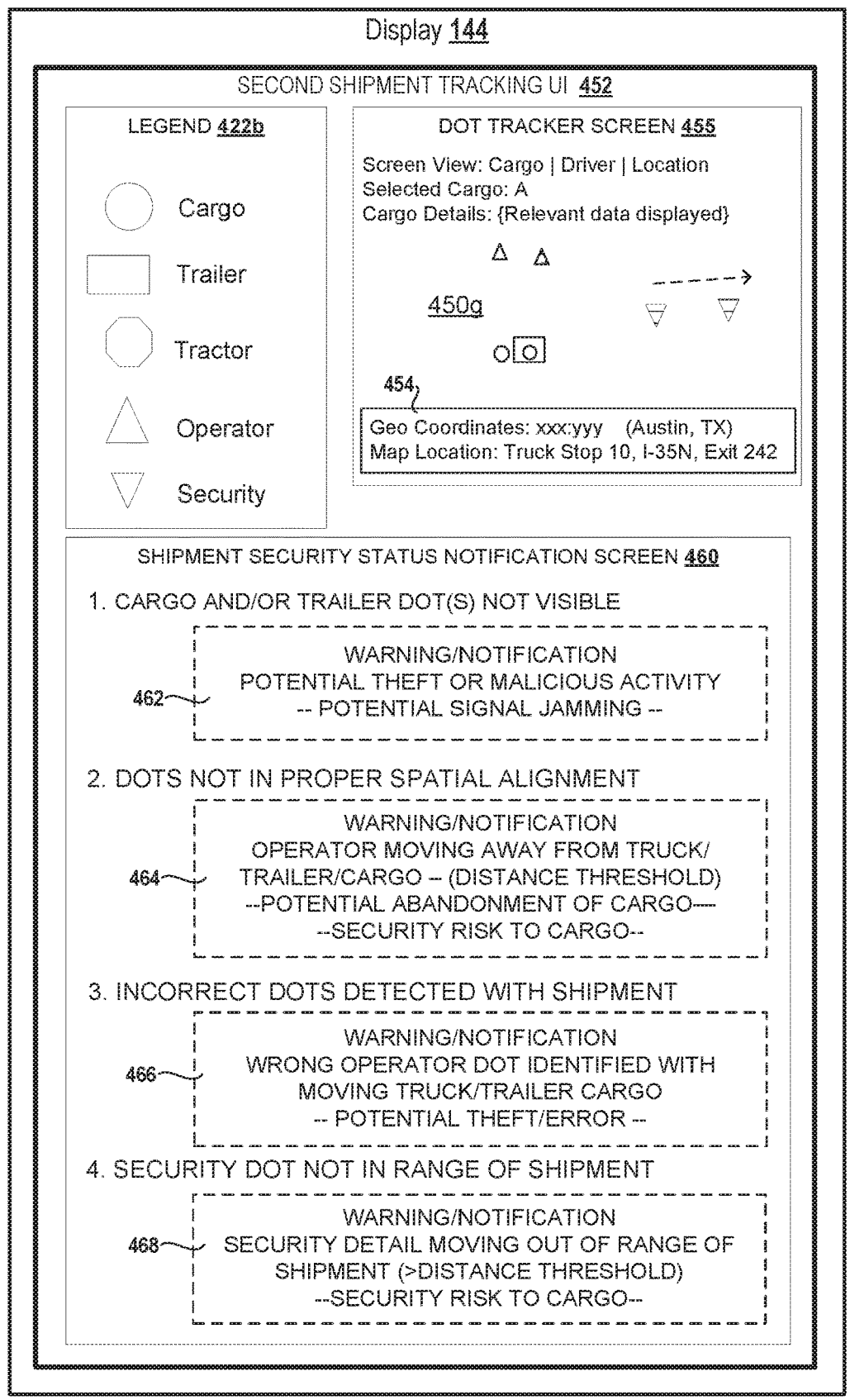
FIG. 4B illustrates a second STUI, which presents a focused view of a selected, single shipment group, according to one or more embodiments.

FIG. 4B illustrates an example second STUI 452 for a single shipment group that is selected (such as by pointing device 470) from among the available signal groups within first STUI 145 of FIG. 4A. Second STUI 452 is opened on display 144 as a new window or an embedded window within first STUI 145. Second STUI 452 includes legend 422b presenting a mapping of the shipment-related entities and the security detail begin tracked with corresponding visual representations as a part of a shipment group. Second STUI 452 also includes a location signal tracking screen (or dot tracker screen) 455 within which is displayed a set of visual representations 450g related to the shipment-related entities and security detail. In the presented embodiment, the geo-location can be a truck stop or fuel stop. A first shipment group that is being tracked and for which the second STUI 452 was opened is presented within dot tracker screen 455, with the relative position of each shipment-related entity identified thereon.

In one embodiment, for security and other reasons, second STUI 452 may be modified to also present visual representations (not shown) associated with a second shipment group that is in the same general location as the first shipment group. By DPS 100 (or App 284 within SDCD 282) presenting a grouping of dots associated with second shipment group, security detail 280 is made aware of the overlap in geographic space. Thus, in one embodiment, if the visual representation of the operator location signal for the second shipment group becomes co-located with and moves in unison with the visual representation of the location signal of the equipment and/or shipment of the first shipment group, an anomaly is detected and responsive actions are taken to protect the shipment from being taken by the wrong ("un-authorized") operator. Dot tracker screen 455 includes a geo-location coordinate bar 454 that provides the actual geographic and/or GPS and/or map location of the first shipment group being tracked by the security detail 280.

At the bottom of second STUI 452 is a shipment security status notification screen 460, which provides a current notification status of the shipment. The notification status can include one or more detected anomalies and their corresponding notification/warning messages 462, 464, 466, 468 that are individually displayed within second STUI 452 when a corresponding anomaly is detected. Four of the plurality of possible scenarios that trigger a corresponding notification 462, 464, 466, 468 are presented. It is appreciated that a much larger number of scenarios that are detected and/or identified as anomalies are contemplated and/or possible, and that each anomaly can trigger a different notification or response. Thus, the presentation of only four scenarios are for example and not intended to limit the scope of the disclosure. While, in the illustrated embodiment, all four notifications 462, 464, 466, 468 are simultaneously shown within STUI, it is appreciated that in actual execution, only one notification would be generated and displayed, based on the actual detected anomaly, unless multiple anomalies are simultaneously detected. The situation that triggers the fourth notification 468 is illustrated by the visual representation 450e (FIG. 4A) of the security detail 280 (i.e., the security dot) moving away from the shipment-related entities at a specific velocity or being outside of a pre-set threshold distance from the shipment. This situation results in an SD-related notification (468), where the lack of the security detail 280 is understood to increase the security risk to the cargo.

Referring now to FIGS. 5A-5H and 6A-6D, there are illustrated several different examples of the types of deviations that can be detected by SLTSU 122 based on the presentation and relative spacing of the location signals as visual representations on STUI 145 (FIG. 4A). FIGS. 5A-5H and 6A-6D are a plurality of example location signal or dot tracking UIs presenting focused views within examples of second STUI 452 of a single shipment group, selected from among the plurality of shipment groups presented within STUI 145 of FIG. 4A. In FIG. 5A-5H, each dot tracking UI 500 includes a status notification bar 510 that presents a current status of the corresponding shipment based, at least in part, on the presence, relative alignment, and movement of the location signals (or the corresponding visual representations/dots/icons) representing the shipment-related entities and security detail within a shipment group. In addition to the status notification bar 510, each dot tracker UI 500 includes additional information/data about the particular shipment, operator and tractor-trailer equipment, security detail, geolocation data, and movement tracking data, each of which can be selected by a user to present additional relevant details about the selected item. Within the various figures, immediate visual notification of an anomaly, deviation, or other condition that triggers a potential security breach is presented as bolded font. In actual implementation, the visual notification can be an applied highlight color or flashing of specific content within the UI 500. Notably, in addition to the notification or alert being highlighted, relevant sets of tracking information related to one aspect of the shipment can also be highlighted (bolded) to direct the monitoring personnel's attention to access that relevant/associated tracking information.

In one or more embodiments, FIGS. 5A-5D and 6A-6D are generated in response to selection within STUI 145 (FIG. 4A) of one STID 241, 441, selection of one shipment grouping 240, 440, or selection of deviation notification icon 445, or more specifically, within dot tracking UI 420. Thus, SLTSU 122 configures DPS 100 to perform the functions of: in response to detecting a selection of the unique STID or visual representation of a specific shipment group being displayed STIU, generate and display, on the display device 144, a second shipment tracking UI (452). The second shipment tracking UI 452 provides detailed information about a corresponding shipment and a current or last recorded location of each shipment-related entity. The second STUI 452 also provides the security detail of the shipment group relative to a location of each other shipment-related entity and in relation to a geographic or location coordinate of the shipment-related entities. In one embodiment, in response to placing the shipment in the enhanced watch/monitoring state, DPS 100 automatically generates and displays a second shipment tracking UI (e.g., dots tracking UI 500a, FIG. 5A) providing additional shipment details corresponding to the shipment and the shipment-related entities and the security detail within the shipment group.

Figure 5A:
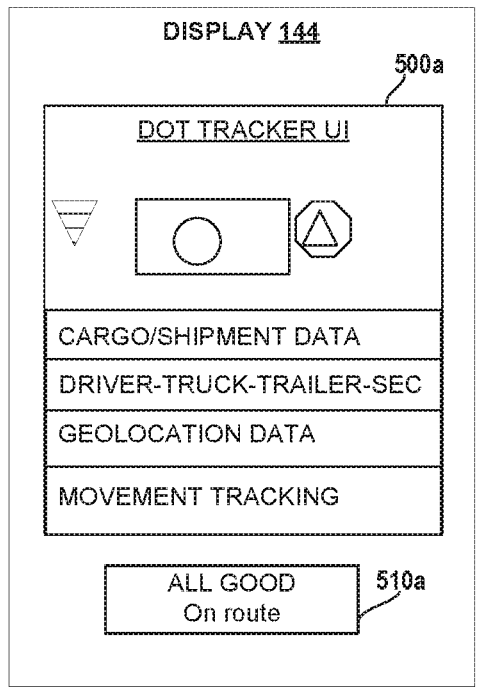
FIGS. 5A-5H and 6A-6D respectively illustrate example representations of shipment tracking user interfaces (STUIs) that present a focused view of co-located shipment-related entities of a particular shipment being monitored, including warnings/notifications identifying any anomalies occurring with the shipment, according to one or more embodiments.

Referring to FIG. 5A, there is illustrated first example dots tracking UI 500a, in which the visual representations are spatially aligned in the correct order (see, for example, FIG. 5A) and within the acceptable range of distance from each other. For example, in the illustrated embodiments, the shipment location signal (and by extension, the visual representation) is expected to be within or proximate to the location signal of the trailer (and by extension, the visual representation), while the tractor location signal is expected to be ahead of both other location signals when moving towards the intended delivery destination (assuming the route information is known and including in the shipping information stored by within the SLTSU DB 182). Further, the operator MCD location signal and/or the operator location signal is expected to be inside of in close proximity to the tractor location signal when the shipment is moving. Depending on the type of security detail, the location signal of the security detail or SDCD 282 is expected to be within a distance range of the shipment-related entities. Additionally, the visual representations are moving in unison with each other, at an acceptable velocity along a shipment route towards a delivery destination. With these conditions, SLTSU provides an ALL GOOD notification shown in notification status bar 510a as there are no deviations or anomalies detected that present a security risk to the shipment. It is appreciated that the spatial alignment of the visual representations and separation distance are parameters that can be different from one shipment to another.

In each of the presented embodiments, the operator's location is tracked via the location signal received from operator MCD 250 (FIG. 2), and the operator 255 (FIG. 2) is expected to be in the same general location as the operator MCD 250. To account for periods in which the operator 255 may stop for fuel or rest or other expected reasons, where the operator MCD is attached to the tractor or affixed to the dashboard, a separation distance can be provided for at least one of the co-located visual representations of the operator 255 and operator MCD 250. As an example, a separation distance of 100 meters is provide as a threshold maximum distance that the operator will be away from the tractor trailer and/or the shipment during normal transportation periods. Any detection of a separation distance above this threshold will be considered a deviation and will cause SLTSU 122 to cause DPS 100 trigger a notification of potential security risk.

In another embodiment, the disclosure provides for monitoring and tracking of an unscheduled and/or unexpected separation event, such as one or more of the visual representations (corresponding to the location signals) that should remain collocated in the same geo-location moving away from the other visual representations. As one example, the separation event can include the tractor/truck moving away from the trailer. As another example, the separation event can include one of the cargo representations moving away from the trailer or vice-versa outside of an intended pick-up or drop-off location for that specific cargo. An appropriate set/sequence of notifications and/or responses is generated based on the collected data related to the event.

Figure 5B:
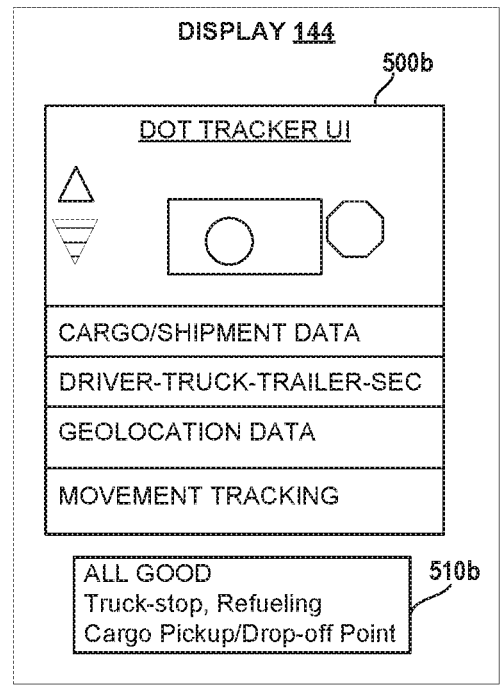

FIG. 5B illustrates second dot tracker UI 500b in which the operator has left the tractor, but is within an acceptable separation distance from the shipment. More specifically, SLTSU 122 has deduced that operator has stopped at a truck stop and/or is refueling, based on the geographic location map of the area in which the tractor-trailer is parked. Alternatively, in one embodiment, the shipment may have arrived at a known/expected drop off point (or operator rest area), such that operator separating from the shipment and/or the tractor-trailer is acceptable. An ALL GOOD notification 510b can be generated and displayed within second dot tracker UI 500b.

Figure 5C:
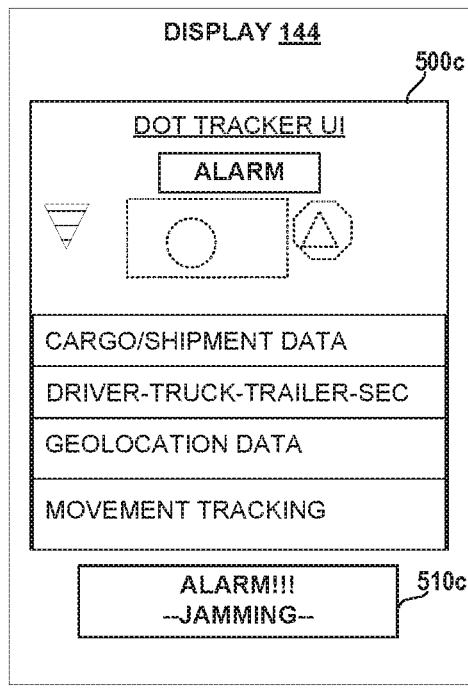

FIG. 5C illustrates third dot tracker UI 500c in which the location signals for the entire group of shipment-related entities become undetected for a period of time. This scenario is illustrated with the use of dotted outlines for each signal being tracked. In at least one embodiment, the concurrent loss of all location signals triggers SLTSU 122 to generate a warning of a jamming attack and notify the operator and others about the detected attack. Thus, notification status bar 510c clearly indicates this alert status. In the presented embodiment, the jamming attack is specifically directed at the shipment and the security detail location signal is still active and detectable. The proximity of the security detail to the event enable the security detail to investigate and provide the required notifications and/or confirmations and/or response to the detected loss of the location signals.

According to one aspect, the amount of time is a programmed parameter that can depend on other information related to the shipping route, geographic location, etc. For example, when the loss of visible visual representations (i.e., location signals) occurs while the shipment is determined to be moving in a tunnel, the time period can be set to an amount of time expected for the tractor-trailer to exit the tunnel. Other environmental scenarios would trigger a different time period or no delay at all. In the above embodiment, a determination of a potential problem is made (and responsive actions taken) only if a signal loss condition continues/lasts more than a pre-set threshold amount of time. This allows the system to account for detected loss of signal that may be caused by a faulty transmitter or entry into a tunnel located on route, etc.

Figure 5D:
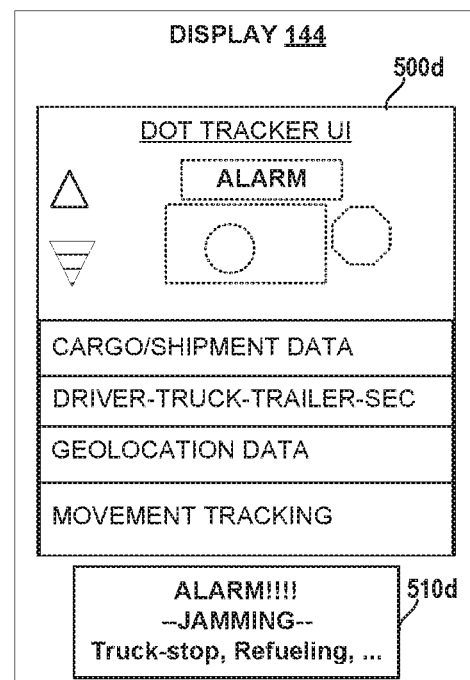

FIG. 5D illustrates fourth dot tracker UI 500d in which the location signals for only some of the group of shipment-related entities become undetected. In this specific scenario, the operator is at a truck stop and away from the tractor-trailer. Both operator WCD and security detail continue transmit location signals and are also both able to receive a response from the monitoring system. Notification status bar 510d provides the warning about the jamming attack, but also presents additional details related to the environment and/or location that may be helpful to counter the attack.

Figure 5E:
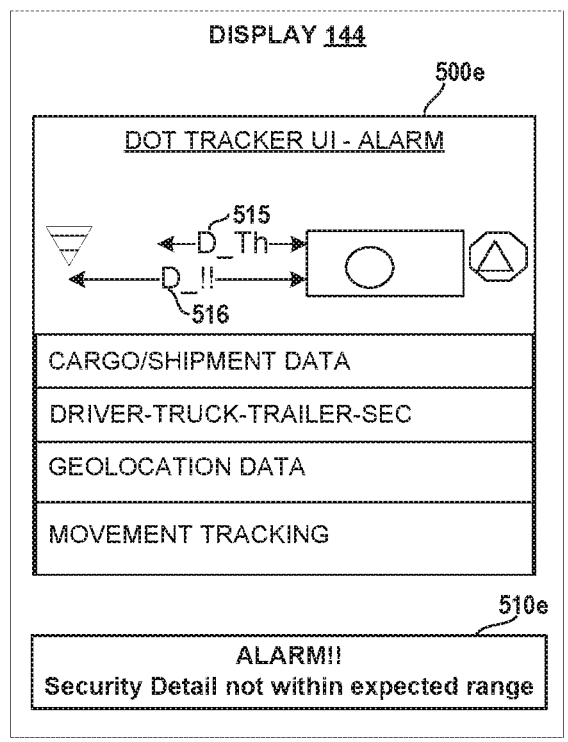

FIG. 5E illustrates fifth dot tracker UI 500e in which the visual representations representing the location signals for the shipment group indicate that the assigned security detail is at a given distance D_!! from the other members of the shipment group, which distance is outside of a pre-established maximum distance range (i.e., a threshold distance D_Th) from the shipment-related entities. Detection of this anomaly causes DPS 100 to generate a warning that is communicated to the security detail and one or more other interested parties, such as the operator or security detail company. This warning is presented within notification status bar 510e.

Figure 5F:
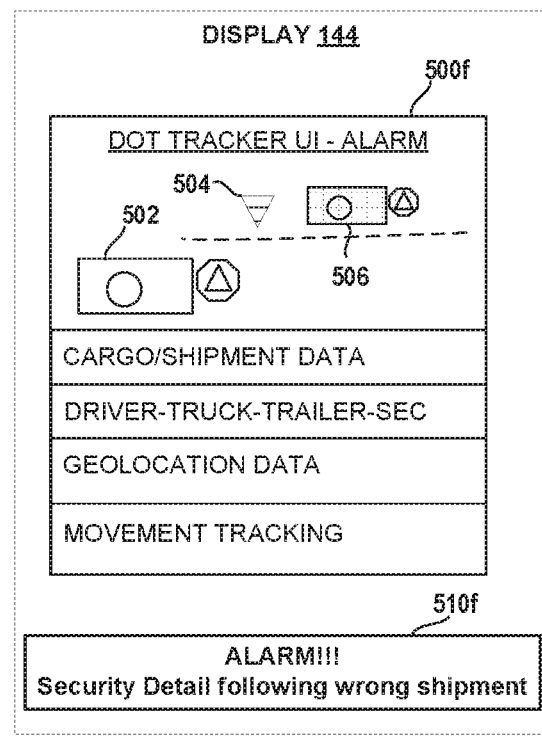

FIG. 5F illustrates sixth dot tracker UI 500f in which the visual representations representing the location signals for the shipment group 502 indicate that the assigned security detail 504 is following the wrong shipment-related entities (group 2 506). Detection of this anomaly causes DPS 100 to generate a warning that is communicated to the security detail and one or more other interested parties, such as the operator or security detail company. This warning is presented within notification status bar 510f.

Figure 5G:
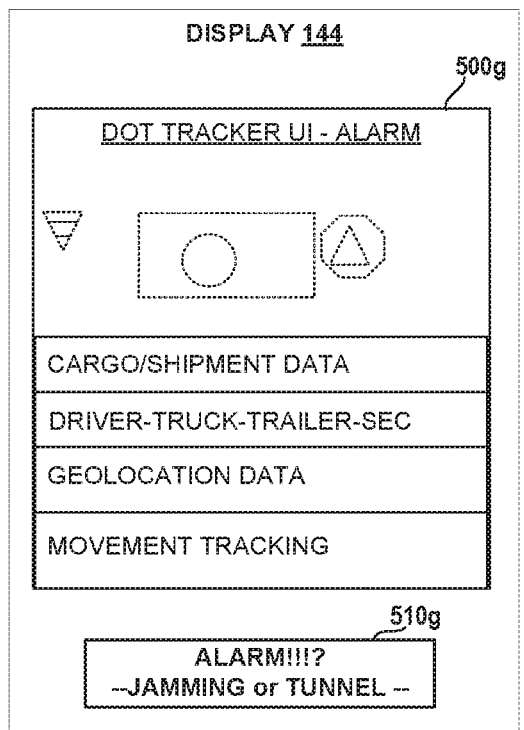
Figure 5H:
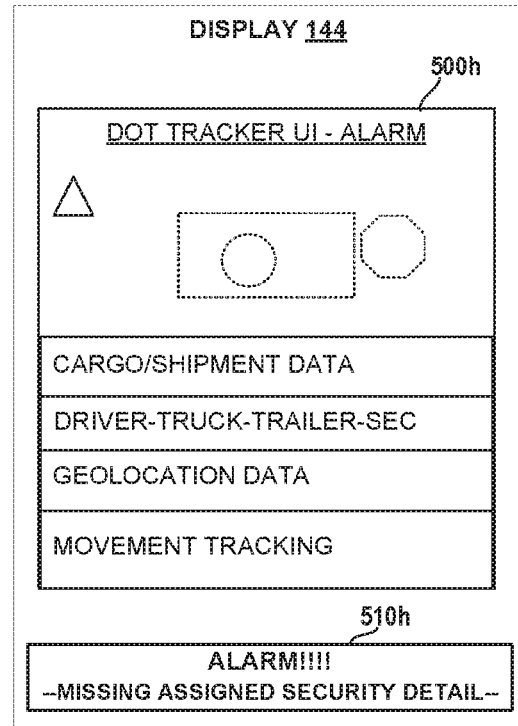

FIG. 5G illustrates seventh dot tracker UI 500g in which the dots representing the location signals for the shipment group indicate that all of the location signals have disappeared, suggesting the signals are being jammed or the shipment group is below ground or in a tunnel that is blocking transmission of all signals. The visual representations for each of the location signals are removed from the STUI or are presented as greyed out or dashed images. Detection of this anomaly causes DPS 100 to generate a warning that the shipment is either under a jamming attack or the signals are being otherwise jammed. This warning is presented within notification status bar 510*g*.

FIG. 5I1 illustrates eight dot tracker UI 500*h* in which the location signals for the assigned security detail is not being received and/or is not presented with any visible representation. This could be caused by a non-related jamming that blocks transmission of the location signal of the security detail, failure of the security detail's location signal transmitter, failure of the security detail to properly track the shipment, mechanical issue with the security detail's vehicle, and other possible reasons. DPS 100 is programmed to treat this as a security breach and provide a corresponding notification to the operator, the security detail, the security detail company, the shipper, and other interested parties. This warning is presented within notification status bar 510*h*.

Figure 6A:
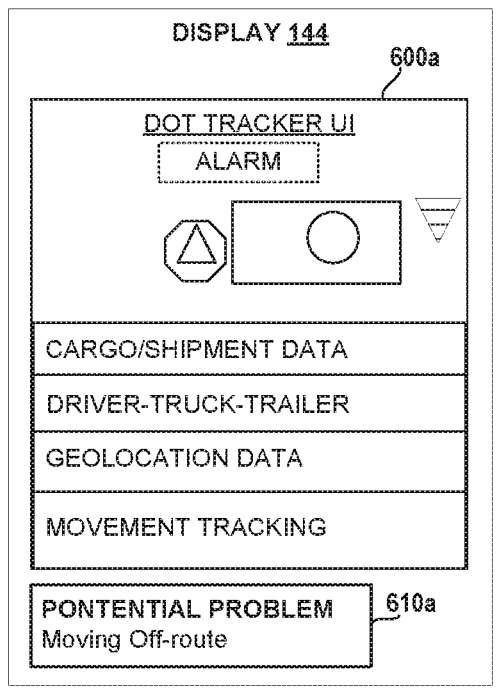

FIG. 6A illustrates ninth dot tracker UI 600*a* in which a directional movement of the virtual representations for a shipment group indicates that the shipment is being driven off-route. SLTSU 122 triggers an alert that is displayed within notification status bar 610*a*, indicating that the shipment is being moved off-route, such as away from shipping route 235 (FIG. 2). This trigger can, in one embodiment, require the shipment be a threshold minimum distance (e.g., 1 mile) off-route before the notification status bar is updated to reflect the alert. A check of the traffic conditions and other environmental conditions can also be integrated in the determining process to identify if there is a valid reason for the operator to have changed routes.

Figure 6B:
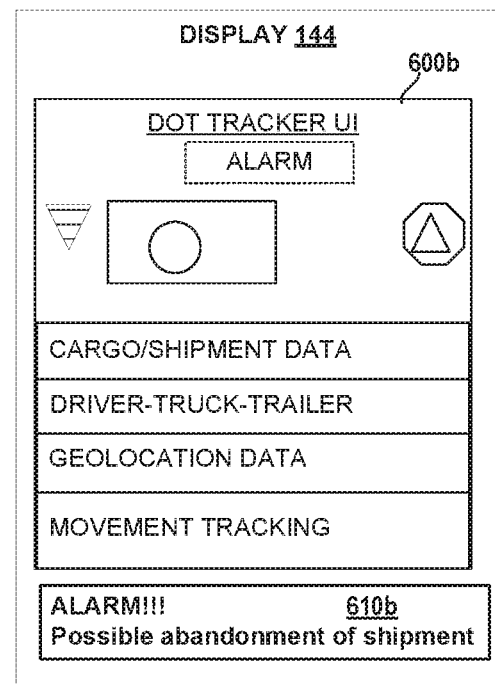
Figure 6C:
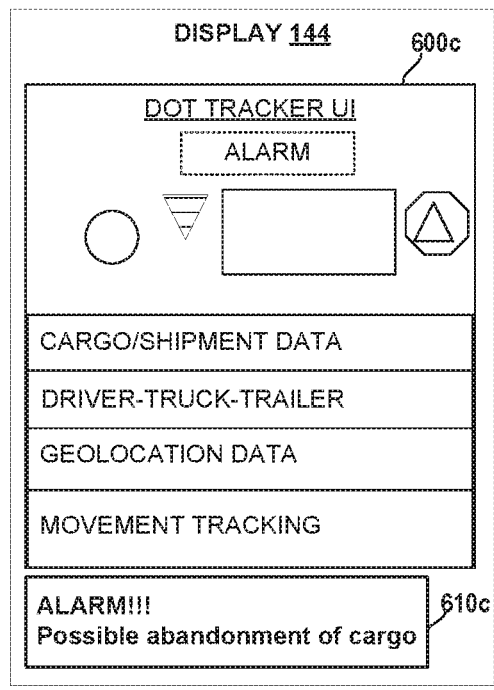

FIGS. 6B-6C illustrates two scenarios that involve an unscheduled separation of location signals, illustrated by respective visual representations in dot tracker UIs 600*a*, 600*b*. In FIG. 6B, tenth dot tracker UI 600*b* shows the operator and tractor moving away from the trailer and cargo. In one embodiment, DPS 100 calculates the rate of speed and/or the amount of time the tractor is moving away from the trailer and/or cargo and compares the calculated data to pre-established velocity and time thresholds that correlate to or are predictive of situations in which the operator may be abandoning the shipment. DPS 100 updates notification status bar 610*b* to present a notification (as a warning or alert) indicating that there is a possible abandonment of shipment in progress. Security detail remains with the shipment and is able to confirm the departure of the operator, while protecting the shipment. In FIG. 6C, a similar alert can be reported within eleventh dot tracker UI 600*c* via notification status bar 610*c*; however, in this embodiment, the cargo has been removed from the trailer and is being left at a location that is not the delivery destination. DPS 100 therefore determines the separation may likely be an abandonment of the cargo. Alternatively, depending on the location at which the cargo was removed from the trailer, SLTSU 122 can determine that an incorrect drop-off of shipment has occurred. In either scenario, SLTSU 122 triggers responsive actions, which can include communicating this error to the operator's MCD 250 (FIG. 2), SDCD 280, or to the carrier. Depending on why and how this separation of the cargo occurs, security detail 280 may be unaware of this and initially follows the tractor-trailer, at least until notified that the cargo being protected is no longer on-board the trailer. In one embodiment, the security detail 280 is actually assigned to the tractor-trailer and not any specific cargo within the transport vessel. The response by the security detail 280 to detection of this anomaly may therefore vary across different situations.

In one or more embodiments, monitoring for separation events is further extended to include monitoring for and identifying an unattended vehicle scenario in which the driver leaves the truck/trailer at a location that is not within the expected zone of driver separation. For example, the driver may either abandon a shipment/cargo and/or simply take a unscheduled stoppage of his transport of the shipment by leaving the truck and trailer at a truck stop or other parked location and moving away from or outside of the expected "safe zone" (e.g., 50 yards/meters) from the truck/trailer. A rate of driver movement away from the shipment (as identified by the velocity of the moving driver's location signal) can indicate the driver is in another vehicle that is moving away from the location of the truck/trailer/cargo. An appropriate set or sequence of notifications and/or responses is generated based on the collected data related to the event.

Figure 6D:
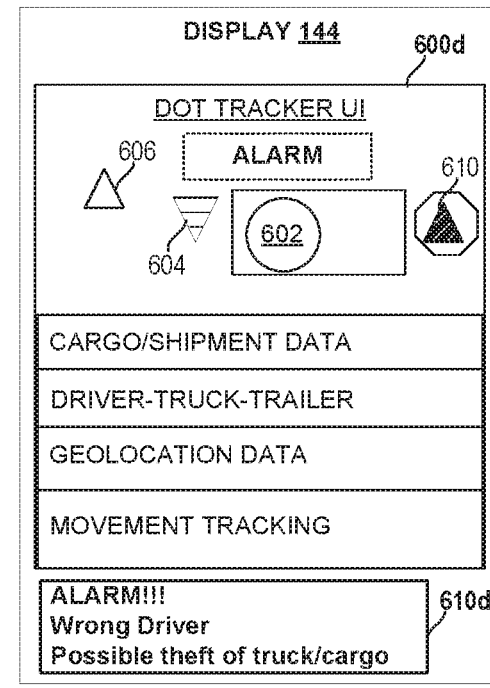

FIG. 6D illustrates, via twelfth dot tracker UI 600*d*, the scenario in which the wrong operator takes a shipment (i.e., either the cargo or the trailer loaded with the cargo). This situation can occur at a shipping port or shipment transit point at which the shipment 602 is left to be picked up by an authorized operator 606. When the shipment 602 begins to move from the port and the authorized operator is not the one who picks up the cargo, STLSU 122 configures DPS 100 to recognize that the location signal of the shipment 602 is co-located with the wrong driver 610 or that the location signal of the shipment is moving away from the pick-up point (e.g., 232, FIG. 2) without being co-located (and thus move in unison) with the location of the authorized operator. It should be noted that this scenario also applies to a theft of a tractor-trailer with onboard shipment 602, such as when the authorized operator 606 is at a truck-stop or another location outside of the tractor, but the shipment is detected moving away from the authorized operator 606. STLSU 122 configures the DPS 100 to generate a notification of a possible theft of the shipment and displays that notification on notification status bar 610*d*. In this embodiment, the security detail 604 follows the trailer and cargo and is made aware of the unauthorized operator 610.

Figure 7A:
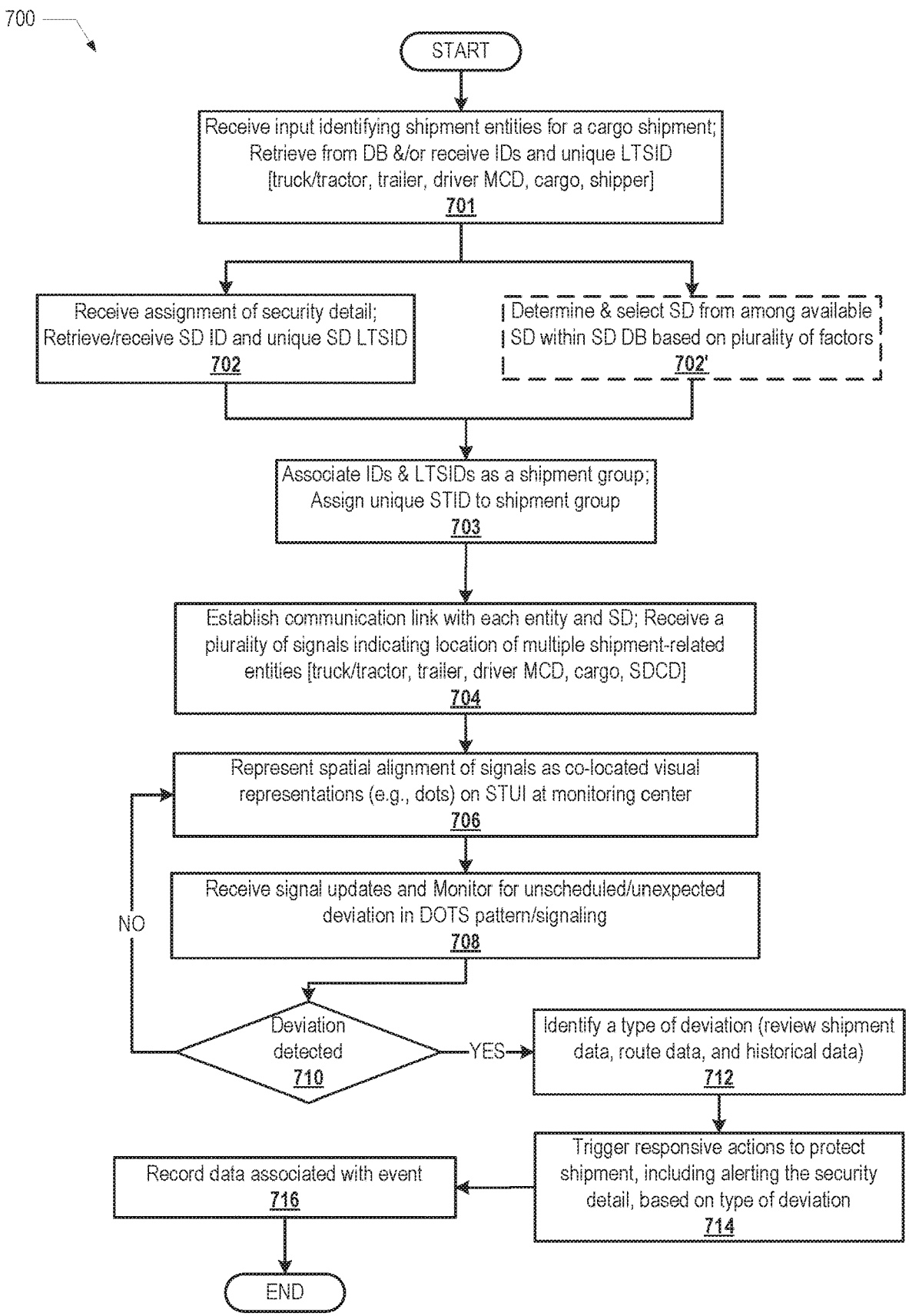
FIG. 7A provides a flow chart illustrating a method for monitoring shipments using co-located representations and responding to detected anomalies or deviations in the expected movement and/or presentation of the representations, in accordance with a plurality of embodiments.

Referring now to FIG. 7A, there is presented a flow chart of one method by which the devices and infrastructure of the preceding figures are utilized to present certain aspects of the shipment monitoring and security features of the present disclosure. Within the preceding figures, and according to one aspect of the disclosure, there is presented data processing system 100, which includes a memory 110 having stored thereon a shipment location tracking and security utility (SLTSU) 122. DPS 100 also includes a display device 144 that enables visual presentation of at least one graphical user interface (UI) 145 generated by the SLTSU 122. DPS 100 further includes at least one network interface device (NID) 160 that enables the DPS 100 to receive and transmit information via one or more communication networks 170/210. DPS 100 further includes at least one processor 105 coupled to the memory 110, the display device 144, and the at least one NID 160. The processor 105 executes the SLTSU 122 to enable DPS 100 to perform the features illustrated by method 700 of FIG. 7A.

For simplicity, each of the presented methods (i.e., 700, FIG. 7, 800, FIG. 8, and 900, FIG. 9) are described from the perspective of DPS 100 performing the various described functions. It is appreciated that DPS 100 is configured to perform the various functions based on execution of SLTSU 122 by processor 105. Further, certain of the functions are performed by other components of DPS 100, such as the receiving and transmitting of location signals and notifications, respectively, which are, in part, performed by NID 160 (FIG. 1).

In one or more alternate embodiments, certain aspects of the methods can be performed by the operator MCD 250 or the SD communication device (SDCD) 282. With these embodiments, a local version of the SLTSU are downloaded as an app to the respective device 250/282, where the local version includes only the features relevant to the particular device. Additional description of these implementations is provided in the later description of FIGS. 10 and 11.

As provided by FIG. 7A, with reference to FIGS. 1 and 2, the SLTSU 122 enables/configures DPS 100 to receive an input identifying an association of specific shipment-related entities, including a cargo, an operator, and an equipment (e.g., tractor and trailer) (block 701). DPS 100 retrieves from STLSU DB, or receives with the input, corresponding shipment entity identifier and unique location tracking sensor identifier of each of the shipment entities (block 701). Each unique location tracking sensor ID (or LTSID) identifies which shipment entity a received location signal belongs to. DPS 100 receives an assignment of a security detail, with associated security detail ID and SD LTSID (block 702).

In one alternate embodiment, in lieu of the process performed in block 702, DPS 100 determines and selects the security detail from a plurality of available security details within a SD DB 151 (FIG. 1) (block 702'). The selection of the security detail to assign to the shipment group can be based on a plurality of factors, including, without limitation: (i) a location of the shipment relative to available security detail within the vicinity of the cargo pickup; (ii) a predetermined rating assigned to each of the plurality of security details or security detail company, based on historical data and/or other rating criteria; (iii) a type of cargo being transported, where higher value, sensitive, and/or priority cargo receive a higher rated, and potentially more expensive, security service; (iv) shipper and/or recipient preference of security detail, which may be tied to the amount shipper/recipient is willing to pay for the security detail; and (v) integration of the security detail to the overall shipment tracking system.

At block 703, SLTSU 122 configures DPS 100 to associate the IDs and location tracking signals IDs (LTSID) of the shipment-related entities and the assigned security detail as a shipment group and to assign a unique shipment tracking identifier (STID) to the shipment group. The STID is assigned to track movement of the location tracking signals relative to each other and to a shipping route 235.

At block 704, DPS 100 establishes a communication link with each of the shipment-related entities and the security detail, and DPS receives, via the at least one NID, a plurality of location tracking signals. The plurality of location tracking signals indicates a location and spatial alignment of multiple shipment-related entities and the security detail that are being tracked concurrently as a shipment group. At block 706, and with specific reference now to FIGS. 4-6, SLTSU 122 configures DPS 100 to present the shipment group 240 as a plurality of co-located visual representations 450a, 450b, 450c, 450d on a shipment tracking user interface (UI) 145 (FIG. 4). Each location tracking signal is represented by one visual representation 450a/450b/450c/450d from among the plurality of co-located visual representations 450a, 450b, 450c, 450d. In the various illustrative embodiments, the individual location signals within a shipment group are represented within the STUI 145 as co-located visual representations of each entity. The co-located visual representations are presented with correct spatial alignment. For simplicity, these visual representations are referred to as dots; however, it is appreciated that the actual shape, dimensionality, and physical characteristics of each visual representation can be very different from each other. Additionally, a particular one or more of the visual representations (dots) can be visually modified within the STUI to indicate when an anomaly has occurred.

DPS 100 is further configured to receive updates to the location signals as the various entities within the shipment group move and monitor for any unscheduled deviations in at least one of an expected co-location and an expected geo-location of received updates to the location tracking signals, within each shipment group being tracked (block 708). In response to detecting (at decision block 710) an unscheduled deviation, DPS 100 is further configured to identify a specific type of the unscheduled deviation (block 712). In part based on the specific type of the unscheduled deviation identified, DPS 100 triggers responsive actions to protect the shipment (block 714). DPS 100 is further configured to record data associated with the detection or occurrence of the deviation (block 716). Then, method 700 completes at end block.

It should be appreciated that the cycle of monitoring the shipment will continue until the shipment is delivered to the end destination or other measures are taken to stop monitoring the shipment group. Also, in one embodiment, the detection of and response to a deviation includes the DPS 100 determining, from metrics associated with the detected change and previous patterns of behavior of input signals, whether the detected change indicates a potential bad and/or malicious and/or illegal and/or financially detrimental act directed towards the shipment. In response to determining that the detected change is indicative of a bad act associated with the shipment, DPS 100 triggers responsive actions to one or more of (i) prevent the occurrence of the bad act or (ii) to mitigate/reduce (a) a timing of response to and/or (b) an effect on the shipment caused by the bad act.

With the integration of the security detail, the features provided by DPS 100 are therefore extended to include additional functionality that supports tracking of the security detail and utilizing the security detail to respond to detected anomalies, among other functionality, as described herein. According to one or more embodiments that incorporate the assignment and tracking of the security detail, the at least one processor of DPS 100 executes the SLTSU 122 to configure the DPS 100 to assign a unique shipment tracking identifier (STID) to the shipment group to track movement of the location tracking signals relative to each other. The SLTSU further configures the DPS to assign a security detail to the shipment group, the security detail physically tracking the shipment group from within a vicinity of the shipment group. The security detail has at least one associated location sensor and a communication mechanism for transmitting a current location of the security detail to the DPS 100 over a respective communication network. The security detail has an assigned security detail identifier (SDID). The SLTSU further configures the DPS 100 to link the SDID with the STID. The SLTSU further configures the DPS to receive, via the communication network, a security detail (SD) location signal identifying the current location of the location sensor associated with the assigned security detail and present the shipment group with the assigned security detail as a plurality of co-located visual representations on a first shipment tracking user interface (UI). Each received location tracking signal and the SD location signal is represented by one visual representation from among the plurality of co-located visual representations. The SLTSU further configures the DPS to monitor for any unscheduled deviations in at least one of an expected co-location and an expected geo-location of received updates to the location tracking signals and the SD location signal within the shipment group. The SLTSU further configures the DPS to, in response to detecting an unscheduled deviation: identify a specific type of the unscheduled deviation; and trigger responsive actions based on the specific type of the unscheduled deviation. The series of responsive actions including alerting the security detail of the detected unscheduled deviation, via transmission of a signal over at least one communication network.

According to one embodiment, the SLTSU further configures the DPS to perform various functions in response to detecting a separation of at least one of the shipment-related entities and the security detail from each other occurring at an unscheduled time prior to the shipment reaching a shipment delivery destination or a security monitoring end time or security end location. The DPS 100 triggers a performance of one or more security features that informs at a least one of the operator, the security detail, and the shipper of the separation. The DPS 100 also, in response to the separation occurring at the shipment delivery destination or the security monitoring end time or security end location: de-couples the location signals within the shipment group; updates a shipment tracking system to indicate that the shipment has been delivered; updates the shipment tracking UI to remove the plurality of co-located visual representations for tracking the shipment group; and releases the security detail from the assignment to the shipment.

Figure 7B:
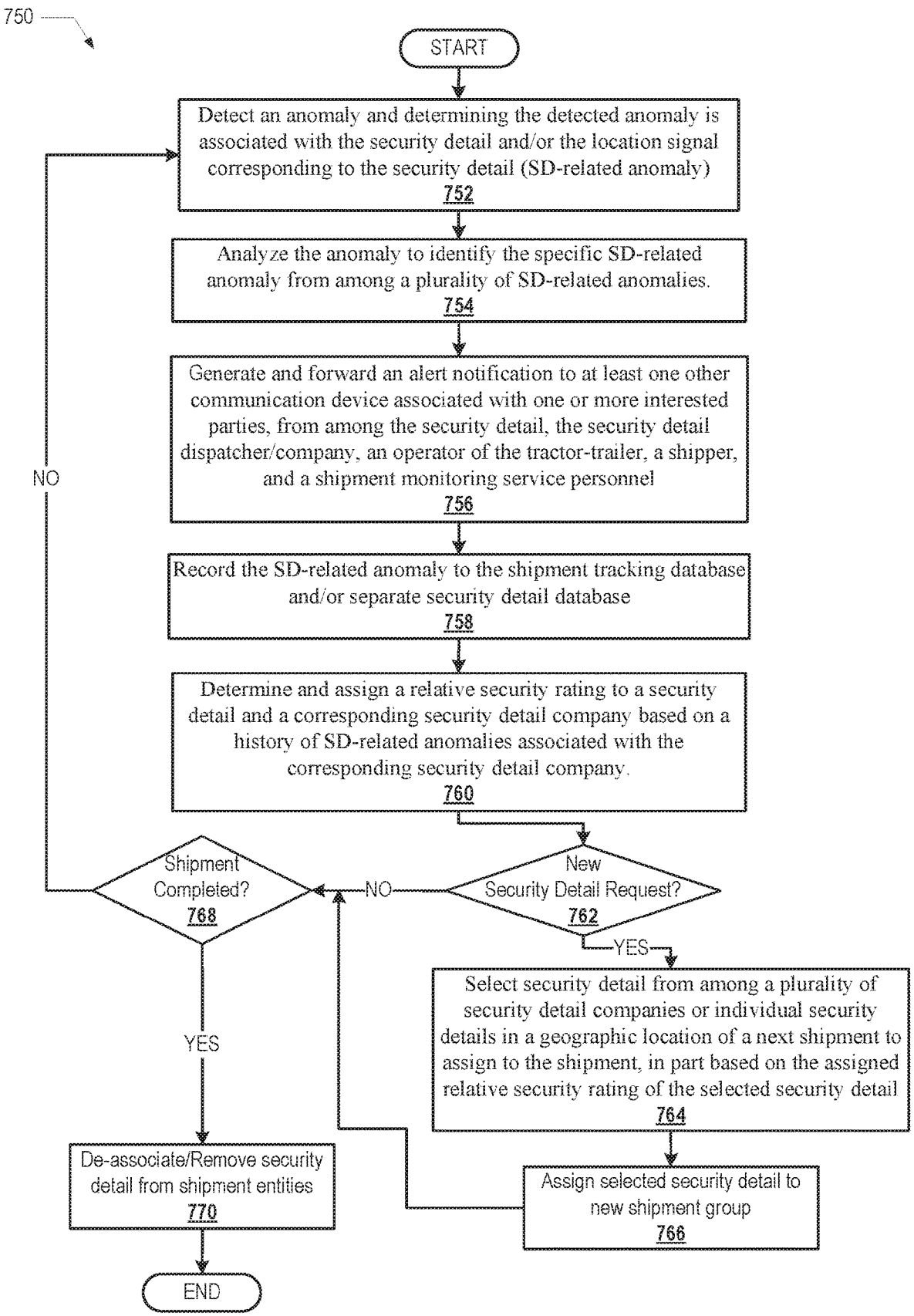
FIG. 7B is a flow chart illustrating a method by which the monitoring system responds to specific deviations and/or anomalies that are directly associated with the security detail, in accordance with one or more embodiments.

Referring to FIG. 7B, there is illustrated method 750 by which STLSU 122 configures the DPS 100 to respond to some specific deviations and/or anomalies that are directly associated with the security detail. From the start block, method 750 proceeds to block 752 at which DPS 100 detects an anomaly and determines the detected anomaly is associated with the security detail and/or the location signal corresponding to the security detail. For simplicity, these types of anomalies are referred to herein as an SD-related anomaly. At block 754, DPS 100 analyzes the anomaly to identify the specific SD-related anomaly from among a plurality of SD-related anomalies. According to one or more embodiments, the plurality of SD-related anomalies include, but are not necessarily limited to including: (i) separation of the security detail from other shipment-related entities within the shipment group before delivery of the shipment; (ii) a distance between the security detail and the other shipment-related entities being greater than a threshold distance; (iii) detecting movement of the security detail with a different grouping of shipment-related entities than an assigned group; (iv) detecting movement of the security detail in a different direction from the other shipment-related entities; and (v) disappearance of the location signal for the security detail. Following, at block 756, in response to identifying the one or more anomaly(ies) from among the plurality of SD-related anomalies, method 750 includes generating and forwarding an alert notification, via at least one communication network, to at least one other communication device associated with one or more interested parties, from a group comprising the security detail, the security detail dispatcher/company, an operator of the tractor-trailer, a shipper, and a shipment monitoring service personnel.

According to one or more embodiments, DPS 100 generates and forwards the notification (or warning/alert message), via at least one communication network, to a security detail (SD) communication device associated with the security detail. Method 750 also includes recording the SD-related anomaly to the shipment tracking database and/or separate security detail database (block 758). Method 750 also includes determining and assigning a relative security rating to a security detail and a corresponding security detail company based on a history of SD-related anomalies associated with the corresponding security detail company (block 760). In one embodiment, a previous security rating is updated based on the detection of the anomaly, the type of anomaly, and the response provided to the anomaly by the security detail and/or security detail company. At decision block 762, method includes determining if a new security assignment is requested for a new shipment group. In response to receiving a request for an assignment of a security detail for a new shipment group, method 750 includes selecting which among a plurality of security detail companies and a plurality of security details in a geographic location of a next shipment to assign to the next shipment, in part based on the assigned relative security rating (block 764). Method 750 then includes assigning the selected security detail to the new shipment group (block 766).

At block 762, if no new security detail is requested, method 750 moves to block 768 at which a determination is made whether the shipment has been completed. If the shipment has not been completed, method 750 returns to block 752. If the shipment has been completed, method 750 proceeds to block 770 at which the security detail is de-associated or removed from the shipment group and/or the other shipment entities within the shipment group. Method 750 then ends.

Figure 8A:
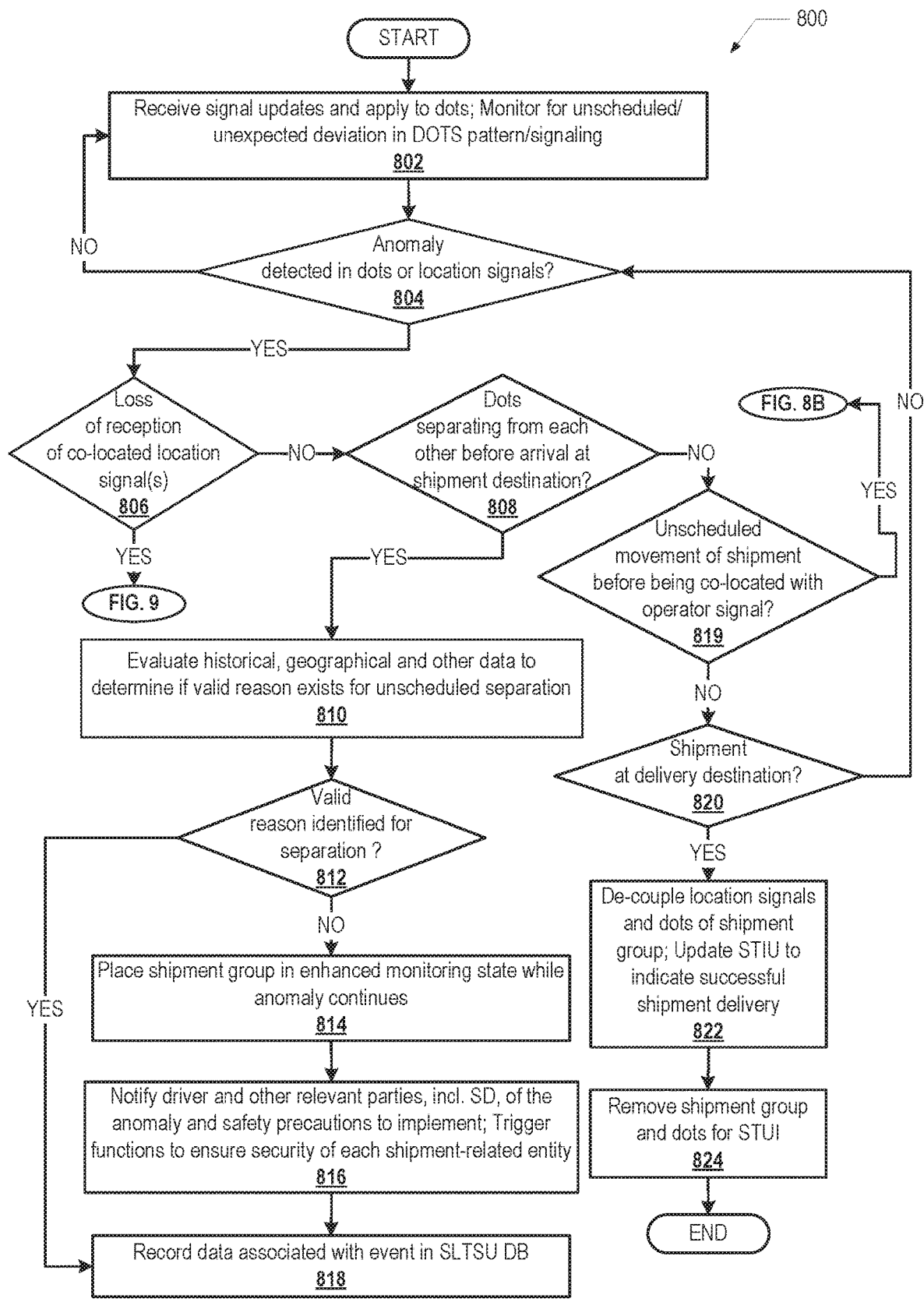
FIG. 8A provides a flow chart illustrating a method for identifying a type of anomaly and responding to separation of co-located representations outside of expected separation zones, in accordance with one or more embodiments.
Figure 8B:
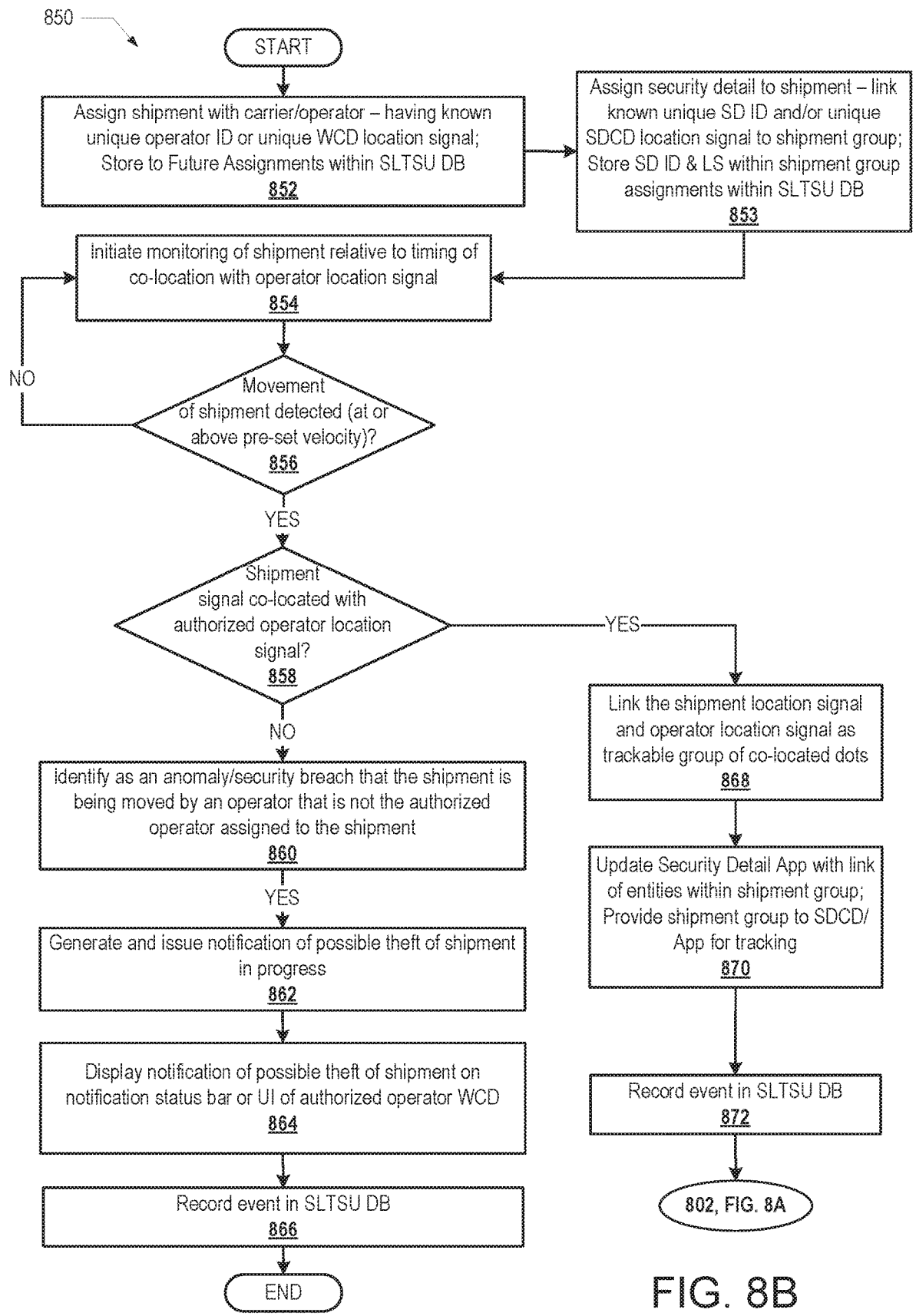
FIG. 8B provides a flow chart illustrating a method for identifying when a shipment is moved by someone other than an authorized and assigned driver/operator, in accordance with one or more embodiments.

Referring now to the flow charts of FIG. 8A-8B, there is illustrated an example method 800 in which the specific type of deviation is determined and corresponding responsive actions are triggered. FIGS. 8A-8B expand on the processes of block 706-714 of FIG. 7A, according to one or more embodiments. Beginning at block 802, DPS 100 receives location signal updates, assigns the updates to the corresponding representations, and modifies the location of the representations within the shipment groups based on the location signal updates, and monitors the update for any unscheduled or unexpected deviations or anomalies in the representations pattern or in the received location signals. At block 804, STLSU 122 configures DPS 100 to detect an occurrence of an anomaly. According to one or more embodiments, the anomaly can include one or more of (i) loss of reception of the location signals from one or more of the shipment-related entities and the security detail, (ii) unscheduled changes in a spatial relationship of the shipment-related entities and the security detail or corresponding visual representations on the STUI, and (iii) a movement of the shipment location signal from the pick-up location before being co-located and grouped with the operator location signal, indicative of an unauthorized taking of shipment. DPS 100 determines via blocks 806, 808, and 819 whether the anomaly is (i) a loss of reception of the location signals from one or more of the shipment-related entities and the security detail (decision block 806), (ii) unscheduled change(s) in a spatial relationship of the shipment-related entities and security detail or corresponding visual representations on the STUI before arriving at shipment destination (decision block 808), or (iii) a movement of shipment location signal from the pick-up location before being co-located and grouped with the operator location signal, indicative of an unauthorized taking of the shipment by another operator (decision block 819). In response to the anomaly being a loss of reception (as determined at block 806), method 800 transitions to the process of method 900 presented by FIG. 9. Method 800 transitions to block 808 (or 819) when no loss of reception is detected. It is appreciated that the sequence in which the decisions are made at blocks 806, 808, and 819 can vary and that the presentation of a particular sequence is solely by way of example.

In response to determining (at decision block 808) that the detected anomaly is/includes an unscheduled change in spatial relationship (i.e., separation) of the co-located visual representations (and thus the shipment-related entities) from each other before a shipment delivery at the intended destination, DPS 100 evaluates whether there is a valid reason for the unscheduled separation by evaluating historical data and received data about the shipment-related entities, the security detail, the route, geographic location at which the unscheduled separation occurs, and received environmental conditions (block 810). In response to not identifying a valid reason for the unscheduled separation, as determined at block 812, method 800 includes SLTSU configuring DPS 100 to place the shipment group in enhanced monitoring state while the anomaly continues (block 814), and trigger security measures to alert/notify the driver and other relevant parties, including the security detail, of the occurrence of the anomaly and safety precautions to implement (block 816). Method 800 further includes DPS 100 creating a record of the occurrence of the anomaly by and storing/recording data associated with the event in SLTSU DB (block 818). From block 808, method 800 transitions to block 819 when there is no detection of the separation of the dots from each other.

At decision block 819, in response to the anomaly being an unscheduled change in directional movement of the visual representations relative to each other, method 800 transitions to method 850 of FIG. 8B. Assuming the detected anomaly is not one of the aforementioned anomalies, method 800 transitions to decision block 820 at which DPS 100 determines if the shipment and associated separation of visual representations from each other or disappearance of visual representations from the tracking system is occurring at the delivery destination. If the shipment is not at the delivery location, method 800 transitions to block 808 to continue monitoring for the occurrence of an anomaly. In one embodiment, in response to the separation or disappearance of the visual representations occurring at the shipment delivery destination (as determined at block 820), DPS 100 de-couples the location signals within the shipment group and updates a shipment tracking system to indicate that the shipment has been delivered (block 822). DPS 100 also updates the shipment tracking UI to remove the shipment group and plurality of co-located visual representations used for tracking the shipment group (block 824). DPS 100 also releases the security detail from tracking the shipment-related entities of the now-disbanded shipment group. Method 800 then ends.

According to one embodiment, to enable the DPS 100 to monitor for any unscheduled deviations, the STLSU configures DPS 100 perform at least one of: (a) compare a present geographic location of the visual representation on a geographic location mapping to an expected geographic location, based on a prescribed route for the shipment; (b) identify whether there has been a route deviation by the operator or the security detail; (c) monitor for changes in an alignment pattern and separation distance of the visual representations corresponding to each of the shipment-related entities within the shipment group, relative to an expected alignment and separation distance; and (d) monitor for specific changes in a reception of the input location signals, which specific changes are changes that are indicative of an anomaly. According to one embodiment, in response to not identifying a valid reason for the unscheduled separation at block 812, the DPS 100 flags the shipment for enhanced monitoring (block 814); and triggers security measures to alert relevant parties of the occurrence of the anomaly (block 816).

Referring now to FIG. 8B, there is illustrated an example method 850 by which the anomaly/deviation involves an incorrect operator taking a shipment, as illustrated above with sixth STUI 600d of FIG. 6D. With continuing reference to the illustration of FIG. 6D, method 850 begins at block 852 with a shipment being assigned to and associated (e.g., by the CSIST server, DPS 100, shipper, or other associated entity) with an authorized operator (and operator equipment). The assigned, authorized operator has a known unique operator ID or operator WCD 250 with unique location signal. The assignment/association is stored within SLTSU DB to a future assignment. DPS 100 also assigns a security detail to the shipment (block 853). The security detail has a known SDID and/or unique SDCD location signal that is linked to the shipment group. The SDID and location signal are also stored within the shipment group assignment in SLTSU DB. Method 850 then incudes initiating monitoring of the shipment relative to a timing established for the co-location with the location signal of the authorized operator (block 854). Following detected movement of shipment by at least a minimum distance from a pick-up or origination point, such as a shipping port, at a velocity that indicates the shipment is being moved away from the pick-up point (block 856), a determination is made (at block 858) of whether the shipment has been co-located with the authorized operator (i.e., the shipment is not being moved by someone who is not the authorized operator). In response to determining at block 858 that the shipment is not co-located with the authorized operator, STLSU configures DPS 100 to determine/identify that the location signal of the shipment is co-located with the wrong driver or that the location signal of the shipment is moving away from the transit point without being co-located with the location signal of the authorized operator. STLSU 122 configures DPS 100 to identify a security breach involving the shipment being taken by someone who is not the authorized operator for that shipment, and DPS 100 (860). STLSU 122 configures the DPS 100 to generate and issue a notification of a possible theft of the shipment in progress (block 862) and to display that notification on notification status bar 610d or on a user interface of the authorized operator's MCD (block 864). DPS 100 then records the occurrence of the event in the SLTSU DB (block 866). Method 850 then ends.

According to one embodiment related to assignment of and pickup by an operator to a future shipment, SLTSU configures DPS 100 to identify an intended operator and shipping vessel assigned to a future shipment awaiting pickup by the intended operator, the intended operator having an operator ID and a communication device that provides a unique device location signal that is associated with the operator ID, the shipment also having a unique shipment location signal. DPS 100 associates the operator ID to the future shipment. DPS 100 then monitors a geo-coordinate location of the future shipment prior to pick-up by the operator.

Returning to decision block 858, in response to a received signal indicating the operator has picked-up the shipment, as determined at decision block 858, DPS 100 links and co-locates the unique operator device (MCD 250) location signal and unique shipment location signal to create and track a new shipment group (block 868). DPS 100 also updates the SD App 284 (FIG. 2) of the assigned security detail with the link of the location signals associated with the entities within the shipment group, and DPS 100 provides the shipment group to SDCD 282 (FIG. 2) for security tracking (block 870). DPS 100 records the event (or updates the security tracking entry) in SLTSU DB 872. Method 850 then transitions to method 800 and specifically block 802 of FIG. 8A to commence tracking of the shipment.

While monitoring for the pickup, DPS 100 is also configured to identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal. The second operator device signal is not associated with the operator or a second operator that has been assigned to transport the shipment. In response to identifying the anomaly, DPS 100 is configured to trigger responsive actions designed to prevent or stop an un-authorized operator from taking the shipment.

According to one embodiment, method 850 includes receiving a signal from one or more shipment-related entities, including a shipment/cargo tracker and possibly including a trailer transmitter/responder. Method 850 includes identifying, as an intended driver of the shipment, a specific driver having a corresponding operator MCD (e.g., a smart phone) that provides a unique operator signal, and also includes matching the unique operator signal to the shipment associated entities; monitoring the signals received from the shipment associated entities and the unique driver signal to identify when the signals become collocated and begin to move in unison. Method 850 further includes identifying when a different driver signal approaches and/or begins to move in unison with the other tracked signals. Method 850 includes, in response to identifying that a different driver signal is collocated with the other signals, performing responsive actions, based on a determination that the incorrect driver is taking the shipment. The responsive actions can include one or more of, but are not limited to, notifying the correct driver, recording the incident, signaling the different driver, notifying law enforcement, etc.

According to one embodiment of method 850 involving the security detail, the SLTSU configures the DPS 100 to: identify an intended operator and shipping vessel assigned to a future shipment awaiting pickup by the intended operator. The intended operator has an operator ID and a communication device that provides a unique device location signal that is associated with the operator ID. The shipment also has a unique shipment location signal. The SLTSU further configures the DPS 100 to associate the operator ID to the future shipment and associate the security detail with the future shipment, the security detail having an associated security detail identifier (SDID) and SD location signal. The SLTSU further configures the DPS 100 to transmit, to a communication device associated with the security detail, the unique signatures of the location signals associated with the shipment-related entities, the communication device configured to track the location signals and identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal. The second operator device signal is not associated with the operator or a second operator that has been assigned to transport the shipment. The SLTSU further configures the DPS 100 to monitor a geo-coordinate location of the future shipment prior to pick-up by the operator. In response to identifying the anomaly, DPS 100 triggers responsive actions, which include communicating with personnel associated with the security detail. The responsive actions are designed to prevent or stop an un-authorized operator from taking the shipment. The SLTSU further configures the DPS 100 to, in response to a received signal indicating the operator has picked-up the shipment, link and co-locate the unique device location signal, unique shipment location signal, and the SD location signal to create and track a new shipment group including the security detail.

Figure 9:
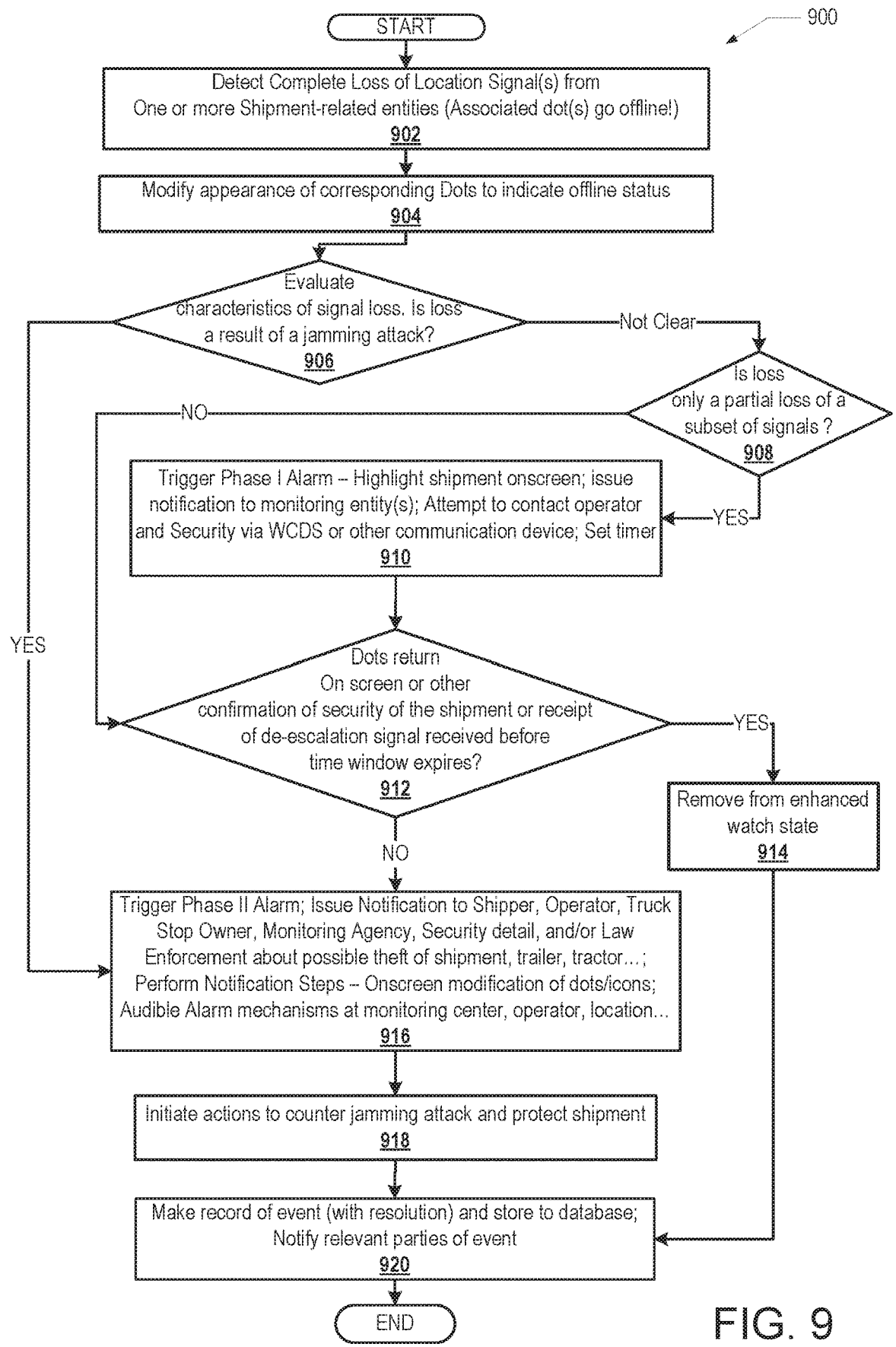
FIG. 9 provides a flow chart illustrating a method for identifying and responding to jamming attacks and a loss of location signals, in accordance with one or more embodiments.

FIG. 9 provides a flow chart of the method for responding to an anomaly that involves the loss of one or more of the location signals of at least one shipment entity associated with a shipment group, as illustrated by FIGS. 5C and 5D. Method 900 begins at block 902 at which DPS 100 detects a complete loss of at least one location signal from a corresponding one or more of the shipment entities. In response to the detected complete loss, DPS 100 removes or modifies (by ghosting the appearance or flashing) the visual representation corresponding with the location signal for that shipment entity within the STUI (block 904). At decision block 906, DPS 100 determines, based in part on characteristics associated with the loss of the at least one signal, whether the loss is a result of a jamming attack at the location of the shipment.

In response to the signal loss characteristics not being clear, according to one embodiment, DPS 100 determines at block 908 whether the loss is a partial loss of received location signals. The partial loss is one that affects only a subset of the shipment-related entities within the shipment group. In response to the signal loss being a partial loss, DPS 100 triggers a low level alarm event and sets a timer to track an amount of time that elapses following detection of the partial loss of signal (block 910). In one embodiment, the low level alarm is considered a Phase I alarm and involves highlighting the shipment group on the STUI/screen, issuing a notification to monitoring entity(ies), and attempting to contact the operator and security via their respective WDCD or SDCD. DPS monitors (via decision block 912) whether partial loss of received location signal is resolved before expiration of a pre-established time window. The partial loss resolving itself can include the dots returning onscreen, success with reaching the operator or security detail for verification that the shipment is okay, and/or receiving other verification that the signal loss is not tied to (i.e., correlated to) a security risk to or decreased safety of the shipment. As one example, the other verification can be receipt of a surveillance feed in the location of the shipment. In one embodiment, a de-escalation signal can be received from a trusted party, such as the operator or the security detail, before the time window expires. In response to the partial loss being resolved within the pre-established time window, DPS 100 removes the shipment group from the enhanced (phase I) watch state (block 914). DPS 100 also generates and stores a record of the event as a recovered, partial loss of signal incident occurring at a geographic location of the shipment-related entity when the loss occurred (block 920). DPS 100 also notifies any relevant parties to notify during partial signal loss events.

However, in response to the partial loss condition not being resolved within the pre-established time window, method 900 transitions to block 916. Method 900 also transitions to block 916 from decision block 906, in response to determining that the resulting loss is a result of a jamming attack. At block 916, DPS 100 triggers a higher level alarm status and generates real-time alerts and notifications of potential theft of one or more of the shipment-related entities. Accordingly, in the illustrated embodiment, in response to one of (i) all of the visual representations simultaneously disappearing for more than the pre-established window of time and (ii) not receiving the de-escalation signal prior to expiration of the pre-established window of time when only a subset of the location signals disappear from the monitoring system, DPS places the shipment in an elevated danger state and triggers a phase II alarm (i.e., a higher level alarm status than phase I). DPS 100 generates and issues, to relevant parties (e.g., Shipper, Operator, Truck Stop Owner, Monitoring Agency, Security detail, and/or Law Enforcement) a specific notification that identifies detection of the jamming attack and possible attempts to steal the shipment and/or the equipment (block 916). The notifications can be visual on-screen modifications of the visual representations, or presentation of warning notifications, and/or audible alarms at the monitoring center, operator WCD, SDCD, etc. DPS 100 initiates one or more actions to counter the jamming attack and protect one or more of the shipment-related entities from bad acts (block 918). DPS 100 records the event and any resolution thereof to SLTSU DB (block 920). Method 900 then ends.

In one embodiment, method 900 incudes DPS 100 setting a timer for a pre-established window of time before the phase II notification is issued (block 914). Similar to decision block 912, DPS 100 checks whether a de-escalation signal is received from a trusted party providing a verification of a safety of the shipment prior to expiration of the pre-established time window. In response to receiving the de-escalation signal prior to expiration of the pre-established window of time, DPS 100 optionally removes the shipment from the enhanced watch/monitoring state and records the event and subsequent de-escalation thereof within the SLTSU DB (block 920).

Also, according to one embodiment including the security detail, in response to determining that a resulting loss of a location signal is a result of a jamming attack, method 900 includes DPS generating and issuing a specific notification that identifies detection of the jamming attack. The specific notification is provided to at least the security detail in response to identifying that a communication device of the security detail has not being subject to the jamming attack. The DPS also triggers initiation (by the security detail) of one or more actions to counter the jamming attack and protect one or more of the shipment-related entities. In one embodiment, the DPS triggers an outputting at the SDCD 282 (FIG. 2) of at least one of an on-screen visual notification and an audible notification to alert a security detail personnel about the detected loss of signal anomaly/deviation.

According to one or more embodiments, and as illustrated by FIGS. 2, and 5B-5D and 6A-6D, in performing the series of responsive actions based on the specific type of deviation identified, DPS 100 performs at least one of the following: high-light, on the shipment tracking UI, a corresponding visual representation or the unique ID one of the shipment group for which the deviation is detected; output at least one of an on-screen visual notification and an audible notification to alert a monitoring personnel about the detected deviation; and communicate the notification to a remote communication device of at least one of an operator and a shipper associated with the shipment to provide real-time notification of the deviation. Additionally, in response to the deviation being a concurrent or substantially simultaneous loss of a plurality of the location signals within a single shipment group, DPS 100 issues a notification that includes an alert to one or more communicatively-connected parties of a potential jamming attack that may indicate malicious intent towards one or more of the shipment entities.

According to one aspect, storage of DPS includes SLTSU DB which stores shipping data utilized and periodically updated by the SLTSU. The SLTSU enables DPS 100 to concurrently track multiple different shipment groups in multiple different geographic locations, update a shipping history of each of the multiple different shipment groups during a life cycle of each shipment, and store the update within the storage/SLTSU DB. Additionally, DPS 100 aggregates, associates, and/or correlates detected activities, location, and triggered responses in a learning module that facilitates future handling of similar detected events that can occur.

According to one aspect a shipment monitoring and security system (SMSS) is provided. The SMSS includes at least one computing device, e.g., DPS 100, that is communicatively coupled to at least one network. The computing device can be similarly configured to perform similar operations as DPS 100. Specifically, the computing device includes at least one communication module that supports information transfer over the at least one network and which receives a plurality of location signals, each location signal associated with a respective shipment-related entity among a plurality of geographically co-located, shipment-related entities that collectively form a shipment group that is tracked during completion of a shipment. Further, the computing device is configured to generate, based in part on the geographic coordinates of the received location signals, a shipment tracking user interface (UI) on which is displayed a current location of each of shipment-related entities via visual representations that are presented at a spatial alignment relative to each other and to a geographic location coordinates. Further, the computing device is configured to detect an occurrence of an anomaly comprising one or more of (i) loss of reception of the location signals from one or more of the shipment-related entities, (ii) unscheduled changes in a spatial relationship of the shipment-related entities or corresponding visual representations on the STUI, (iii) an unscheduled change in a directional movement of the visual representations associated with a single shipment group relative to each other, and (iv) a movement of a shipment (location signal) from pick-up location before being co-located and grouped with operator location signal, indicative of an unauthorized taking of the shipment.

According to one embodiment, the SMSS includes a plurality of location tracking mechanisms associated with each of a shipment, a shipment container, a user equipment of an operator, and a shipping vessel/vehicle. The plurality of location tracking mechanisms enable detection of a location coordinate and transmission via an intermediary tracking system of location coordinate data to the computing device via one or more communication networks to which the computing device is communicatively coupled.

According to one embodiment, one or more of the presented methods (e.g., method 800) includes a DPS monitoring a relative location of an operator to a shipment via one or more sensor signals received for shipment-related entities of a shipment group. The method includes detecting a separation of at least one of (i) an operator signal from a trailer/tractor signal, (ii) a shipment signal from the trailer/tractor signal; and (iii) the operator signal from the shipment signal. The method further includes, in response to the separation being greater than a pre-established, acceptable separation distance, generating and issuing a notification that informs a recipient of an occurrence of the detected separation being greater than the pre-established acceptable separation distance.

According to one embodiment, the method (800) includes, in response to the separation being a separation of at least one of (i) the operator signal from the tailor/tractor signal or (ii) the operator signal from the shipment signal during a period when the separation is not scheduled to occur: identifying the separation as correlated to an unattended or abandoned vehicle scenario in which the operator has left the tractor-trailer at a location that is not within an expected safe zone of operator separation; and triggering a notification of the unattended vehicle scenario to at least one interested party.

According to another embodiment, the method (800) includes determining, from analyzing a change in geographic location of a received location signal over time, a velocity of operator movement away from the shipment, relative to a previous co-location coordinate. The method further incudes determining, based on the velocity of operator movement away from the shipment, that the operator is in another vehicle that is moving away from the location of the shipment, and notifying at least one of the operator, a shipper, and security personnel that the operator is deviating from an acceptable shipping plan relative to the shipment and may be abandoning the shipment prior to completion of delivery.

Additionally, the method (800) includes: retrieving, for the identified shipment, shipping details related to a destination, preferred or recommended routes, and projected schedule of shipment movement, including expected stops, for the recommended shipping route; forwarding the shipment data to the operator device; and monitoring for an unscheduled separation event. According to one embodiment, the separation event involves one or more of the received location signals and mapped visual representations that are expected to remain co-located in a same geo-coordinate location moving away from other visual representations in the geo-coordinate location. According to one or more embodiments, the unscheduled separation event can include at least one of: (i) the tractor/trailer moving away from the shipment; (ii) the shipment moving away from the trailer or vice-versa, while not located within an intended pick-up or drop-off location for that shipment; and (iii) the operator moving away from the shipment or the tractor/trailer, beyond an acceptable separation distance.

Referring now to FIGS. 10A-10B, there are respectively illustrated two 3-dimensional physical images as well as a block diagram representation of the component makeup of an example mobile communication device, MCD. While illustrated as MCDs 250A, 250B, both illustrations are collectively referred to as MCD 250 or operator MCD 250. It is appreciated that operator MCD 250 can be any user MCD that is programmed to include the applications and software code described herein and which enable MCD 250 to provide the functionality associated with the shipment tracking and security features described throughout the specification. MCD 250 operates within a wireless communication network and serves as the electronic device within which several of the operator-associated features of the disclosure can be implemented. According to the general illustration of FIG. 10B, MCD 250 is a communication device that is designed to communicate with other devices via a wireless communication network, which may be included within data communication network 210 (FIG. 2). MCD 250 can be one of a host of different types of devices, including but not limited to, a mobile cellular phone or smart-phone, a laptop, a net-book, an ultra-book, and/or a tablet (e.g., an iPAD®), or other computing device with access to wireless connectivity. The utilized devices include the necessary hardware and software to enable wireless-enabled communication between MCD 250 and a network via which information and/or data and voice communication required to implement the various features described herein to facilitate security of shipments via the general location signal communication environment 200 and execution of SLTSU 122.

Referring now to the specific component architecture and the associated functionality of the presented components, MCD 250 comprises processor 1010, which connects via a plurality of interconnects (illustrated by the bi-directional arrows) to a plurality of other functional components of MCD 250. Processor 1010 can be an integrated circuit that includes one or more programmable microprocessors and a digital signal processor (DSP). Processor 1010 controls the communication, program code execution, power mode control, time synchronization, and other functions and/or operations of MCD 250. These functions and/or operations thus include, but are not limited to, application data processing and signal processing.

Connected to processor 1010 is storage 1015, memory 1020, input/output (I/O) devices 1040 and communication mechanisms 1055. Memory 1020 can include volatile memory and/or non-volatile memory. During device operation, one or more executable applications can be stored within memory 1020 for execution by processor 1010. For example, memory 1020 is illustrated as containing local SLTSU App 1022, which is a downloadable app or utility that executes on MCD 250. SLTSU App 1022 includes shipment tracking user interface (STUI) 1024 and biometric verification module 1026, which is utilized to verify operator to access certain secure functions of MCD 250. As an example, a voice or fingerprint confirmation may be required before allowing a carrier/driver to pick up a high value shipment, so that only a specific pre-authorized carrier can perform the transportation of that shipment. Thus, for example, a Department of Defense (DOD) shipment will be released only to a DOD authorized carrier.

Memory 1020 further includes shipment compliance tracking utility 1028, which can provide access to available maps and which utilizes a GPS sensor or other location detection sensor or function of MCD to report an exact location of MCD 250 back to CSIST server (DPS) 100B. Within shipment compliance tracking utility 1028 is shipment location tracking and security utility (or SLTSU) 1030, which is a local operator device version of and performs similar functions as SLTSU 122 (FIG. 1). Also included in shipment compliance tracking utility 1028 is compliance module 1032, which provides the compliance monitoring and response features presented in the description of FIGS. 3A-3B. The two 3D views of MCD 250A presents example compliance user interface 1005 with a visual representation tracker feature/section 1006 for tracking the onboard shipment group. In one embodiment, selection, by user touch input or use of other input mechanism, of that visual representation tracker feature 1006 from compliance user interface 1005 triggers the opening of second user interface 1007. Second user interface 1007 provides shipment tracking UI (STUI) with location-based visual representations for each shipment-related entity positioned relative to each other within a geographic map. In normal operation, the operator has possession of MCD 250 and either the operator and/or MCD are typically within close proximity to the operator's equipment on which a shipment has been loaded. In one or more embodiments, additional tracking features are provided within the equipment and or the shipment that allow for CSIST (data aggregation) framework 200 to identify, in real time, when the carrier and/or MCD 250 moves out of an acceptable range away from the shipment or equipment. As a component within compliance utility, MCD 250 also includes security range determining utility 1029, which enables MCD 250 to determine a distance of security detail 280 from the other entities within the shipment group. Security range determining utility 1029 is important for identifying when security detail moves out of the predetermined distance/range desired or preferred to provide the required localized security to the cargo and/or the equipment.

Memory 1020 also includes shipment data and confirmation utility 1034, jamming detection module 1036, and un-authorized operator detection module 1038. The functionality associated with and/or usage of each of the software modules will become evident by the descriptions provided herein. It is appreciated that the various software modules can be independent modules that communicate with each other via processor execution of respective program code.

Referring again to the FIG. 10B, storage 1015 can be any type of available storage device capable of storing one or more application software, firmware, and data. It is further appreciated that in one or more alternate embodiments, the device storage can actually be or can include remote storage, such as a cloud storage, and not necessarily be fully integrated within the device itself. As provided, storage 1015 contains a local version of SLTSU DB 1018 that can include some of the operator login credential and biometric information to allow for local processing of the operator's login to a CSIST framework, in one or more embodiments. Storage can also include local database of device settings 1019 associated with the particular subscriber.

MCD 250 also comprises a plurality of input/output (I/O) devices 1040. I/O devices 1040 include, as input devices, camera 1042, microphone 1044, touch screen and/or touch pad and/or keypad 1046, biometric sensor or input device 1047, and code scanner 1048. Output devices include speaker 1049, display 1050, and others. MCD 250 can also include a subscriber identification module (SIM) or other similar feature that provides unique identification information of the carrier that owns or utilizes MCD 250. In order to allow MCD 250 to synchronize operations and/or provide time data, MCD 250 also includes system clock (not shown).

According to one aspect of the disclosure and as illustrated by FIG. 10, MCD 250 supports at least one and potentially many forms of wireless, over-the-air communication, which allows MCD 250 to transmit and receive communication, including location signals, with at least one second device and/or an externally located network. To support wireless communication, MCD 250 includes one or more of the following communication components: wireless network communication module 1060 (which can include a transceiver with connected antenna, both not expressly provided), near field communication (NFC) transceiver module 1062, wireless fidelity (WiFi) module 1064, and Bluetooth® transceiver 1066. It is appreciated that MCD 250 can also include components for wired communication, such as modem and Ethernet modules (not shown). Collectively, these wireless and wired components provide a communication means or mechanism 1055 by which MCD 250 can communicate with other devices and networks. To enable location-based services within/on the device, MCD 250 also includes a location service module, such as a GPS module, without limitation.

MCD 250 establishes communication with the at least one other device via over-the-air signal transmission, following the exchange of specific authentication and/or access credentials. The communication between MCD 250 and the second devices can be via near field communication, Bluetooth, infrared (IR) transmission, and others, without limitation. As a wireless device, MCD 250 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MCD 250 may be further equipped with an infrared (IR) device (not pictured) for communicating with other devices using an IR connection. In another embodiment, MCD 250 may include a short-range wireless device, including, but not limited to, a near field communication (NFC) device. In still another embodiment, MCD 250 may communicate with one or more other device(s) using a wired or wireless USB connection.

According to an implementation embodiment, MCD 250 includes display 1050 providing a user interface, and MCD 250 includes memory 1020 having stored thereon a shipment location tracking utility (SLTU). MCD 250 also includes a processor 1010 communicatively connected to the display 1050 and the memory 1020 and which executes the shipment location tracking and security utility (SLTSU) app 1022 to enable the user communication device (operator MCD 250) to perform the method processes of FIGS. 7, 8A-8B, and 9 with modifications to the location signal receiving and tracking processes to include a remote aggregator, in one embodiment, and direct connections from the MCD 250 in other embodiments. Further, with the MCD-based implementation of methods 700, 800, 850, 900, additional modifications are provided to enable the generated notifications to be immediately displayed on the display of MCD 250. According to one aspect of the disclosure, the modification to the notification is made because the operator becomes the principal consumer and/or recipient of the notifications, as the operator owns the MCD, is physically closest to the shipment for the majority of the time, and is therefore able to take affirmative steps to protect the shipment. Thus, the notifications are either locally generated and displayed on MCD 250, or the notifications are received from the DPS 100, CSIST server 100B, or data aggregator 320 and displayed on MCD 250.

Similar to the execution of STLSU 122 by processor 105 of DPS 100, processor 1010 of MCD 250 executes local STLSU 1030, which enables MCD 250 to track a plurality of visual representations corresponding to a shipment assigned to the operator/carrier for transporting to one or more respective destinations. MCD 250 receives a location signal for each of the shipment and a tractor trailer and other relevant entities within a shipment group. MCD 250 co-locates (i.e., places in relative proximity to each other) and groups the visual representations of the cargo/shipment (i.e, a first visual representation) with that of the shipping vessel (i.e., a second, different visual representation) and the MCD (i.e., a third, different visual representation). The vessel can be one or both the operator equipment or tractor-trailer. Each visual representation represents unique tracking visual representations. The visual representation of the MCD 250 thus corresponds to the authorized operator for the shipment. When a security detail is assigned, MCD 250 also receives the location signal of security detail and co-locates the SD location signal with those of the other shipment-related entities via use of a fourth visual representation. In one embodiment, the location signals and other data related to the shipment are received from data aggregator (320, FIG. 3), such as CSIST server 100B. In at least one embodiment, the data for all other entities of the shipment group is locally received and aggregated by processor execution of local STLSU utility 1030.

MCD 250A presents, within the user interface 1024, the grouping 1008 of visual representations representing a relative co-location of each of the cargo and the tractor trailer. MCD 250 automatically updates a relative location of each visual representation within the group to correlate to a current real-time location. MCD 250 detects an unscheduled separation of the visual representations and compares a separation distance to a pre-set threshold maximum separation distance. MCD 250 determines when a detected separation distance of one of the visual representations is greater than the pre-set threshold maximum separation distance, and in response to the detected separation distance being greater than the pre-set threshold maximum separation distance, MCD 250 generates and issues a notification signal to alert at least one of the operator and a remote monitoring device that an anomaly has been detected with the movement of the shipment that can affect a security of the shipment. It is appreciated that the tracking of the shipment and updating of the co-located visual representations continues until that shipment is delivered or another terminal even is received. For example, in one embodiment, the operator removes or deletes the shipment group from the STUI. In another embodiment, the assigning and removal is performed by a remote system (e.g., CSIST servers 100B) that downloads updates to the operator's copy of the SLTSU App with new shipment assignments and removes the completed shipment assignments once confirmation of the delivery is received at the remote system computers.

MCD 250 is also configured to track an assigned future shipment. MCD 250 receives a shipment assignment providing information about a shipment/cargo that is to be picked up and transported by the operator from a given shipment pick-up point to a shipment delivery point and provide a unique tracking icon (visual representation) corresponding to the shipment. MCD 250 maps the unique tracking icon (as the visual representation) to a current location of the shipment on a co-location map presented on a tracking UI. MCD 250 also receives movement data associated with the unique tracking icon and updates a mapping on a displayed co-location map. MCD 250 monitors for anomalies in a current location of the shipment prior to the operator arriving at the origination point to receive the shipment, and in response to detecting an anomaly in the current location, MCD 250 generates and issues to the user interface a notification about the anomaly. Specifically, in one embodiment in response to detecting the anomaly, MCD 250 transmits a notification to a monitoring server about the disappearance to trigger tracking of a location of the shipment relative to known operators to identify whether one of the known operators has mistakenly taken the shipment. In one embodiment, the notification is communicated to the carrier or the shipper directly. In another embodiment, the notification can be transmitted to a port controller when the shipment is being held at a shipping port for pickup.

Also, as one aspect, the notification of third parties can be triggered from the remote server (CSIST server 100B), which receives the initial notification from MCD 250. MCD 250 thus serves as a localized security sensor that identifies anomalies affecting only those shipments assigned to MCD 250, and MCD 250 immediately communicates the anomaly to the remote system for responsive action.

According to one embodiment, detection of the anomaly can involve the shipment's unique tracking icon moving away from the origination point at a velocity that indicates the shipment has been picked up by another moving vessel. With this embodiment, MCD 250 triggers tracking of a location of the shipment relative to known operators to identify whether one of the known operators has mistakenly taken the shipment. The tracking of the shipment can be performed by the remote system with a wider range of sensors and tracking capabilities and communication access to the MCDs of other operators and to law enforcement.

According to another embodiment, MCD 250 detects an anomaly that involves a disappearance of a plurality of the unique location tracking visual representations, where the location signals are no longer detectable. In response to detecting the disappearance of the visual representations, MCD 250 generates and issues an alert indicating that the shipment is likely under a jamming attack, and MCD 250 transmits the notification with information about the disappearance to a remote monitoring server (CSIST server 100B).

In one embodiment, MCD 250 is a smart phone or tablet or other communication device of a driver/operator that is equipped (or programmed) with a shipment location tracking application (app). The shipment location tracking app enables MCD 250 to be configured to track, on a user interface, a plurality of visual representations corresponding to cargo assigned to the driver for transportation to one or more respective destinations. Multiple different methods for inputting the specific cargo's unique signal within the app can be provided. Once inputted (or downloaded), the cargo's location relative to the operator is determined and presented on the user interface of the MCD. The driver may then monitor his shipment locally on his device. Any improper movement (or other activity) of monitored visual representations can then be detected locally and the driver provided with a notification that enables the driver to immediately check on the status of the cargo and/or his truck. New shipment information can also be relayed to the driver ahead of pickup so the driver can be alerted if another driver mistakenly or deliberately attempts to take the truck and/or shipment from the pick-up point.

In one embodiment, the specific operator setup of the MCD 250 and specifically the SLTSU App 1030 executing on MCD 250 is required in order to enable the tracking of the operator and implementation of certain aspects of the shipment tracking features described herein. Similar to the implementation of SLTSU 122 on DPS (FIGS. 1 and 4), the SLTSU App 1030 can provide visual tracking of multiple assigned shipments, and can also provide a selection feature that enables a zooming in on a single one of the assigned shipments to view specific details about that shipment on the device's STUI.

As a paid for application, use of the tracking features can be added on to the base communication infrastructure module as an additional service offered and/or a premium offering. Additionally, security features can be provided that includes one or more of temperature monitoring, door lock monitoring, with/without remote locking, and on-board video monitoring. These features can be provided as add-ons with an associated service costs payable when added to a base service, such as coordinating assignment of shipments to operators. The operator may elect to have a full version of the SLTSU App 1030 installed or a location tracking version only. With the full version, additional functionality can be provided at the MCD 250, such as the localized tracking of an assigned shipment, etc.

Figure 11:
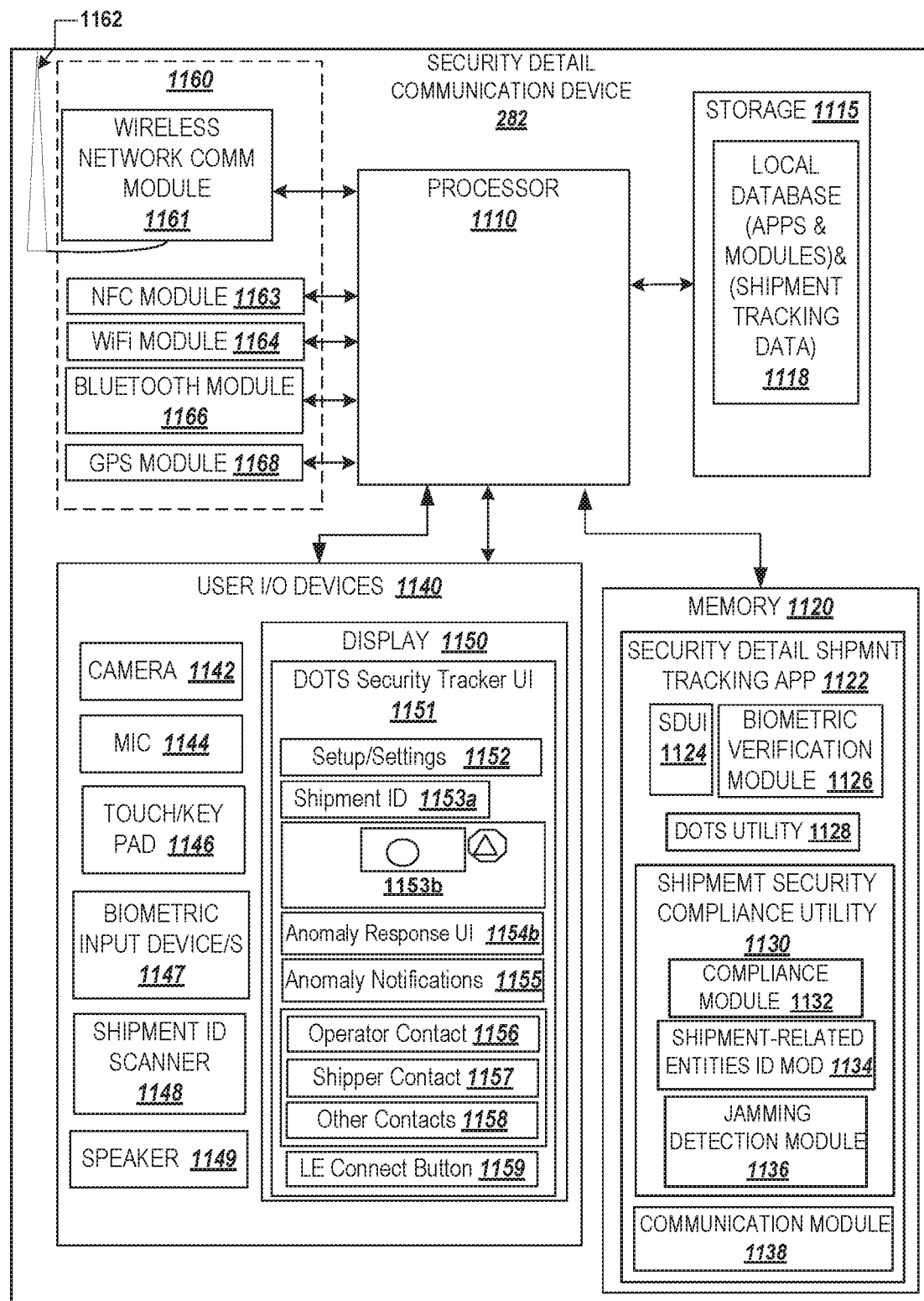
FIG. 11 illustrates an example security detail communication device SDCD utilized by a security personnel or installed in a vehicle of a security detail that supports and enables real-time tracking of an assigned shipment group and receipt of notification of potential problems occurring with the assigned shipment group, in accordance with one or more embodiments.

With reference now to FIG. 11, there is illustrated a block diagram representation of the component makeup of an example communication device that performs the functions of (and is thus referred to herein as) security detail (SD) communication device 282 (or SDCD). As introduced above, SDCD 282 is an MCD and can be a smart phone or tablet belonging to a security personal assigned to the security detail. SDCD 282 operates within a wireless communication network and serves as the electronic device within which several of the SD-associated features of the disclosure can be implemented. According to the general illustration, SDCD 282 is a communication device that is designed to communicate with other devices via one of a wireless communication network, which may be included within data communication network 210 (FIG. 2). SDCD 282 can be one of a host of different types of devices, including but not limited to, a mobile cellular phone or smart-phone, a laptop, a net-book, an ultra-book, and/or a tablet (e.g., an iPAD®), or other computing device with access to wireless connectivity. The utilized devices includes the necessary hardware and software to enable wireless-enabled communication between SDCD 282 and a network via which information and/or data and voice communication required to implement the various features described herein to facilitate security of shipments via the location signal tracking communication environment 200 and execution of SLTSU 122.

Because many of the presented hardware features of SDCD 282 are similar to those of the previously described MCD 250, only a brief introduction and/or reference is provided for these similar hardware components. SDCD 282 comprises processor 1110, which connects via a plurality of interconnects (illustrated by the bi-directional arrows) to a plurality of other functional components of SDCD 282. Processor 1110 can be an integrated circuit that includes one or more programmable microprocessors and a digital signal processor (DSP). Processor 1010 controls the communication, program code execution, power mode control, time synchronization, and other functions and/or operations of SDCD 282. These functions and/or operations thus include, but are not limited to, application data processing and signal processing.

Connected to processor 1110 is storage 1115, memory 1120, input/output (I/O) devices 1040 and communication mechanisms 1160. Memory 1120 can include volatile memory and/or non-volatile memory. During device operation, one or more executable applications can be stored within memory 1120 for execution by processor 1110. For example, memory 1120 is illustrated containing a local copy of security detail shipment tracking App/Utility (SDSTA) 1122, which is downloadable (e.g., from the shipment monitoring server) as an app or utility that executes on SDCD 282. SDSTA 1122 includes security detail user interface (SDUI) 1124 and biometric verification module 1126, which is utilized to verify a security detail personnel to access certain secure functions of SDCD 282. As an example, a voice or fingerprint confirmation may be required before allowing a security detail personnel to obtain information about an assigned shipment or a high value cargo, so that only a specific pre-authorized security detail knows what is being transported within the assigned shipment.

Memory 1120 further includes shipment location tracking utility (SLTU) or dots utility 1128, which is a local SD communication device version of and performs similar functions as SLTSU 122 (FIG. 1) for a single shipment group assigned to the security detail. Memory 1120 also includes security detail shipment tracking app 1122, which includes shipment security compliance utility 1130. Shipment security compliance utility 1130 provides access to specific compliance data and other modules. Shipment security compliance utility 1130 also includes compliance module 1132, which provides the compliance monitoring and response features presented in the description of FIGS. 3A-3B. Compliance module 1132 providing specific requirements for security detail to follow to be in compliance. Shipment security compliance utility 1130 also includes shipment-related entities identification module 1134, which includes the identities and other relevant data, such as a target route, of each entity within a shipment group that is assigned to be monitored by the security detail. Shipment security compliance utility 1130 also includes a jamming detection module 1136.

SDSTA 1122 includes also includes communication module 1138 that enables SDCD 282 to communicate with specific third parties in the event an anomaly is detected. The functionality associated with and/or usage of each of the software modules will become evident by the descriptions provided herein. It is appreciated that the various software modules can be independent modules that communicate with each other via processor execution of respective program code.

Storage 1115 contains a subset of data in SLTU DB 1118 that can include login credential and biometric information for security detail personnel to allow for local processing of the SD personnel's login to SDCD 282, in one or more embodiments. Storage 1115 can also include a database of device settings associated with the particular SD personnel.

SDCD 282 also comprises a plurality of input/output (I/O) devices 1140. I/O devices 1140 include, as input devices, camera 1142, microphone 1144, touch screen and/or touch pad and/or keypad 1146, biometric sensor 1147, and shipment ID scanner 1148. I/O devices 1140 include, as output devices, speaker 1149 and display 1150, and others. SDCD 282 can also include a subscriber identification module (SIM) or other similar feature that provides unique identification information of the carrier that owns or utilizes SDCD 282. In order to allow SDCD 282 to synchronize operations and/or provide time data, SDCD 282 also includes system clock (not shown).

According to one aspect of the disclosure and as illustrated by FIG. 11, SDCD 282 supports at least one and potentially many forms of wireless, over-the-air communication, via communication mechanisms 1160 providing a corresponding network interface, which allows SDCD 282 to transmit and receive communication, including location signals, with at least one second device and/or an externally located network. To support wireless communication, SDCD 282 includes one or more of the following communication components: wireless network communication module 1160 (which can include a transceiver 1161 with connected antenna 1162), near field communication (NFC) transceiver module 1163, wireless fidelity (WiFi) module 1164, and Bluetooth® transceiver 1166. To enable location-based services within/on the device, SDCD 282 also includes a location service module, such as a GPS module 1168, without limitation. In one embodiment, SDCD 282 may be further equipped with an infrared (IR) device (not pictured) for communicating with other devices using an IR connection.

According to an implementation embodiment, SDCD 282 includes a display 1150 providing a security tracker user interface (STUI) 1151. Within STUI 1151 can be displayed a shipment ID 1153 associated with an assigned shipment group, setup/settings menu button 1152, shipment ID 1153a, visual representations 1153b of the local signals corresponding to each of the shipment-related entities. Within STUI 1151 can also be displayed anomaly response UI 1154, anomaly notifications 1155, operator contact speed dial button 1156, shipper contact speed dial button 1157, other contact information 1158 for other relevant and interested parties, and law enforcement connect button 1159. These latter contact buttons enable SD personnel to quickly connect to the relevant party should an anomaly be detected with the shipment.

According to the described embodiments and as illustrated by FIG. 11, SDCD 282 includes a display 1150 providing a user interface 1151, a memory 1120 having stored thereon a security detail shipment tracking utility (SDSTU) 1122, and a network interface (wireless network communication module 1161) enabling communication of information via one or more wireless networks. SDCD 282 also includes a location sensor enabling real-time location determination of the communication device. SDCD 282 includes a processor 1110 communicatively connected to the display 1150, the network interface 1161, and the memory 1120. The processor 1110 executes the SDSTU to enable the MCD to: receive at least one location signal identifying a location and a status for at least one shipment-related entity of a plurality of shipment-related entities associated with a shipment assigned for tracking via the communication device, the plurality of shipment-related entities including at least one of a cargo, a tractor-trailer or transport vehicle, and an operator of the transport vehicle. The SDCD 282 is also enabled to present, within the user interface, STUI 1151, a visual representation of each location signal providing a relative co-location of each of the at least one shipment-related entities and the communication device. The SDCD 282 is further enabled to: in response to receiving updated location signals of the at least one shipment-related entity, automatically update a relative location of each visual representation on the user interface to correlate to a current real-time location. The SDCD 282 is further enable to, in response to an anomaly occurring with respect to the relative location of the at least one shipment-related entities and the communication device: change at least one characteristic of the user interface to indicate the occurrence of the anomaly; and automatically generate and issue a notification signal to alert at least one of the operator and a remote monitoring device that the anomaly has been detected with the movement of the shipment-related entities that can affect a security of the shipment.

According to one embodiment, to identify the occurrence of the anomaly, the processor: compares a separation distance of each of the received location signals and a location of the SDCD 282 to pre-set threshold maximum separation distances for each pair of location signal; determines when a calculated real separation distance of a shipment-related entity represented by one of the visual representations is greater than a respective pre-set threshold maximum separation distance; and in response to the determined separation distance being greater than the respective pre-set threshold maximum separation distance, identifying the anomaly.

According to one aspect, the SDCD 282 includes a wireless transceiver that supports wireless communication. The SDSTU 1122 configures the SDCD 282 to receive a shipment assignment providing information about a shipment that is to be picked up and transported by an authorized operator from a given shipment pick-up point to a shipment delivery point, the shipment assignment comprising the unique location signals for the authorized operator and at least one other shipment-related entity from among the cargo and the transportation vehicle. The SDSTU 1122 further configures the SDCD 282 to provide unique tracking icons corresponding to the visual representation of the shipment-related entities on the shipment tracking user interface (STUI) 1151 and to map the unique tracking icons to a current location of the shipment-related entities on a co-location map 1154A presented on the STUI 1151. The SDSTU 1122 further configures the SDCD 282 to receive movement data associated with at least one shipment-related entities and to update a mapped location of an associated unique tracking icon on the co-location map 1154A displayed on the STUI. Finally, the SDSTU further configures the SDCD 282 to monitor for and detect/determine anomalies in a current location of the other shipment-related entities prior to the authorized operator arriving at the origination point to receive the shipment, and, in response to detecting an anomaly in the current location of at least one of the other shipment-related entities, generate and issue a notification 1155 about the anomaly.

According to one embodiment, the SDCD 282 present, within the user interface, a visual representation of each location signal providing a relative co-location of each of the at least one shipment-related entities and the communication device. The SDCD 282, in response to receiving updated location signals of the at least one shipment-related entity, automatically update a relative location of each visual representation on the user interface to correlate to a current real-time location. The SDCD 282, in response to an anomaly occurring with respect to the relative location of the at least one shipment-related entities and the communication device: change at least one characteristic of the user interface to indicate the occurrence of the anomaly; and automatically generate and issue a notification signal to alert at least one of the operator and a remote monitoring device that the anomaly has been detected with the movement of the shipment-related entities that can affect a security of the shipment.

In one embodiment, the SDCD 282 is further enabled to identify an occurrence of the anomaly with respect to the relative location of the shipment-related entities and the SDCD 282 by comparing the relative location and movement of the visual representations to pre-established sets of approved separation distances and relative movement. The SDCD 282 is further enabled to identify when the anomaly involves signal jamming based on a loss of one or more of the location signals for more than a threshold time period.

According to one embodiment, the processor: generates an anomaly response user interface (ARUI) 1154B for displaying on the display device 1150; and present, on the ARUI 1154B, a plurality of selectable options for automatically notifying one or more of the shipment monitoring server, a shipper, the transport vehicle operator, a second security detail, and a law enforcement dispatcher. Accordingly, one or more parties having an interest in the shipment are automatically notified for any detected anomaly. Also, confirmation of the anomaly involving one or more of the shipment-related entities occurs in real time, from the SDCD 282, as a trusted third party in vicinity of the shipment-related entities.

According to one aspect, the processor executing the SDSTU further enables the communication device to: receive, via the network interface, a signal from one or more of the operator device and a server of the shipment monitoring system, the signal identifying the occurrence of the anomaly; and automatically generate and issue a response indicating receipt of the notification, the response providing real-time feedback indicating a trusted third party has received notification of the anomaly.

In one embodiment, the SDSTU further configures the SDCD 282 to co-locate and group the unique visual representations of the plurality of shipment-related entities and a visual representation of the SDCD 282 and present the co-located group of visual representations on the user interface with an associated shipment group identifier.

In yet another embodiment, the SLTU configures the SDCD 282 to: detect an anomaly that involves the unique tracking icons moving away from the origination point at a velocity, which indicates the cargo has been picked up by another moving vessel; and in response to detecting the anomaly, transmit a notification to a monitoring server and the authorized operator about the anomaly to trigger tracking of a location of the shipment relative to known operators to identify whether one of the known operators has mistakenly taken the shipment.

In one embodiment, the SDSTU configures the SDCD 282 to: detect an anomaly that involves a disappearance of a plurality of the unique tracking representations, wherein the location signals are no longer detectable; and in response to detecting the disappearance, generate and issue an alert indicating that the shipment appears to be under a jamming attack and transmit, to at least a shipment monitoring server, the notification with information about the disappearance of the signals.

Figure 12:
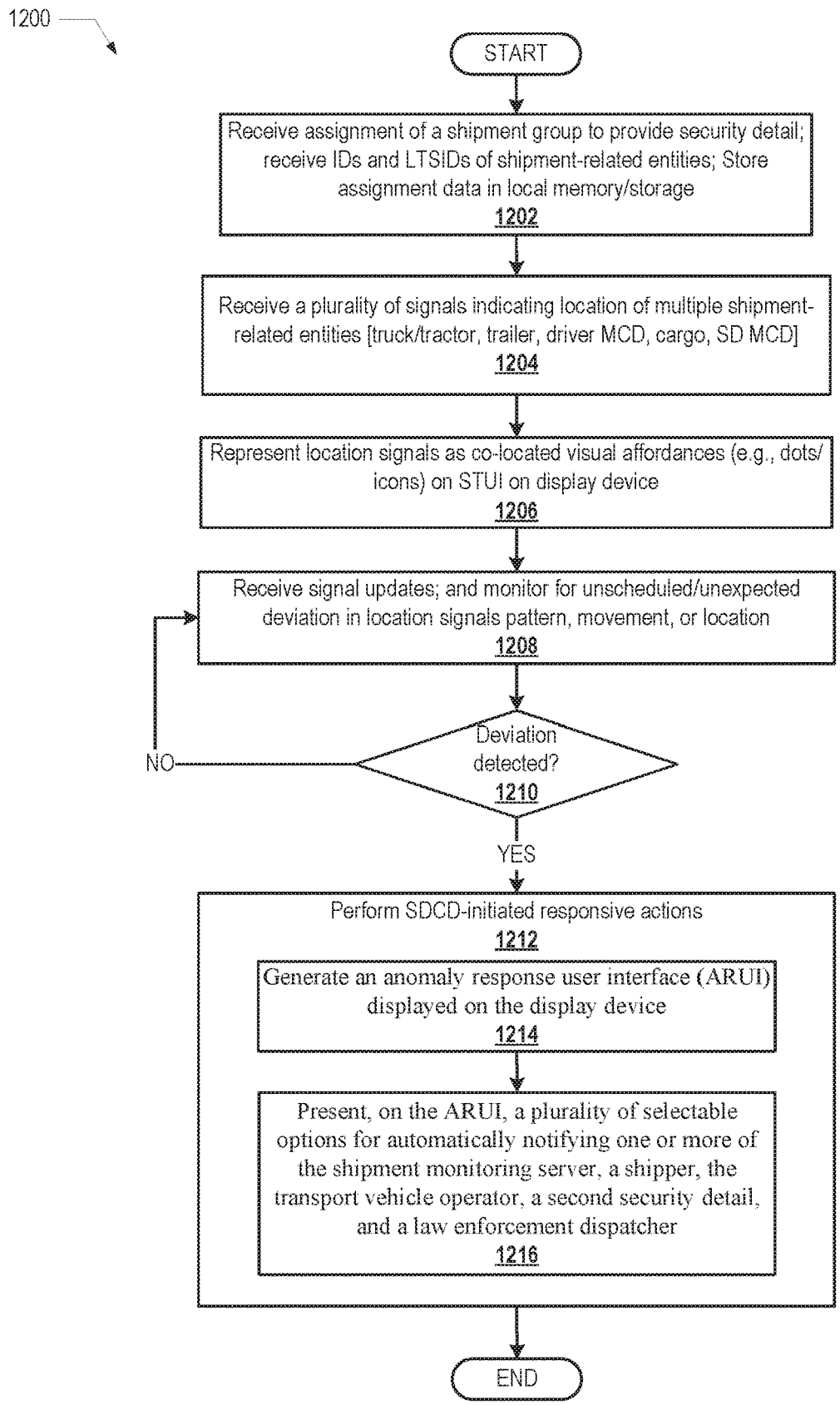
FIG. 12 is a flow chart of a method by which a security detail communication device tracks location signals of shipment related entities and responds to detected deviations in the location and co-location of the tracked signals, in accordance with one or more embodiments.

FIG. 12 provides a flow chart of a method 1200 by which a computing device, such as SDCD 282 provides security to a shipment being tracked and assigned with a security detail. After start block, method 1200 includes receiving, at the computing device, an assignment of a shipment group to provide security detail, the assignment providing the IDs and LTSIDs of the shipment-related entities (block 1202). Method 1200 includes processor 1110 storing the received data within a local storage for use by location tracking utility and presentation within STUI. Method 1200 includes receiving a plurality of location signals of the entities associated with the shipment group (block 1204). The location signals are received from at least one communication network communicatively coupled to a network interface of the computing device. The method further includes representing the location signals using visual representations on the STUI, providing spatial alignment (block 1206). Method 1200 including receiving updates to the location signals and monitoring for any unscheduled deviations in at least one of an expected co-location and an expected geo-location and a pattern of movement of received updates to the location signals within the shipment group (block 1208). Method 1200 further includes determining (block 1210) if a deviation is detected. In response to detecting an unscheduled deviation, method 1200 includes performing SDCD-initiated responsive actions (block 1212). The SDCD-initiated responsive actions include, but are not limited to: notifying personnel associated with the security detail; outputting at least one of a visual indication within the STUI and an auditory indication via an audio output device associated with the computing device, each of the visual and auditory indication presenting information that identifies that an anomaly has been detected in at least one of a location and a movement of at least one of the shipment-related entities and the security detail within the shipment group; transmitting, via a communication network, a notification from the SDCD 282 to a server of a shipment monitoring system that tracks the shipment group and notifies other relevant parties of detected anomalies; updating the STUI to present at least one visual notification of the detected anomaly on a display device; initiating a communication with an operator MCD 250 to enable communication of the detected anomaly to an operator of a vehicle transporting the shipment; and presenting a selectable option within the UI to automatically connect to and communicate with one or more of a law enforcement dispatcher, a shipper, the operator, and a back-up security detail. As shown within block 1212, performing the series of responsive actions can include generating an anomaly response user interface (ARUI) displayed on the display device (block 1214). Performing the series of responsive actions further includes presenting, on the ARUI, a plurality of selectable options for automatically notifying one or more of the shipment monitoring server, a shipper, the transport vehicle operator, a second security detail, and a law enforcement dispatcher (block 1216). Accordingly, in one or more embodiments, one or more parties having an interest in the shipment are, or can be, automatically notified by security detail about any detected anomaly. Also, in the presented embodiments, confirmation of an anomaly involving one or more of the shipment-related entities occurs in real time, from the SD communication device, as a trusted third party in vicinity of the shipment-related entities.

As further described herein, implementation of the functional features of the disclosure described herein can involve use of a combination of hardware, firmware, as well as several software-level constructs (e.g., program code and/or program instructions and/or pseudo-code) that execute to provide a plurality of methods that present the different features and functions of the disclosure.

In the above description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not be taken in a limiting sense, and the scope of the present disclosure will be defined by appended claims and equivalents thereof.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
  receiving, at a computing device from at least one communication network, a plurality of location signals, each location signal indicating a location of one of multiple geographically-co-located shipment-related entities that are being tracked concurrently as a shipment group associated with a specific shipment, the location signals received from the at least one communication network communicatively coupled to a network interface of the computing device, the shipment group including an assigned security detail having a corresponding location signal;
  generating, on a display of the computing device, a shipment tracking user interface (STUI) presenting the shipment group as a plurality of co-located visual representations within the STUI, where each location signal is represented by one visual representation from among the plurality of co-located visual representations;
  monitoring, by the computing device, for any unscheduled deviations in at least one of an expected co-location and an expected geo-location of received updates to the location signals within the shipment group; and
  in response to detecting an unscheduled deviation: identifying a specific type of the unscheduled deviation; and triggering, by the computing device, responsive actions based on the specific type of the unscheduled deviation, the responsive actions comprising notifying personnel associated with the security detail via transmission of a signal over the at least one communication network.

2. The method of claim 1, the triggering of responsive actions further comprising:
  outputting at least one of a visual indication within the STUI and an auditory indication via an audio output device associated with the computing device, each of the visual and auditory indication presenting information that identifies that an anomaly has been detected in at least one of a location and a movement of at least one of the shipment-related entities and the security detail within the shipment group.

3. The method claim 1, wherein presenting the shipment group as a plurality of co-located visual representations on the STUI comprises:
  generating and displaying the STUI on a display device;
  presenting each location signal within a shipment group as a separate visual item co-located with other visual representations each correlated to an actual physical location of a shipment-related entity within the shipment group;
  co-locating and presenting the visual representations representing each of the received location signals with a spatial location and alignment corresponding to a separation distance of the shipment-related entities and the security detail within the shipment group;
  periodically receiving updated location signals from one or more of the shipment-related entities and a location tracker of the security detail; and
  updating the presentation of the plurality of co-located visual representations on the STUI based on the updated location signals.

4. The method of claim 3, wherein generating and displaying the STUI on the display device further comprises:
  providing a geographic mapping of a geographic location of the plurality of visual representations on the STUI;
  comparing a present location of the co-located visual representations to at least one of an intended shipment delivery destination and a current expected location of the shipment and the security detail;
  identifying, based on the present location, if there has been a route deviation by at least one of the operator or the security detail that is outside of an acceptable range of deviation from a pre-scheduled route; and
  generating, outputting, and transmitting at least one notification signal to correct the deviation.

5. The method of claim 1, further comprising:
detecting an occurrence of an anomaly from among a group comprising (i) loss of reception of the location signals from one or more of the shipment-related entities and the security detail, (ii) unscheduled changes in a spatial relationship of the shipment-related entities and/or the security detail based on corresponding changes in the visual representations on the STUI, and (iii) an unscheduled movement of a shipment location signal from a shipment pick-up location before the shipment is co-located and grouped with an operator location signal, indicative of an unauthorized taking of the shipment; and
in response to detecting an anomaly that includes an unscheduled separation of the co-located visual representations from each other before a shipment delivery at an intended destination:
determining if there is a valid reason for the unscheduled separation by evaluating historical data and received data about the shipment-related entities, the security detail, the route, geographic location at which the unscheduled separation occurs, and received environmental conditions; and
in response to not identifying a valid reason for the unscheduled separation: flagging the shipment for enhanced monitoring; triggering security measures to alert relevant parties of the occurrence of the anomaly; and creating and storing a record of the occurrence of the anomaly.

6. The method of claim 1, wherein the communication device is a security detail (SD) communication device that is associated with the security detail, and triggering a series of responsive actions comprises one or more of:
transmitting, via a communication network, a notification from the SD communication device to server of a shipment monitoring system that tracks the shipment group and notifies other relevant parties of detected anomalies;
updating the UI to present at least one visual notification of the detected anomaly on a display device;
initiating a communication with an operator mobile communication device (MCD) to enable communication of the detected anomaly to an operator of a vehicle transporting the shipment; and
presenting a selectable option within the UI to automatically connect to and communicate with one or more of a law enforcement dispatcher, a shipper, the operator, and a back-up security detail.

7. The method of claim 1, wherein to monitor for any unscheduled deviations, the method further comprises:
comparing a present geographic location of the visual representation on a geographic location mapping to an expected geographic location, based on a prescribed route for the shipment; and identify whether there has been a route deviation by the operator or the security detail;
monitoring for changes in an alignment pattern and separation distance of the visual representations corresponding to each of the shipment-related entities within the shipment group, relative to an expected alignment and separation distance; and
monitoring for specific changes in a reception of the input location signals, which specific changes are indicative of an anomaly.

8. The method of claim 1, further comprising:
analyzing the anomaly to identify an SD-related anomaly from among a plurality of SD-related anomalies comprising: separation of the security detail from other shipment-related entities within the shipment group before delivery of the shipment; a distance between the security detail and the other shipment-related entities being greater than a threshold distance; detecting movement of the security detail with a different grouping of shipment-related entities than an assigned group; and detecting movement of the security detail in a different direction from the other shipment-related entities; and disappearance of the location signal for the security detail;
in response to the anomaly being one of the plurality of SD-related anomalies: generating and forwarding an alert notification, via at least one communication network, to at least one other communication device associated with one or more interested parties from a group comprising a security detail dispatcher, a security detail, an operator of the tractor-trailer, a shipper, and a shipment monitoring service personnel.

9. The method of claim 8, wherein the computer device is a shipment monitoring server, the triggering a series of responsive actions further comprising:
generating and forwarding the alert, via at least one communication network, to a security detail (SD) communication device associated with the security detail;
recording the SD-related anomaly to a shipment tracking database;
determining and assigning a relative security rating to a security detail and a corresponding security detail company based on a history of SD-related anomalies associated with the corresponding security detail company; and
selecting which among a plurality of security detail companies and a plurality of security detail in a geographic location of a next shipment to assign to the next shipment, in part based on the assigned relative security rating.

10. The method of claim 1, wherein triggering the response further comprises:
generating an anomaly response user interface (ARUI) displayed on the display device; and
presenting, on the ARUI, a plurality of selectable options for automatically notifying one or more of the shipment monitoring server, a shipper, the transport vehicle operator, a second security detail, and a law enforcement dispatcher;
wherein one or more parties having an interest in the shipment are automatically notified for any detected anomaly; and
wherein when the computer device is a security detail (SD) communication device, confirmation of an anomaly involving one or more of the shipment-related entities occurs in real time, from the SD communication device, as a trusted third party in vicinity of the shipment-related entities.

11. A non-transient computer readable storage medium having stored thereon program code that when executed by a processor of a computer device configures the computer device to perform the functions corresponding to claim 1.

12. A mobile communication device comprising:
a display providing a user interface;
a memory having stored thereon a security detail shipment tracking utility (SDSTU); and
a network interface enabling communication of information via one or more wireless networks;
a location sensor enabling real-time location determination of the communication device;

a processor communicatively connected to the display, the network interface, and the memory and which executes the SDSTU to enable the mobile communication device to:

receive at least one location signal identifying a location and a status for at least one shipment-related entity of a plurality of shipment-related entities associated with a shipment assigned for tracking via the communication device, the plurality of shipment-related entities comprising at least one of a cargo, a tractor-trailer or transport vehicle, and an operator of the transport vehicle;

present, within the user interface, a visual representation of each location signal providing a relative co-location of each of the at least one shipment-related entities and the communication device;

in response to receiving updated location signals of the at least one shipment-related entity, automatically update a relative location of each visual representation on the user interface to correlate to a current real-time location;

in response to an anomaly occurring with respect to the relative location of the at least one shipment-related entities and the communication device:
change at least one characteristic of the user interface to indicate the occurrence of the anomaly; and
automatically generate and issue a notification signal to alert at least one of the operator and a remote monitoring device that the anomaly has been detected with the movement of the shipment-related entities that can affect a security of the shipment.

13. The mobile communication device of claim 12, the processor executing the SDSTU further enabling the communication device to:
identify an occurrence of the anomaly with respect to the relative location of the shipment-related entities and the communication device representations by comparing the relative location and movement of the visual representations to pre-established sets of approved separation distances and relative movement; and
identify when the anomaly involves signal jamming based on a loss of one or more of the location signals for more than a threshold time period.

14. The mobile communication device of claim 12, wherein to identify the occurrence of the anomaly, the processor:
compares a separation distance of each of the received location signals and a location of the communication device to pre-set threshold maximum separation distances for each pair of location signal;
determines when a calculated real separation distance of a shipment-related entity represented by one of the visual representations is greater than a respective pre-set threshold maximum separation distance; and
in response to the determined separation distance being greater than the respective pre-set threshold maximum separation distance, identifies the anomaly.

15. The mobile communication device of claim 12, the processor executing the SDSTU further enabling the communication device to:
generate an anomaly response user interface (ARUI) for displaying on the display device; and
present, on the ARUI, a plurality of selectable options for automatically notifying one or more of the shipment monitoring server, a shipper, the transport vehicle operator, a second security detail, and a law enforcement dispatcher;
wherein one or more parties having an interest in the shipment are automatically notified for any detected anomaly; and
wherein when the computer device is a security detail (SD) communication device, confirmation of an anomaly involving one or more of the shipment-related entities occurs in real time, from the SD communication device, as a trusted third party in vicinity of the shipment-related entities.

16. The mobile communication device of claim 12, the processor executing the SDSTU further enabling the communication device to:
receive, via the network interface, a signal from one or more of the operator device and a server of the shipment monitoring system, the signal identifying the occurrence of the anomaly; and
automatically generate and issue a response indicating receipt of the notification, the response providing real-time feedback indicating a trusted third party has received notification of the anomaly.

17. The mobile communication device of claim 12, wherein the SDSTU further configures the MCD to:
co-locate and group the unique visual representations of the plurality of shipment-related entities and a visual representation of the MCD; and
present the co-located group of visual representations on the user interface with an associated shipment group identifier.

18. The mobile communication device of claim 12, wherein:
the network interface comprises a wireless transceiver that supports wireless communication; and
the SDSTU configures the mobile communication device to:
receive a shipment assignment providing information about a shipment that is to be picked up and transported by an authorized operator from a given shipment pick-up point to a shipment delivery point, the shipment assignment comprising the unique location signals for the authorized operator and at least one other shipment-related entity from among the cargo and the transportation vehicle;
provide unique tracking icons corresponding to the visual representation of the shipment-related entities on the shipment tracking user interface (STUI);
map the unique tracking icons to a current location of the shipment-related entities on a co-location map presented on the STUI;
receive movement data associated with at least one shipment-related entities and update a mapped location of an associated unique tracking icon on a co-location map displayed on the STUI;
monitor for anomalies in a current location of the other shipment-related entities prior to the authorized operator arriving at the origination point to receive the shipment; and
in response to detecting an anomaly in the current location of at least one of the other shipment-related entities, generate and issue a notification about the anomaly.

19. The mobile communication device of claim 18, wherein the SLTU configures the mobile communication device to:

detect an anomaly that involves the unique tracking icons moving away from the origination point at a velocity, which indicates the cargo has been picked up by another moving vessel; and in response to detecting the anomaly, transmit a notification to a monitoring server and the authorized operator about the anomaly to trigger tracking of a location of the shipment relative to known operators to identify whether one of the known operators has mistakenly taken the shipment.

20. The mobile communication device of claim 12, wherein the SDSTU configures the mobile communication device to:

detect an anomaly that involves a disappearance of a plurality of the unique tracking representations, wherein the location signals are no longer detectable; and in response to detecting the disappearance, generate and issue an alert indicating that the shipment appears to be under a jamming attack; and transmit, to at least a shipment monitoring server, the notification with information about the disappearance of the signals.

21. A data processing system comprising:

a memory having stored thereon a shipment location tracking and security utility (SLTSU);

a display device that visually presents at least one graphical user interface (UI) generated by the SLTSU;

at least one network interface device (NID) that enables the data processing system to receive and transmit information via one or more communication networks;

at least one processor coupled to the memory, the display device, and the at least one NID, and which executes the SLTSU to configure the data processing system to:

receive, via the at least one NID from one or more remote devices communicatively connected to the data processing system via a respective communication network, a plurality of location tracking signals indicating a location of multiple shipment related entities that are being tracked concurrently as a shipment group;

associate the location tracking signals as a shipment group and assigning a unique shipment tracking identifier (STID) to the shipment group to track movement of the location tracking signals relative to each other;

assign a security detail to the shipment group, the security detail physically tracking the shipment group in a vicinity of the shipment group, the security detail having at least one associated location sensor and a communication mechanism for transmitting a current location of the security detail to the data processing system over a respective communication network, the security detail having an assigned security detail identifier (SDID);

link the SDID with the STID;

receive, via the communication network, a security detail (SD) location signal identifying the current location of the location sensor associated with the assigned security detail;

present the shipment group and the assigned security detail as a plurality of co-located visual representations on a first shipment tracking user interface (UI), wherein each received location tracking signal and the SD location signal is represented by one visual representation from among the plurality of co-located visual representations;

monitor for any unscheduled deviations in at least one of an expected co-location and an expected geo-location of received updates to the location tracking signals within the shipment group and the SD location signal; and in response to detecting an unscheduled deviation: identify a specific type of the unscheduled deviation; and trigger a series of responsive actions based on the specific type of the unscheduled deviation, the series of responsive actions comprising alerting the security detail of the detected unscheduled deviation, via transmission of a signal over at least one communication network.

22. The data processing system of claim 21, wherein the SLTSU further enables the data processing system to:

generate and display, on the display device, the first shipment tracking user interface (UI) displaying each of a plurality of shipment groups being simultaneously tracked including a corresponding location of any assigned security detail for each of the plurality of shipment groups; and indicate, within the first shipment tracking UI, when an anomaly has been detected in one of the plurality of shipment groups.

23. The data processing system of claim 21, wherein presenting the shipment group as a plurality of co-located visual representations on a shipment tracking UI comprises the SLTSU further configuring the data processing system to:

periodically receive updated location signals from one or more of the shipment-related entities and the security detail;

update the presentation of the plurality of co-located visual representations on the UI based on the updated location signals.

24. The data processing system of claim 23, wherein the SLTSU configures the data processing system to:

visually present each shipment-related entity and the security detail within a shipment group as visually distinct representations on the shipment tracking UI, using one or more of (i) a different representation type and (ii) different characteristics assigned to a same representation type, in response to detecting a selection of the unique STID or visual representation of a specific shipment group being displayed on the STIU, generate and display, on the display device, a second shipment tracking UI that provides detailed information about a corresponding shipment and a last recorded location of each shipment-related entity and the security detail of the shipment group relative to a location of each other shipment-related entity within the shipment group and in relation to a geographic or location coordinate of the shipment-related entities and shipping route.

25. The data processing system of claim 21, wherein to monitor for any unscheduled deviations, the STLSU configures the data processing system to:

detect an occurrence of an anomaly from among a group comprising (i) loss of reception of the location signals from one or more of the shipment-related entities and the security detail, (ii) unscheduled changes in a spatial relationship of at least two of the shipment-related entities and the security detail or corresponding visual representations on the STUI, and (iii) an unscheduled movement of a shipment location signal from a shipment pick-up location before being co-located and grouped with an operator location signal, indicative of an unauthorized taking of shipment; and
in response to detecting an anomaly that includes an unscheduled physical separation of any two of the co-located location signals within the shipment group from each other before a shipment delivery at the intended destination:
determine if there is a valid reason for the unscheduled separation by evaluating historical data and received data about the shipment-related entities, the security detail, the route, geographic location at which the unscheduled separation occurs, and received environmental conditions; and
in response to not identifying a valid reason for the unscheduled separation: flag the shipment for enhanced monitoring; trigger security measures to alert relevant parties, including the security detail, of the occurrence of the unscheduled separation of the co-located representations; and create and store a record of the occurrence of the anomaly.

26. The data processing system of claim 21, wherein the STLSU configures the data processing system to:
in response to detecting a separation of at least one of the shipment-related entities and the security detail from each other occurring at an unscheduled time prior to the shipment reaching a shipment delivery destination or a security monitoring end time or location:
evaluate, using historical data and geographical mapping data, a geographic location and time at which the separation occurs;
place the shipment in an enhanced watch/monitoring state;
trigger a performance of one or more security features that informs at a least one of the operator, the security detail, and the shipper of the separation; and
create and storing a record of the separation event and responsive actions taken; and
in response to the separation occurring at the shipment delivery destination or the security monitoring end time or location:
de-couple the location signals within the shipment group;
update a shipment tracking system to indicate that the shipment has been delivered;
update the shipment tracking UI to remove the plurality of co-located visual representations for tracking the shipment group; and
release the security detail from tracking the shipment-related entities of the shipment group.

27. The data processing system of claim 26, wherein the STLSU configures the data processing system to:
check whether a de-escalation signal is received from a trusted party providing a verification of a safety of the shipment prior to expiration of a pre-established window of time;
in response to receiving the de-escalation signal prior to expiration of a pre-established window of time, remove the shipment from the enhanced watch/monitoring state; and
in response to one of (i) all of the co-located visual representations simultaneously disappearing for more than the pre-established window of time and (ii) not receiving the de-escalation signal prior to expiration of the pre-established window of time when only a subset of the location signals disappear from the monitoring system: place the shipment in an elevated danger state; and trigger a higher level alarm to initiate a series of responsive operations and actions.

28. The data processing system of claim 26, wherein the unscheduled deviation comprises a loss of a location signal of at least one shipment-related entity associated with the shipment group, and the STLSU configures the data processing system to:
detect a complete loss of at least one location signal from a corresponding one or more of the shipment entities;
in response to the detected complete loss, modify a presentation within the shipment tracking UI of the visual representation corresponding with the location signal for that shipment entity;
determine, based in part on characteristics associated with the loss of the at least one signal, whether the loss is a result of a jamming attack at the location of the shipment; and
in response to determining that the resulting loss is a result of a jamming attack:
generate and issue a specific notification that identifies detection of the jamming attack, wherein the specific notification is provided to at least the security detail in response to identifying that a communication device of the security detail has not being subject to the jamming attack; and
trigger initiation by the security detail of one or more actions to counter the jamming attack and protect one or more of the shipment-related entities.

29. The data processing system of claim 21, wherein to perform the series of responsive actions based on the specific type of deviation identified, the SLTSU configures the data processing system to perform at least one of:
high-light, on the shipment tracking UI, a corresponding visual representation of the unique ID one of the shipment group for which the deviation is detected;
trigger an outputting at the SD communication device of at least one of an on-screen visual notification and an audible notification to alert a security detail personnel about the detected deviation.

30. The data processing system of claim 21, wherein the SLTSU configures the data processing system to:
identify an intended operator and shipping vessel assigned to a future shipment awaiting pickup by the intended operator, the intended operator having an operator ID and a communication device that provides a unique device location signal that is associated with the operator ID, the shipment also having a unique shipment location signal;
associate the operator ID to the future shipment;
associate the security detail with the future shipment, the security detail having an associated security detail identifier (SDID) and SD location signal;
transmit, to a communication device associated with the security detail, the unique signatures of the location signals associated with the shipment-related entities, the communication device configured to track the location signals and identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal, where the second operator device signal is not associated with the operator or a second operator that has been assigned to transport the shipment;

monitor a geo-coordinate location of the future shipment prior to pick-up by the operator;

in response to identifying the anomaly, trigger a series of responsive actions, involving communicating with personnel associated with the security detail, the responsive actions designed to prevent or stop an un-authorized operator from taking the shipment; and in response to a received signal indicating the operator has picked-up the shipment, link and co-locate the unique device location signal, unique shipment location signal, and the SD location signal to create and track a new shipment group.

\* \* \* \* \*